US012701557B2

(12) United States Patent
Liu et al.

(10) Patent No.: US 12,701,557 B2
(45) Date of Patent: Aug. 4, 2026

(54) METHOD AND DEVICE IN NODES USED FOR WIRELESS COMMUNICATION

(71) Applicant: Apogee 5G Global, LLC, Plano, TX (US)

(72) Inventors: Zheng Liu, Shanghai (CN); Xiaobo Zhang, Shanghai (CN)

( * ) Notice: Subject to any disclaimer, the term of this patent is extended or adjusted under 35 U.S.C. 154(b) by 563 days.

(21) Appl. No.: 17/946,065

(22) Filed: Sep. 16, 2022

(65) Prior Publication Data

US 2023/0007657 A1 Jan. 5, 2023

Related U.S. Application Data

(63) Continuation of application No. PCT/CN2021/081662, filed on Mar. 19, 2021.

(30) Foreign Application Priority Data

Mar. 21, 2020 (CN) .......................... 202010204327.6
Apr. 29, 2020 (CN) .......................... 202010353642.5

(51) Int. Cl.
*H04W 72/0453* (2023.01)
(52) U.S. Cl.
CPC ............................... *H04W 72/0453* (2013.01)
(58) Field of Classification Search
CPC .............. H04W 72/0453; H04W 72/23; H04L 5/0007; H04L 5/0053
USPC ....... 370/329, 336, 524, 241, 281, 328, 331, 370/350; 455/450
See application file for complete search history.

(56) References Cited

U.S. PATENT DOCUMENTS

| | | | |
|---|---|---|---|
| 9,877,334 B2 * | 1/2018 | Dinan | .................. H04W 72/121 |
| 10,938,609 B2 | 3/2021 | Kazmi et al. | |
| 11,304,231 B2 | 4/2022 | Jiang et al. | |
| 11,528,090 B2 | 12/2022 | Xiao et al. | |
| 2020/0059904 A1 | 2/2020 | Takeda | |

FOREIGN PATENT DOCUMENTS

| | | | | |
|---|---|---|---|---|
| EP | 2806573 A1 | 11/2014 | | |
| WO | WO-2020029945 A1 * | 2/2020 | .......... | H04L 5/0044 |

OTHER PUBLICATIONS

ISR received in application No. PCT/CN2021/081662 dated Jul. 6, 2021.

(Continued)

*Primary Examiner* — Ricardo H Castaneyra
(74) *Attorney, Agent, or Firm* — Volpe Koenig

(57) ABSTRACT

The present disclosure provides a method and device in a node for wireless communications. A node receives a first information block, and the first information block is used for determining a scheduled cell set; monitors M1 control channel candidates in a first time window, and the M1 control channel candidates occupy M2 Control Channel Elements (CCEs); a Subcarrier Spacing (SCS) of the M2 CCEs is equal to a first SCS; M1 and M2 are respectively not greater than a first threshold and a second threshold; the scheduled cell set is divided into W cell groups, a first serving cell belongs to the scheduled cell set, and a number of control resource pool(s) in a scheduling cell in the first serving cell is used for determining a cell group to which the control resource pool(s) belongs(belong). The present disclosure improves scheduling performance.

14 Claims, 10 Drawing Sheets

(56) References Cited

OTHER PUBLICATIONS

First Search Report of Chinses patent application No. CN202010204327.6 dated Mar. 5, 2022.

Notification to Grant Patent Right for Invention of Chinses patent application No. CN202010204327.6 dated Mar. 18, 2022.

NTT Docomo, Inc Offline summary for PDCCH structure and search space 3GPP TSG RAN WG1 Meeting #95 R1-1813933 Nov. 13, 2018.

Vivo Remaining issues on PDCCH 3GPP TSG RAN WG1 Meeting #94 R1-1808224 Aug. 11, 2018.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

Vivo, "Discussion on the search space configuration of cross-carrier scheduling," 3GPP TSG RAN WG1 Meeting #95, R1-1812277, Spokane, USA (Nov. 12-18, 2018).

* cited by examiner

100A
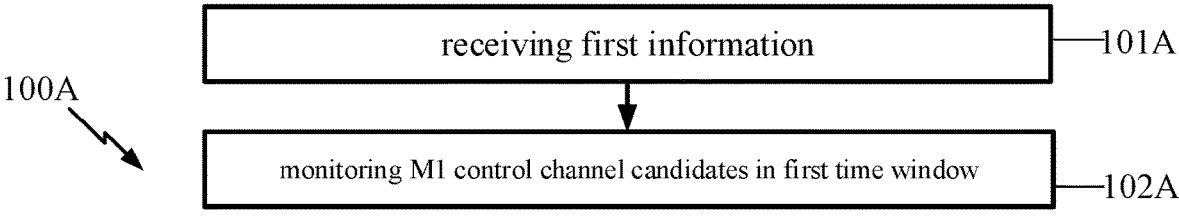
| receiving first information | —101A |
| monitoring M1 control channel candidates in first time window | —102A |
FIG. 1A
100B
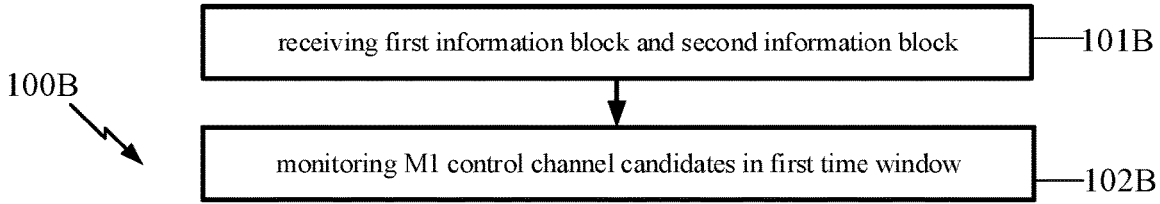
| receiving first information block and second information block | —101B |
| monitoring M1 control channel candidates in first time window | —102B |
FIG. 1B
5GS/EPS 200
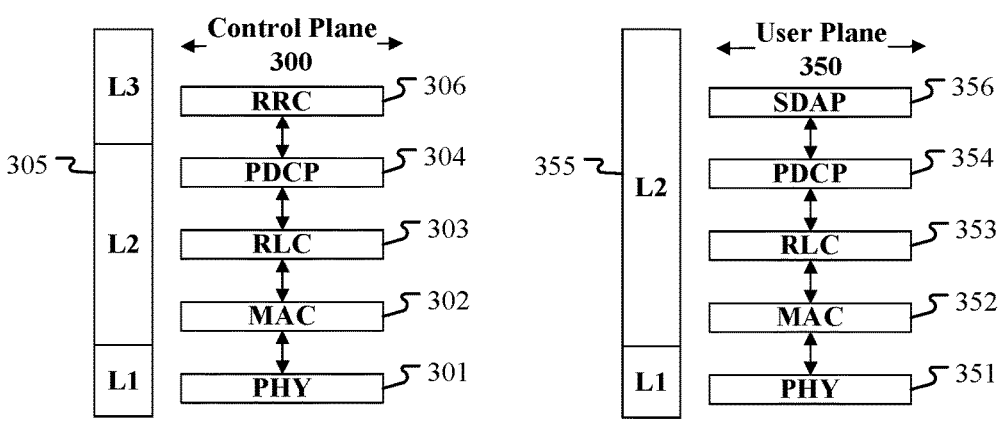
FIG. 2
Control Plane
300
| | L3 | RRC | 306 |
| 305 | L2 | PDCP | 304 |
| | | RLC | 303 |
| | | MAC | 302 |
| | L1 | PHY | 301 |
User Plane
350
| | | SDAP | 356 |
| 355 | L2 | PDCP | 354 |
| | | RLC | 353 |
| | | MAC | 352 |
| | L1 | PHY | 351 |
FIG.3

Case A          Case B

Case A          Case B

Case A

Case B

$$\frac{\text{Target sum value} = N_{1,\mu} + \gamma \cdot N_{2,\mu} + \ldots}{\text{Characteristic sum value} = N_1 + \gamma \cdot N_2 + \ldots} \Longrightarrow \boxed{\text{First parameter}}$$

A serving cell other than target cell        Target cell

Frequency $$N_{1,cap} + R \cdot N_{2,cap} + \ldots \Longrightarrow \boxed{\text{Second parameter}}$$

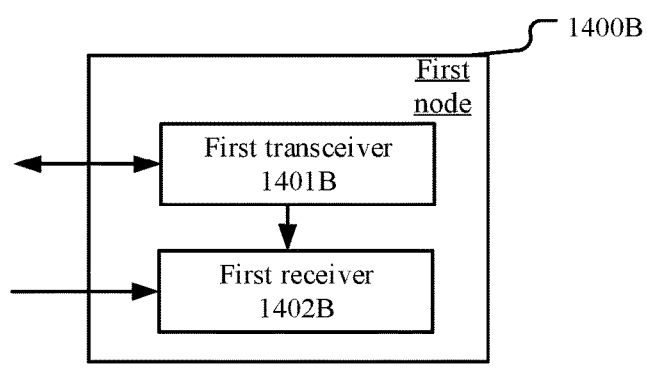
FIG. 14B
| Index of Subcarrier Spacing | First-type candidate parameter | Second-type candidate parameter |
|---|---|---|
| 0 | 44 | 56 |
| 1 | 36 | 56 |
| 2 | 22 | 48 |
| 3 | 20 | 32 |
FIG. 15A
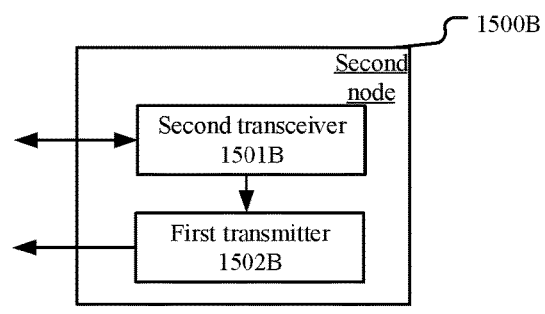
FIG. 15B
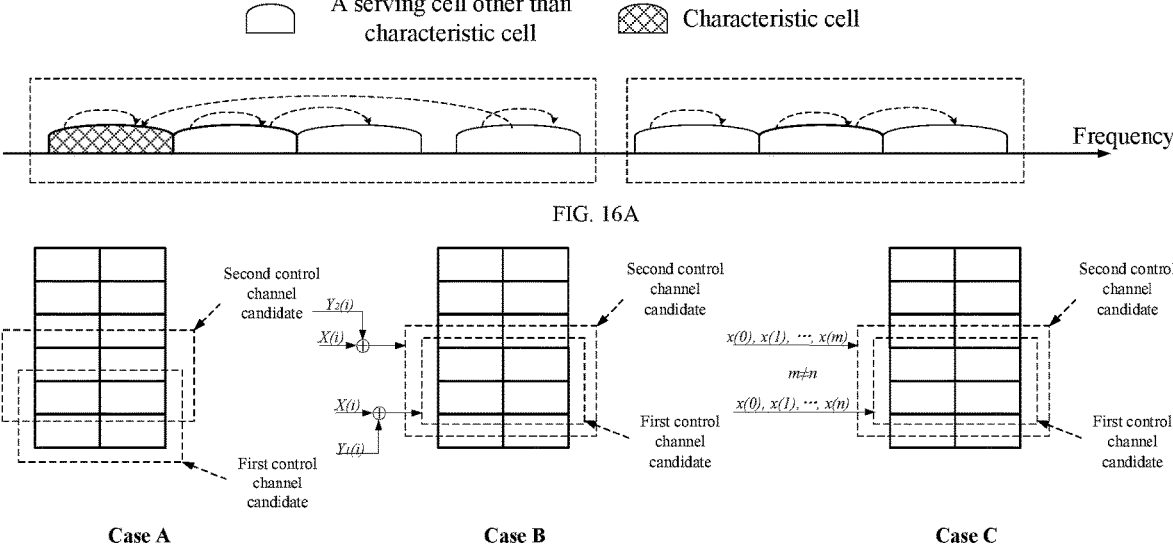
FIG. 16A
FIG. 17A

METHOD AND DEVICE IN NODES USED FOR WIRELESS COMMUNICATION

CROSS REFERENCE TO RELATED APPLICATIONS

This application is the continuation of the International Patent application No. PCT/CN2021/081662, filed on Mar. 19, 2021, which claims the priority benefit of Chinese Patent Application No. 202010204327.6, filed on Mar. 21, 2020, and claims the priority benefit of Chinese Patent Application No. 202010353642.5, filed on Apr. 29, 2020, the full disclosure of which is incorporated herein by reference.

TECHNICAL FIELD

The present disclosure relates to transmission methods and devices in wireless communication systems, and in particular to a method and device of multicarrier symbol transmission in wireless communications.

BACKGROUND

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72th plenary that that a study on New Radio (NR), or what is called Fifth Generation (5G) shall be conducted. The Work Item (WI) of NR was approved at the 3GPP RAN #75th plenary to standardize NR.

In NR technology, multicarrier (including Carrier Aggregation (CA) and Dual-Connectivity) and multi-antenna technologies are important components. In order to adapt to a variety of application scenarios and meet different needs, a WI of Dynamic Spectrum Sharing (DSS) and a WI of Multi-Radio Dual-Connectivity (MR-DC) enhancement under NR were also approved at 3GPP RAN #85 plenary to support more flexible and efficient multi-carrier communications.

SUMMARY

In the process of multicarrier communications, such as in CA, cross-carrier scheduling is supported. At the same time, in order to support multi-antenna (e.g., multi-Transmission Reception Point (multi-TRP) and multi-panel) transmission, a number of physical downlink control channels that can be monitored by a User Equipment (UE) and a number of Non-overlapped Control Channel Elements (CCEs) are increased. The combination of CA and multi-antenna technology can maximize flexibility of network scheduling and configuration and optimizing performance of the whole system. Besides, 3GPP plans to support cross-carrier scheduling of a secondary carrier to a primary carrier.

In view of the combination of the multicarrier and the multi-antenna as well as supporting scheduling of multicarrier transmission, the present disclosure discloses a solution. It should be noted that though the present disclosure only took the multicarrier, multi-antenna as well as DSS for example in the statement above, it is also applicable to other scenarios confronting the same difficulty, including other multicarrier transmissions or multi-channel transmissions, or other networks with specific requirements for data scheduling, where similar technical effects can be achieved.

Besides, a unified solution for different scenarios (including but not limited to scenarios of DSS and multicarrier and multi-antenna transmission) can also help reduce hardware complexity and cost. If no conflict is incurred, embodiments in a first node in the present disclosure and the characteristics of the embodiments are also applicable to a second node, and vice versa. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:

receiving a first information block, the first information block being used for determining a scheduled cell set, and the scheduled cell set comprising more than one serving cells; and monitoring M1 control channel candidates in a first time window, the M1 control channel candidates occupying M2 CCEs, M1 being a positive integer greater than 1, M2 being a positive integer greater than 1;

herein, a Subcarrier Spacing (SCS) of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, a number of control resource pool(s) in a scheduling cell of the first serving cell is used for determining a cell group to which the first serving cell belongs out of the W cell groups, so as to support judging a cell group to which a serving cell belongs according to configuration parameters of a scheduling cell of the serving cell instead of configuration parameters of the serving cell itself, thus solving the problem of mismatching of a number of monitored PDCCH candidates and a number of non-overlapped CCEs due to different grouping caused by different configuration parameters (such as whether multi-TRP or multi-panel transmission is supported) of a scheduling carrier and a scheduled carrier in cross-carrier scheduling, so that the blocking probability of the PDCCH is reduced and the scheduling performance is improved.

In one embodiment, serving cells are grouped according to scheduling cells of the serving cells, which ensures consistency of the design, so as to ensure good forward compatibility and leave space for enhancement of future functions.

According to one aspect of the present disclosure, the above method is characterized in that the W cell groups comprise a first cell group and a second cell group, and the first cell group is different from the second cell group; when a number of control resource pool(s) provided in a scheduling cell of the first serving cell is equal to 1 or no control resource pool is provided in a scheduling cell of the first serving cell, the first serving cell belongs to the first cell group; and when a number of control resource pools provided in a scheduling cell of the first serving cell is greater than 1, the first serving cell belongs to the second cell group.

According to one aspect of the present disclosure, the above method is characterized in that a number of scheduling cell(s) of the first serving cell is used for determining a cell group to which the first serving cell belongs out of the W cell groups.

In one embodiment, a number of scheduling cell(s) of the first serving cell is used for determining a cell group to which the first serving cell belongs out of the W cell groups, so that when a serving cell is scheduled by multiple serving cells, or when a Primary Cell (Pcell) supports being scheduled by a Secondary Cell (Scell), the serving cells being grouped according to a number of scheduling cells is supported, which enables that a number of monitored PDCCH candidates and a number of non-overlapped CCEs can match a number of scheduling cells, thus further reducing blocking probability of the PDCCH and improving scheduling capability to improve system performance.

According to one aspect of the present disclosure, the above method is characterized in that the W cell groups comprises a third cell group and a fourth cell group, and the third cell group is different from the fourth cell group; conditions under which the first serving cell belongs to the third cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the fourth cell group include:

a number of control resource pools provided in a scheduling cell of the first serving cell is greater than 1; or, a number of scheduling cells of the first serving cell is greater than 1.

In one embodiment, comprehensively considering multiantenna capability supported by a serving cell and a capability scheduled by multi-scheduling cell, a number of monitored PDCCH candidates and a number of non-overlapped CCEs can be dynamically shared between a scheduling cell supporting multi-antenna scheduling and a scheduling cell supporting cross-carrier scheduling a Pcell, thus optimizing capacity of the PDCCH.

According to one aspect of the present disclosure, the above method is characterized in that the W cell groups comprise a fifth cell group, a sixth cell group and a seventh cell group, and any two among the fifth cell group, the sixth cell group and the seventh cell group are different; conditions under which the first serving cell belongs to the fifth cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the sixth cell group include:

a number of control resource pools provided in a scheduling cell of the first serving cell is greater than 1, and a number of scheduling cell(s) of the first serving cell is equal to 1;

conditions under which the first serving cell belongs to the seventh cell group include:

a number of scheduling cells of the first serving cell is greater than 1.

In one embodiment, serving cells supporting being scheduled by multiple serving cells are grouped separately, so that a number of monitored PDCCH candidates and a number of non-overlapped CCEs are allocated independently between whether being scheduled by multiple serving cells is supported and whether being scheduled by a multi-antenna scheduling cell is supported, thus ensuring independent allocation of the PDCCH capability and maximizing flexibility of allocation of the PDCCH capability.

According to one aspect of the present disclosure, the above method is characterized in also comprising:

transmitting a second information block; and receiving a third information block;

herein, the second information block is used for indicating a first candidate factor out of a first candidate factor set, the first candidate factor set comprises more than one candidate factors, the first candidate factor is a candidate factor comprised in the first candidate factor set, and any candidate factor comprised in the first candidate factor set is greater than 0; the third information block is used for determining whether the target factor is equal to the first candidate factor; when the target factor is not equal to the first candidate factor, the target factor is equal to a predefined value.

According to one aspect of the present disclosure, the above method is characterized in also comprising:

transmitting a fourth information block;

herein, the first candidate factor set is one of G candidate factor sets, G being a positive integer greater than 1; any of the G candidate factor sets comprises more than one candidate factor; the fourth information block is used for indicating the first candidate factor set out of the G candidate factor sets.

In one embodiment, the fourth information block indicates the first candidate factor set out of the G candidate factor sets to support that the UE adjusts scaling factors of PDCCH capacity allocation according to its own capability (such as whether an Scell cross-carrier schedules a Pcell is supported), so as to achieve the purpose of comprehensively considering multiple factors and adopting a unified design, thus ensuring scheduling flexibility when reducing complexity of implementation.

According to one aspect of the present disclosure, the above method is characterized in that the W number values and the target factor are used together for determining a first parameter, the first parameter and a second parameter are used together for determining the first threshold and the second threshold, and the second parameter is a positive integer.

According to one aspect of the present disclosure, the above method is characterized in that the first parameter is equal to a ratio of a target sum value to a characteristic sum value, and the target sum value is not greater than the characteristic sum value; the characteristic sum value is linearly correlated to a number of serving cell(s) with at least one associated control channel candidate comprised in one of the W cell groups, and the characteristic sum value is linearly correlated to a product of a number of serving cell(s) with at least one associated control channel candidate comprised in one of the W cell groups and the target factor; the target sum value is linearly correlated to one of the W number values, and the target sum value is linearly correlated to a product of one of the W number values and the target factor.

According to one aspect of the present disclosure, the above method is characterized in also comprising:

transmitting a fifth information block;

herein, the fifth information block is used for indicating the second parameter; or the second parameter is linearly correlated to a number of serving cell(s) comprised in one of the W cell groups, and the second parameter is linearly correlated to a product of a number of serving cell(s) comprised in one of the W cell groups and the target factor.

According to one aspect of the present disclosure, the above method is characterized in that the first SCS is one of the X candidate SCSs, X being a positive integer greater than 1; the X candidate SCSs respectively correspond to X first-type candidate parameters, any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used for determining the first threshold; a fourth parameter is one of the X second-type candidate parameters, and the fourth parameter is used for determining the second threshold; the first SCS is used for determining the third parameter out of the X first-type candidate parameters, and the first SCS is used for determining the fourth parameter out of the X second-type candidate parameters.

According to one aspect of the present disclosure, the method is characterized in that all serving cells comprised in the scheduled cell set belong to a same cell group, a characteristic cell is a serving cell comprised in the scheduled cell set, and there exists more than one serving cells scheduling the characteristic cell.

According to one aspect of the present disclosure, the above method is characterized in also comprising:

receiving a sixth information block;

herein, the sixth information block is used for determining at least one of the M1 control channel candidates, the M2 CCEs or a number of control-resource resource pool(s) in a scheduling cell of the first serving cell.

According to one aspect of the present disclosure, the above method is characterized in that a first control channel candidate is one of the M1 control channel candidates, and a second control channel candidate is a control channel candidate other than the first control channel candidate among the M1 control channel candidates; CCEs occupied by the first control channel candidate are different from CCEs occupied by the second control channel candidate, or scrambling used by the first control channel candidate is different from scrambling used by the second control channel candidate, or a payload size of a Downlink Control Information (DCI) format corresponding to the first control channel candidate is different from a payload size of a DCI format corresponding to the second control channel candidate.

According to one aspect of the present disclosure, the above method is characterized in that a first CCE is one of the M2 CCEs, and a second CCE is a CCE other than the first CCE among the M2 CCEs; the first CCE and the second CCE respectively belong to different control resource sets, or a control channel candidate occupying the first CCE and a control channel candidate occupying the second CCE respectively start from different symbols in time domain.

According to one aspect of the present disclosure, the above method is characterized in that a scheduling cell set comprises a scheduling cell of a serving cell comprised in the scheduled cell set, and the scheduling cell set comprises at least one serving cell; the M1 control channel candidates are monitored in sub-band(s) comprised in a first sub-band set, and the first sub-band set comprises at least one sub-band; a serving cell to which any sub-band comprised in the first sub-band set belongs in frequency domain belongs to the scheduling cell set; an SCS of a subcarrier comprised in any sub-band comprised in the first sub-band set is equal to the first SCS.

The present disclosure provides a method in a second node for wireless communications, comprising:

transmitting a first information block, the first information block being used for indicating a scheduled cell set, and the scheduled cell set comprising more than one serving cells; and determining M1 control channel candidates in a first time window, the M1 control channel candidates occupying M2 CCEs, M1 being a positive integer greater than 1, M2 being a positive integer greater than 1;

herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

According to one aspect of the present disclosure, the above method is characterized in that the W cell groups comprise a first cell group and a second cell group, and the first cell group is different from the second cell group; when a number of control resource pool(s) provided in a scheduling cell of the first serving cell is equal to 1 or no control resource pool is provided in a scheduling cell of the first serving cell, the first serving cell belongs to the first cell group; and when a number of control resource pools provided in a scheduling cell of the first serving cell is greater than 1, the first serving cell belongs to the second cell group.

According to one aspect of the present disclosure, the above method is characterized in that a number of scheduling cell(s) of the first serving cell is used for determining a cell group to which the first serving cell belongs out of the W cell groups.

According to one aspect of the present disclosure, the above method is characterized in that the W cell groups comprises a third cell group and a fourth cell group, and the third cell group is different from the fourth cell group; conditions under which the first serving cell belongs to the third cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the fourth cell group include:

a number of control resource pools provided in a scheduling cell of the first serving cell is greater than 1; or, a number of scheduling cells of the first serving cell is greater than 1.

According to one aspect of the present disclosure, the above method is characterized in that the W cell groups comprise a fifth cell group, a sixth cell group and a seventh cell group, and any two among the fifth cell group, the sixth cell group and the seventh cell group are different; conditions under which the first serving cell belongs to the fifth cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the sixth cell group include:

a number of control resource pools provided in a scheduling cell of the first serving cell is greater than 1, and a number of scheduling cell(s) of the first serving cell is equal to 1;

conditions under which the first serving cell belongs to the seventh cell group include:

a number of scheduling cells of the first serving cell is greater than 1.

According to one aspect of the present disclosure, the above method is characterized in also comprising:

receiving a second information block; and transmitting a third information block;

herein, the second information block is used for indicating a first candidate factor out of a first candidate factor set, the first candidate factor set comprises more than one candidate factors, the first candidate factor is a candidate factor comprised in the first candidate factor set, and any candidate factor comprised in the first candidate factor set is greater than 0; the third information block is used for indicating whether the target factor is equal to the first candidate factor; when the target factor is not equal to the first candidate factor, the target factor is equal to a predefined value.

According to one aspect of the present disclosure, the above method is characterized in also comprising:

receiving a fourth information block;

herein, the first candidate factor set is one of G candidate factor sets, G being a positive integer greater than 1; any of the G candidate factor sets comprises more than one candidate factor; the fourth information block is used for indicating the first candidate factor set out of the G candidate factor sets.

According to one aspect of the present disclosure, the above method is characterized in that the W number values and the target factor are used together for determining a first parameter, the first parameter and a second parameter are used together for determining the first threshold and the second threshold, and the second parameter is a positive integer.

According to one aspect of the present disclosure, the above method is characterized in that the first parameter is equal to a ratio of a target sum value to a characteristic sum value, and the target sum value is not greater than the characteristic sum value; the characteristic sum value is linearly correlated to a number of serving cell(s) with at least one associated control channel candidate comprised in one of the W cell groups, and the characteristic sum value is linearly correlated to a product of a number of serving cell(s) with at least one associated control channel candidate comprised in one of the W cell groups and the target factor; the target sum value is linearly correlated to one of the W number values, and the target sum value is linearly correlated to a product of one of the W number values and the target factor.

According to one aspect of the present disclosure, the above method is characterized in also comprising:

receiving a fifth information block;

herein, the fifth information block is used for indicating the second parameter; or the second parameter is linearly correlated to a number of serving cell(s) comprised in one of the W cell groups, and the second parameter is linearly correlated to a product of a number of serving cell(s) comprised in one of the W cell groups and the target factor.

According to one aspect of the present disclosure, the above method is characterized in that the first SCS is one of the X candidate SCSs, X being a positive integer greater than 1; the X candidate SCSs respectively correspond to X first-type candidate parameters, any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used for determining the first threshold; a fourth parameter is one of the X second-type candidate parameters, and the fourth parameter is used for determining the second threshold; the first SCS is used for determining the third parameter out of the X first-type candidate parameters, and the first SCS is used for determining the fourth parameter out of the X second-type candidate parameters.

According to one aspect of the present disclosure, the method is characterized in that all serving cells comprised in the scheduled cell set belong to a same cell group, a characteristic cell is a serving cell comprised in the scheduled cell set, and there exists more than one serving cell scheduling the characteristic cell.

According to one aspect of the present disclosure, the above method is characterized in also comprising:

transmitting a sixth information block;

herein, the sixth information block is used for indicating at least one of the M1 control channel candidates, the M2 CCEs or a number of control-resource resource pool(s) in a scheduling cell of the first serving cell.

According to one aspect of the present disclosure, the above method is characterized in that a first control channel candidate is one of the M1 control channel candidates, and a second control channel candidate is a control channel candidate other than the first control channel candidate among the M1 control channel candidates; CCEs occupied by the first control channel candidate are different from CCEs occupied by the second control channel candidate, or scrambling used by the first control channel candidate is different from scrambling used by the second control channel candidate, or a payload size of a DCI format corresponding to the first control channel candidate is different from a payload size of a DCI format corresponding to the second control channel candidate.

According to one aspect of the present disclosure, the above method is characterized in that a first CCE is one of the M2 CCEs, and a second CCE is a CCE other than the first CCE among the M2 CCEs; the first CCE and the second CCE respectively belong to different control resource sets, or a control channel candidate occupying the first CCE and a control channel candidate occupying the second CCE respectively start from different symbols in time domain.

According to one aspect of the present disclosure, the above method is characterized in that a scheduling cell set comprises a scheduling cell of a serving cell comprised in the scheduled cell set, and the scheduling cell set comprises at least one serving cell; the M1 control channel candidates are monitored in sub-band(s) comprised in a first sub-band set, and the first sub-band set comprises at least one sub-band; a serving cell to which any sub-band comprised in the first sub-band set belongs in frequency domain belongs to the scheduling cell set; an SCS of a subcarrier comprised in any sub-band comprised in the first sub-band set is equal to the first SCS.

The present disclosure provides a first node for wireless communications, comprising:

a first transceiver, receiving a first information block, the first information block being used for determining a scheduled cell set, and the scheduled cell set comprising more than one serving cells; and a first receiver, monitoring M1 control channel candidates in a first time window, the M1 control channel candidates occupying M2 CCEs, M1 being a positive integer greater than 1, M2 being a positive integer greater than 1;

herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

The present disclosure provides a second node for wireless communications, comprising:

a second transceiver, transmitting a first information block, the first information block being used for indicating a scheduled cell set, and the scheduled cell set comprising more than one serving cells; and a first transmitter, determining M1 control channel candidates in a first time window, the M1 control channel candidates occupying M2 CCEs, M1 being a positive integer greater than 1, M2 being a positive integer greater than 1;

herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

The present disclosure provides a method in a first node for wireless communications, comprising:

receiving a first information block and a second information block, the first information block being used for determining a first scheduled cell set, the first scheduled cell set comprising more than one serving cells, and the second information block being used for determining a target increment value, the target increment value being a non-negative number; and monitoring M1 control channel candidates in a first time window, the M1 control channel candidates occupying M2 CCEs, M1 being a positive integer greater than 1, M2 being a positive integer greater than 1, and the first time window comprising at least one consecutive multicarrier symbol in time domain;

herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the target increment value is configured by the second information block which enables that the network can adjust the proportion of a Pcell scheduled by an Scell for allocated PDCCH candidates and non-overlapped CCEs according to configuration needs, so as to achieve a balance between the blocking probability of PDCCH and the processing capability of UE, thus improving scheduling performance of the PDCCH.

In one embodiment, whether the target increment value is applied to the target number value is determined based on a relation between the target cell and at least one of the W cell groups, so that when a serving cell groups serving cells according to monitoring capability of the PDCCH (such as whether PDCCH transmission of multi-panel or multi-TRP is supported, or whether PDCCH monitoring based on span is supported), the distribution of PDCCH candidates and non-overlapped CCEs can be calculated according to a group to which the Pcell belongs, which ensures that a number of PDCCH candidates and non-overlapped CCEs allocated under different groups and configuration conditions matches the required number, thus reducing the blocking probability of the PDCCH and improving utilization of PDCCH resources.

According to one aspect of the present disclosure, the above method is characterized in that when the target cell only belongs to the first cell group in the W cell groups, the target number value is equal to a sum of a number of serving cell(s) comprised in the first cell group and the target increment value; and when the target cell does not belong to the first cell group, the target number value is equal to a number of serving cell(s) comprised in the first cell group.

In one embodiment, whether the target increment value is applied is judged according to whether the target cell only belongs to the first cell group, so as to avoid the mismatch of PDCCH candidates and non-overlapped CCEs caused by repeat calculation of a serving cell, thus improving transmission performance and scheduling flexibility of the PDCCH.

According to one aspect of the present disclosure, the above method is characterized in that a second cell group is one of the W cell groups, and the first cell group is different from the second cell group; when the target cell belongs to the first cell group and the second cell group simultaneously, the target number value is equal to a number of serving cell(s) comprised in the first cell group.

According to one aspect of the present disclosure, the above method is characterized in comprising:

receiving a third information block;

herein, the third information block is used for determining a number of control resource set pool(s) in a scheduling cell of the target cell, and a number of control resource set pool(s) in a scheduling cell of the target cell is used for determining a relation between the target cell and at least one of the W cell groups.

According to one aspect of the present disclosure, the above method is characterized in that both a first scheduling cell and the target cell are scheduling cells of the target cell, and the first scheduling cell is a serving cell other than the target cell; a relation between a number of control resource set pool(s) in the first scheduling cell and a number of control resource set pool(s) in the target cell is used for determining a cell group to which the target cell belongs out of the W cell groups, or one of a number of control resource set pool(s) in the first scheduling cell or a number of control resource set pool(s) in the target cell is used for determining a cell group to which the target cell belongs out of the W cell groups.

According to one aspect of the present disclosure, the above method is characterized in that a first-type monitoring capability is adopted in a scheduling cell of any serving cell comprised in the first scheduled cell set, and the first information block is used for indicating the first-type monitoring capability; the first-type monitoring capability is used for determining a time length of the first time window.

According to one aspect of the present disclosure, the above method is characterized in comprising:

transmitting a fourth information block;

herein, the first threshold is equal to a largest integer not greater than a first median value, and the second threshold is equal to a largest integer not greater than a second median value; a first parameter is used for determining the first median value and the second median value, and the first parameter is greater than 0; the first parameter is linearly correlated to the target number value, or the first parameter is linearly correlated to a product of the target number value and a first factor, and the fourth information block is used for indicating the first factor.

According to one aspect of the present disclosure, the above method is characterized in comprising:

receiving a fifth information block;

herein, the fifth information block is used for determining whether a target factor is equal to the first factor; when the target factor is not equal to the first factor, the target factor is equal to a predefined value; a second parameter is used for determining the first median value and the second median value, the second parameter is equal to a ratio of a target sum value to a characteristic sum value, and the target sum value is not greater than the characteristic sum value; a relation between the target cell and at least one of the W cell groups is used for determining whether the characteristic sum value is related to the target increment value; when the characteristic sum value is related to the target increment value, whether the target cell belongs to the first cell group is used for determining whether the characteristic sum value is linearly correlated to the target increment value or linearly correlated to a product of the target increment value and the target factor; whether the target cell is associated with at least one of the M1 control channel candidates and a relation between the target cell and at least one of the W cell groups are used for determining whether the target sum value is related to the target increment value; when the target sum value is related to the target increment value, whether the target cell belongs to the first cell group is used for determining whether the target sum value is linearly correlated to the target increment value or is linearly correlated to a product of the target increment value and the target factor.

In one embodiment, a proportion of PDCCH candidates and non-overlapped CCEs is determined when a number of configured serving cells exceeds the capacity of the UE according to a relation of the target cell and at least one of the W cell groups, which further ensures that a number of the PDCCH candidates and non-overlapped CCEs allocated under the condition of different groups and configurations matches the required number, so as to ensure the blocking performance and the scheduling performance of the PDCCH.

According to one aspect of the present disclosure, the above method is characterized in that all serving cells comprised in the first scheduled cell set belong to a first cell group, the target cell is a primary cell in the first cell group, the first cell group comprises more than one serving cell, and a serving cell other than the target cell comprised in the first cell group is a scheduling cell of the target cell.

According to one aspect of the present disclosure, the above method is characterized in comprising:

receiving a sixth information block;

herein, the sixth information block is used for determining at least one of the M1 control channel candidates, the M2 CCEs or a number of control resource set pool(s) in a scheduling cell of the target cell.

The present disclosure provides a method in a second node for wireless communications, comprising:

transmitting a first information block and a second information block, the first information block being used for indicating a first scheduled cell set, the first scheduled cell set comprising more than one serving cells, and the second information block being used for indicating a target increment value, and the target increment value being a non-negative number; and determining M1 control channel candidates in a first time window, the M1 control channel candidates occupying M2 CCEs, M1 being a positive integer greater than 1, M2 being a positive integer greater than 1, and the first time window comprising at least one consecutive multicarrier symbol in time domain;

herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

According to one aspect of the present disclosure, the above method is characterized in that when the target cell only belongs to the first cell group in the W cell groups, the target number value is equal to a sum of a number of serving cell(s) comprised in the first cell group and the target increment value; and when the target cell does not belong to the first cell group, the target number value is equal to a number of serving cell(s) comprised in the first cell group.

According to one aspect of the present disclosure, the above method is characterized in that a second cell group is one of the W cell groups, and the first cell group is different from the second cell group; when the target cell belongs to the first cell group and the second cell group simultaneously, the target number value is equal to a number of serving cell(s) comprised in the first cell group.

According to one aspect of the present disclosure, the above method is characterized in comprising:

transmitting a third information block;

herein, the third information block is used for indicating a number of control resource set pool(s) in a scheduling cell in the target cell, and a number of control resource set pool(s) in a scheduling cell of the target cell is used for determining a relation between the target cell and at least one of the W cell groups.

According to one aspect of the present disclosure, the above method is characterized in that both a first scheduling cell and the target cell are scheduling cells of the target cell, and the first scheduling cell is a serving cell other than the target cell; a relation between a number of control resource set pool(s) in the first scheduling cell and a number of control resource set pool(s) in the target cell is used for determining a cell group to which the target cell belongs out of the W cell groups, or one of a number of control resource set pool(s) in the first scheduling cell or a number of control resource set pool(s) in the target cell is used for determining a cell group to which the target cell belongs out of the W cell groups.

According to one aspect of the present disclosure, the above method is characterized in that a first-type monitoring capability is adopted in a scheduling cell of any serving cell comprised in the first scheduled cell set, and the first information block is used for indicating the first-type monitoring capability; the first-type monitoring capability is used for determining a time length of the first time window.

According to one aspect of the present disclosure, the above method is characterized in comprising:

receiving a fourth information block;

herein, the first threshold is equal to a largest integer not greater than a first median value, and the second threshold is equal to a largest integer not greater than a second median value; a first parameter is used for determining the first median value and the second median value, and the first parameter is greater than 0; the first parameter is linearly correlated to the target number value, or the first parameter is linearly correlated to a product of the target number value and a first factor, and the fourth information block is used for indicating the first factor.

According to one aspect of the present disclosure, the above method is characterized in comprising:

transmitting a fifth information block;

herein, the fifth information block is used for indicating whether a target factor is equal to the first factor; when the target factor is not equal to the first factor, the target factor is equal to a predefined value; a second parameter is used for determining the first median value and the second median value, the second parameter is equal to a ratio of a target sum value to a characteristic sum value, and the target sum value is not greater than the characteristic sum value; a relation between the target cell and at least one of the W cell groups is used for determining whether the characteristic sum value is related to the target increment value; when the characteristic sum value is related to the target increment value, whether the target cell belongs to the first cell group is used for determining whether the characteristic sum value is linearly correlated to the target increment value or linearly correlated to a product of the target increment value and the target factor; whether the target cell is associated with at least one of the M1 control channel candidates and a relation between the target cell and at least one of the W cell groups is used for determining whether the target sum value is related to the target increment value; when the target sum value is related to the target increment value, whether the target cell belongs to the first cell group is used for determining whether the target sum value is linearly correlated to the target increment value or is linearly correlated to a product of the target increment value and the target factor.

According to one aspect of the present disclosure, the above method is characterized in that all serving cells comprised in the first scheduled cell set belong to a first cell group, the target cell is a primary cell in the first cell group, the first cell group comprises more than one serving cell, and a serving cell other than the target cell comprised in the first cell group is a scheduling cell of the target cell.

According to one aspect of the present disclosure, the above method is characterized in comprising:

transmitting a sixth information block;

herein, the sixth information block is used for indicating at least one of the M1 control channel candidates, the M2 CCEs or a number of control resource set pool(s) in a scheduling cell of the target cell.

The present disclosure provides a first node for wireless communications, comprising:

a first transceiver, receiving a first information block and a second information block, the first information block being used for determining a first scheduled cell set, the first scheduled cell set comprising more than one serving cells, and the second information block being used for determining a target increment value, the target increment value being a non-negative number; and a first receiver, monitoring M1 control channel candidates in a first time window, the M1 control channel candidates occupying M2 CCEs, M1 being a positive integer greater than 1, M2 being a positive integer greater than 1, and the first time window comprising at least one consecutive multicarrier symbol in time domain;

herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

The present disclosure provides a second node for wireless communications, comprising:

a second transceiver, transmitting a first information block and a second information block, the first information block being used for indicating a first scheduled cell set, the first scheduled cell set comprising more than one serving cells, and the second information block being used for indicating a target increment value, and the target increment value being a non-negative number; and a first transmitter, determining M1 control channel candidates in a first time window, the M1 control channel candidates occupying M2 CCEs, M1 being a positive integer greater than 1, M2 being a positive integer greater than 1, and the first time window comprising at least one consecutive multicarrier symbol in time domain;

herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the method in the present disclosure is advantageous in the following aspects:

the method in the present disclosure supports judging a cell group to which a serving cell belongs according to configuration parameters of a scheduling cell of the serving cell instead of configuration parameters of the serving cell itself, thus solving the problem of mismatching of a number of monitored PDCCH candidates and a number of non-overlapped CCEs due to different groups caused by different configuration parameters (such as whether multi-TRP or multi-panel transmission is supported) of a scheduling carrier and a scheduled carrier in cross-carrier scheduling, so that the blocking probability of the PDCCH is reduced and the scheduling performance is improved;

the method in the present disclosure groups the serving cells according to scheduling cells of the serving cells, which ensures consistency of the design, so as to ensure good forward compatibility and leave space for enhancement of future functions;

the method in the present disclosure, when a serving cell is scheduled by multiple serving cells, or when a Pcell supports being scheduled by an Scell, supports the serving cells being grouped according to a number of scheduling cells, which enables that a number of monitored PDCCH candidates and a number of non-overlapped CCEs can match a number of scheduling cells, thus further reducing blocking probability of the PDCCH and improving scheduling capability to improve performance of the whole system;

the method in the present disclosure comprehensively considers multi-antenna capability supported by a serving cell and a capability scheduled by multi-scheduling cell, so that a number of monitored PDCCH candidates and a number of non-overlapped CCEs can be dynamically shared between a scheduling cell supporting multi-antenna scheduling and a scheduling cell supporting cross-carrier scheduling a Pcell, thus optimizing the PDCCH capacity;

the method in the present disclosure groups serving cells supporting being scheduled by multiple serving cells separately, so that a number of monitored PDCCH candidates and a number of non-overlapped CCEs are allocated independently between whether supporting being scheduled by multiple serving cells and whether supporting being scheduled by multi-antenna scheduling cells, thus ensuring independent capacity PDCCH capability allocation and maximizing flexibility of PDCCH capability allocation;

the method in the present disclosure supports that the UE adjusts scaling factors of PDCCH capacity allocation according to its own capability (such as whether an Scell cross-carrier schedules a Pcell is supported), so as to achieve the purpose of comprehensively considering multiple factors and adopting a unified design, thus ensuring scheduling flexibility when reducing complexity of implementation.

In one embodiment, the method in the present disclosure is advantageous in the following aspects:

the method in the present disclosure enables that the network can adjust the proportion of a Pcell scheduled by an Scell in allocated PDCCH candidates and non-overlapped CCEs according to configuration needs, so as to achieve a balance between the blocking probability of PDCCH and the processing capability of UE, thus improving scheduling performance of the PDCCH;

by the method of the present disclosure, when a serving cell groups serving cells according to monitoring capability of the PDCCH (such as whether PDCCH transmission of multi-panel or multi-TRP is supported, or whether PDCCH monitoring based on span is supported), the distribution of PDCCH candidates and non-overlapped CCEs can be calculated according to a group to which the Pcell belongs, which ensures that a number of PDCCH candidates and non-overlapped CCEs allocated under different groups and configuration conditions matches the required number, thus reducing the blocking probability of the PDCCH and improving utilization of PDCCH resources;

the method in the present disclosure avoids the mismatch of PDCCH candidates and non-overlapped CCEs caused by repeat calculation of a serving cell, thus improving transmission performance and scheduling flexibility of the PDCCH;

the method in the present disclosure determines a proportion of PDCCH candidates and non-overlapped CCEs when a number of configured serving cells exceeds the capacity of the UE, which further ensures that a number of the PDCCH candidates and non-overlapped CCEs allocated under different groups and configurations conditions matches the required number, so as to ensure the blocking performance and scheduling performance of the PDCCH.

BRIEF DESCRIPTION OF THE DRAWINGS

Other features, objects and advantages of the present disclosure will become more apparent from the detailed description of non-restrictive embodiments taken in conjunction with the following drawings:

FIG. 1A illustrates a flowchart of a first information block and M1 control channel candidates according to one embodiment of the present disclosure.

FIG. 1B illustrates a flowchart of a first information block, a second information block and M1 control channel candidates according to one embodiment of the present disclosure.

FIG. 2 illustrates a schematic diagram of a network architecture according to one embodiment of the present disclosure.

FIG. 3 illustrates a schematic diagram of a radio protocol architecture of a user plane and a control plane according to one embodiment of the present disclosure.

FIG. 14B illustrates a structure block diagram of a processing device in a first node according to one embodiment of the present disclosure.

FIG. 15A illustrates a schematic diagram of relations among a third parameter, a fourth parameter and a first SCS according to one embodiment of the present disclosure.

FIG. 15B illustrates a structure block diagram of a processing device in second node according to one embodiment of the present disclosure.

FIG. 16A illustrates a schematic diagram of a characteristic cell according to one embodiment of the present disclosure.

FIG. 17A illustrates a schematic diagram of a relation of a first control channel candidate and a second control channel candidate according to one embodiment of the present disclosure.

DESCRIPTION OF THE EMBODIMENTS

Figure 4:
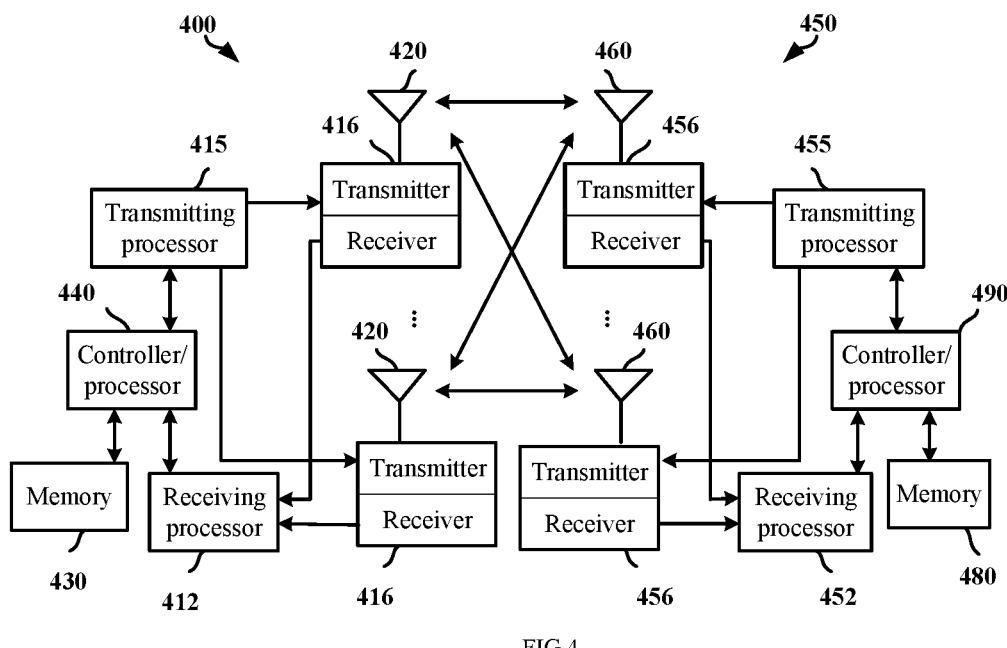
FIG. 4 illustrates a schematic diagram of a first node and a second node according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Embodiment 1A illustrates a flowchart of a first information block and M1 control channel candidates according to one embodiment of the present disclosure, as shown in FIG. 1A. In FIG. 1A, each box represents a step. Particularly, the sequential order of steps in these boxes does not necessarily mean that the steps are chronologically arranged.

In Embodiment 1A, a first node in the present disclosure receives a first information block in step 101A, the first information block is used for determining a scheduled cell set, and the scheduled cell set comprises more than one serving cell; monitors M1 control channel candidates in a first time window in step 102A, the M1 control channel candidates occupy M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the first information block is transmitted via an air interface.

In one embodiment, the first information block is transmitted via a radio interface.

In one embodiment, the first information block comprises all or part of a higher-layer signaling.

In one embodiment, the first information block comprises all or part of a physical-layer signaling.

In one embodiment, the first information block comprises all or part of a Radio Resource Control (RRC) signaling.

In one embodiment, the first information block comprises all or part of a Medium Access Control (MAC) layer signaling.

In one embodiment, the first information block comprises all or part of a System Information Block (SIB).

In one embodiment, the first information block is transmitted through a Physical Downlink Shared Channel (PDSCH).

In one embodiment, the first information block is UE-specific.

In one embodiment, the first information block is configured by Per Serving Cell.

In one embodiment, the first information block comprises all or partial fields of a DCI signaling.

In one embodiment, the above phrase that the first information block is used for determining a scheduled cell set includes the following meaning: the first information block comprises K1 sub-information block(s), K1 is 1 less than a number of serving cell(s) comprised in the scheduled cell set, the K1 sub-information block(s) is(are respectively) used for determining K1 serving cell(s), and any of the K1 serving cell(s) belongs to the scheduled cell set.

In one embodiment, the first information block comprises an Information Element (IE) "CellGroupConfig" in an RRC signaling.

In one embodiment, the first information block comprises a field "sCellToAddModList" in an IE "CellGroupConfig" in an RRC signaling.

In one embodiment, the first information block comprises a field "sCellToReleaseList" in an IE "CellGroupConfig" in an RRC signaling.

In one embodiment, the above phrase that the first information block is used for determining a scheduled cell set includes the following meaning: the first information block comprises K1 sub-information block(s), K1 is 1 less than a number of serving cell(s) comprised in the scheduled cell set, the K1 sub-information block(s) is(are respectively) used for determining K1 serving cell(s), and any of the K1 serving cell(s) belongs to the scheduled cell set, the K1 sub-information block(s) comprises(comprise) an IE "SCell-Config" in an RRC signaling.

In one embodiment, the above phrase that the first information block is used for determining a scheduled cell set includes the following meaning: the first information block is used by the first node in the present disclosure for determining the scheduled cell set.

In one embodiment, the above phrase that the first information block is used for determining a scheduled cell set includes the following meaning: the first information block is used for explicitly indicating the scheduled cell set.

In one embodiment, the above phrase that the first information block is used for determining a scheduled cell set includes the following meaning: the first information block is used for implicitly indicating the scheduled cell set.

In one embodiment, the above phrase that the first information block is used for determining a scheduled cell set includes the following meaning: the first information block is used for indirectly indicating the scheduled cell set.

In one embodiment, the scheduled cell set comprises all serving cells that the first node is configured with.

In one embodiment, the scheduled cell set comprises part of serving cells that the first node is configured with.

In one embodiment, a number of serving cells comprised in the scheduled cell set is equal to 2.

In one embodiment, a number of serving cells comprised in the scheduled cell set is greater than 2.

In one embodiment, a number of serving cells comprised in the scheduled cell set is not greater than 16.

In one embodiment, a number of serving cells comprised in the scheduled cell set is not greater than 32.

In one embodiment, any two serving cells comprised in the scheduled cell set are different.

In one embodiment, each serving cell comprised in the scheduled cell set corresponds to a Component Carrier (CC).

In one embodiment, the scheduled cell set at least comprises a Pcell and an Scell.

In one embodiment, carriers corresponding to any two serving cells comprised in the scheduled cell set are different.

In one embodiment, any serving cell comprised in the scheduled cell set is only scheduled by a scheduling cell.

In one embodiment, a serving cell comprised in the scheduled cell set is scheduled by more than one scheduling cell.

In one embodiment, a Pcell comprised in the scheduled cell set is scheduled by an Scell.

In one embodiment, a Pcell comprised in the scheduled cell set is only self-scheduled.

In one embodiment, a Pcell comprised in the scheduled cell set is self-scheduled and cross-carrier scheduled at the same time.

In one embodiment, all serving cells comprised in the scheduled cell set belong to a same cell group.

In one embodiment, two serving cells comprised in the scheduled cell set belong to different cell groups.

In one embodiment, all serving cells comprised in the scheduled cell set belong to a same Master Cell Group (MCG).

In one embodiment, all serving cells comprised in the scheduled cell set belong to a same Secondary Cell Group (SCG).

In one embodiment, the first time window is a slot.

In one embodiment, the first time window is a slot corresponding to the first SCS.

In one embodiment, the first time window comprises at least one consecutive Orthogonal Frequency Division Multiplexing (OFDM) symbol in time domain.

In one embodiment, the first time window comprises at least one consecutive OFDM symbol in time domain corresponding to the first SCS.

In one embodiment, the first time window is a span.

In one embodiment, the first time window is a span corresponding to the first SCS.

In one embodiment, the first time window is a time interval with a shortest time interval length between earliest OFDM symbols of two PDCCH occasions.

In one embodiment, time-domain resources occupied by any of the M2 CCEs belong to the first time window.

In one embodiment, time-domain resources occupied by any of the M2 CCEs are part of the first time window.

In one embodiment, time-domain resources occupied by any of the M1 control channel candidates are part of the first time window.

In one embodiment, time-domain resources occupied by any of the M1 control channel candidates belong to the first time window.

In one embodiment, monitoring of the M1 control channel candidates is implemented by decoding of the M1 control channel candidates.

In one embodiment, monitoring of the M1 control channel candidates is implemented by blind decoding of the M1 control channel candidates.

In one embodiment, monitoring of the M1 control channel candidates is implemented by decoding and CRC check of the M1 control channel candidates.

In one embodiment, monitoring of the M1 control channel candidates is implemented by decoding and CRC check scrambled by a Radio Network Temporary Identity (RNTI) of the M1 control channel candidates.

In one embodiment, monitoring of the M1 control channel candidates is implemented by decoding of the M1 control channel candidates based on monitored DCI format(s).

In one embodiment, monitoring of the M1 control channel candidates is implemented by decoding of the M1 control channel candidates based on one or more monitored formats of DCI.

In one embodiment, any of the M1 control channel candidates occupies at least one CCE.

In one embodiment, any of the M1 control channel candidates occupies one of 1 CCE, 2 CCEs, 4 CCEs, 8 CCEs, or 16 CCEs.

In one embodiment, any of the M1 control channel candidates occupies at least one Resource Element (RE) in time-frequency domain.

In one embodiment, any of the M1 control channel candidates occupies time-frequency resources in time-frequency domain.

In one embodiment, any of the M1 control channel candidates is a Physical Downlink Control Channel (PDCCH) candidate.

In one embodiment, any of the M1 control channel candidates is a monitored PDCCH candidate.

In one embodiment, any of the M1 control channel candidates is a PDCCH candidate adopting one or more DCI formats.

In one embodiment, any of the M1 control channel candidates is a PDCCH candidate adopting one or more DCI payload sizes.

In one embodiment, any of the M1 control channel candidates is a time-frequency resource set carrying specific DCI with one or more formats.

In one embodiment, the M1 control channel candidates comprise two control channel candidates occupying same time-frequency resources.

In one embodiment, CCEs occupied by any two of the M1 control channel candidates are different.

In one embodiment, there exist CCEs occupied by two of the M1 control channel candidates being the same.

In one embodiment, characteristic attributes of any two of the M1 control channel candidates are different, and the characteristic attributes include at least one of an occupied CCE, adopted scrambling, or a corresponding DCI payload size.

In one embodiment, any of the M2 CCEs is occupied by at least one PDCCH candidate.

In one embodiment, any of the M1 control channel candidates occupies one or more of the M2 CCEs.

In one embodiment, two independent channel estimations are required to be performed on any two of the M2 CCEs.

In one embodiment, channel estimations performed on any two of the M2 CCEs cannot be mutually reused.

In one embodiment, two independent channel equalizations are required to be performed on any two of the M2 CCEs.

In one embodiment, any of the M2 CCEs is a PDCCH CCE.

In one embodiment, any of the M2 CCEs is a Non-Overlapped CCE.

In one embodiment, any two of the M2 CCEs are non-overlapped.

In one embodiment, numbers of time-frequency resource units comprised in any two of the M2 CCEs are the same.

In one embodiment, numbers of REs comprised in any two of the M2 CCEs are the same.

In one embodiment, any of the M2 CCEs comprises 6 Resource Element Groups (REGs).

In one embodiment, any of the M2 CCEs comprises 6 REGs, and each REG comprises 9 REs used for transmitting data modulation symbols and 3 REs used for transmitting Reference Signals (RSs).

In one embodiment, time-frequency resources occupied by any two of the M2 CCEs are orthogonal.

In one embodiment, there exist time-frequency resources occupied by two of the M2 CCEs being Non-Orthogonal.

In one embodiment, there exist time-frequency resources occupied by two of the M2 CCEs being the same.

In one embodiment, time-frequency resources occupied by any two of the M2 CCEs are different.

In one embodiment, any one CCE occupied by the M1 control channel candidates is one of the M2 CCEs.

In one embodiment, there exists a CCE occupied by one of the M1 control channel candidates being a CCE other than the M2 CCEs.

In one embodiment, any of the M2 CCEs is occupied by at least one of the M1 control channel candidates.

In one embodiment, the M2 CCEs comprise all CCEs occupied by any of the M1 control channel candidates.

In one embodiment, an SCS of a subcarrier occupied by any of the M2 CCEs in frequency domain is equal to an SCS configured in active Bandwidth Part (BWP) to which any of the M2 CCEs belongs in frequency domain.

In one embodiment, the M2 CCEs respectively belong to M3 active BWP(s) in frequency domain, and an SCS of a subcarrier comprised in any of the M3 active BWP(s) is equal to the first SCS, M3 being a positive integer.

In one embodiment, any of the M2 CCEs belongs to a sub-band in the first sub-band set in the present disclosure in frequency domain.

In one embodiment, SCSs of any two subcarriers occupied by the M2 CCEs are equal.

In one embodiment, an SCS of a subcarrier occupied by any of the M2 CCEs in frequency domain is equal to the first SCS.

In one embodiment, an SCS of any subcarrier occupied by any of the M2 CCEs in frequency domain is equal to the first SCS.

In one embodiment, the first SCS is measured by Hz.

In one embodiment, the first SCS is measured by kHz.

In one embodiment, the first SCS is equal to one of 15 kHz, 30 kHz, 60 kHZ, 120 kHz or 240 kHz.

In one embodiment, the above phrase that the first SCS is used for determining a time length of the first time window includes the following meaning: the first SCS is used by the first node in the present disclosure for determining a time length of the first time window.

In one embodiment, the above phrase that the first SCS is used for determining a time length of the first time window includes the following meaning: the first time window is a slot, the first SCS is used for determining a number of slots comprised in a subframe, and a time length of the first time window is equal to a ratio of a length of a subframe to a number of slots comprised in a subframe.

In one embodiment, the above phrase that the first SCS is used for determining a time length of the first time window includes the following meaning: the first SCS is used for determining a time length of each OFDM symbol comprised in the first time window.

In one embodiment, the above phrase that the first SCS is used for determining a time length of the first time window includes the following meaning: the first time window is a span, and the first SCS is used for determining a time length of each OFDM symbol comprised in the span.

In one embodiment, the above phrase that the first SCS is used for determining a time length of the first time window includes the following meaning: a configuration index of the first SCS is used for determining a time length of the first time window.

In one embodiment, the above phrase that the first SCS is used for determining a time length of the first time window includes the following meaning: the first SCS is used for determining a time length of the first time window according to a corresponding relation.

In one embodiment, the above phrase that the first SCS is used for determining a time length of the first time window includes the following meaning: the first SCS is used for determining a time length of the first time window according to a table corresponding relation.

In one embodiment, also comprising:

receiving a first synchronization signal;

herein, the first synchronization signal is used for determining a position of the first time window in time domain.

In one embodiment, M1 is less than the first threshold.

In one embodiment, M1 is equal to the first threshold.

In one embodiment, M2 is less than the second threshold.

In one embodiment, M2 is equal to the second threshold.

In one embodiment, the first threshold and the second threshold may or may not be equal.

In one embodiment, the first threshold and the second threshold are independent.

In one embodiment, the first threshold and the second threshold are irrelevant.

In one embodiment, the first threshold and the second threshold are related.

In one embodiment, the first threshold and the second threshold are linearly correlated.

In one embodiment, the first threshold is proportional related to the second threshold.

In one embodiment, the first node in the present disclosure is not required to adopt an active BWP of the first SCS in the first time window to monitor control channel candidates whose number is greater than the first threshold.

In one embodiment, the first node in the present disclosure is not required to adopt an active BWP of the first SCS in the first time window to monitor CCEs whose number is greater than the second threshold.

In one embodiment, the first threshold is greater than 1.

In one embodiment, the second threshold is greater than 1.

In one embodiment, any of the W cell groups comprises a non-negative integer number of serving cell(s).

In one embodiment, there exists one of the W cell groups only comprising one serving cell.

In one embodiment, any of the W cell groups comprises at least one serving cell.

In one embodiment, there exists one of the W cell groups comprising 0 serving cell.

In one embodiment, any serving cell comprised in the scheduled cell set belongs to one of the W cell groups.

In one embodiment, any two of the W cell groups are different.

In one embodiment, there exists no serving cell in the scheduled cell set that belongs to two of the W cell groups at the same time.

In one embodiment, W is equal to 2.

In one embodiment, W is equal to 3.

In one embodiment, W is equal to 4.

In one embodiment, W is greater than 3.

In one embodiment, W is not greater than a number of serving cells comprised in the scheduled cell set.

In one embodiment, the first serving cell can be any serving cell comprised in the scheduled cell set.

In one embodiment, the first serving cell is a given serving cell comprised in the scheduled cell set.

In one embodiment, the first serving cell is a Pcell comprised in the scheduled cell set.

In one embodiment, the first serving cell is an Scell comprised in the scheduled cell set.

In one embodiment, a number of scheduling cell(s) in the first serving cell is equal to 1.

In one embodiment, a number of scheduling cells in the first serving cell is equal to 2.

In one embodiment, a number of scheduling cells in the first serving cell is greater than 1.

In one embodiment, a scheduling cell of the first serving cell is a serving cell carrying a PDCCH scheduling the first serving cell.

In one embodiment, a scheduling cell of the first serving cell is a serving cell carrying a PDCCH scheduling a signal on the first serving cell.

In one embodiment, a PDCCH carried by a scheduling cell of the first serving cell can be used for scheduling the first serving cell.

In one embodiment, a PDCCH carried by a scheduling cell of the first serving cell can be used for scheduling a signal on the first serving cell.

In one embodiment, when the first serving cell and a scheduling cell of the first serving cell are the same, a PDCCH transmitted on the scheduling cell of the first serving cell is used for self-scheduling a signal transmitted on the first serving cell; when the first serving cell and a scheduling cell of the first serving cell are different, a PDCCH transmitted on the scheduling cell of the first serving cell is used for cross-carrier scheduling a signal transmitted on the first serving cell;

In one embodiment, a control resource pool in a scheduling cell of the first serving cell refers to a Control Resource Set (CORESET) pool in a scheduling cell of the first serving cell.

In one embodiment, a control resource pool in a scheduling cell of the first serving cell refers to a Search Space Set (SS set) pool in a scheduling cell of the first serving cell.

In one embodiment, a control resource pool in a scheduling cell of the first serving cell refers to a CORESET in a scheduling cell of the first serving cell.

In one embodiment, a number of control resource pool(s) in a scheduling cell of the first serving cell refers to a number of control resource pool(s) provided in a scheduling cell of the first serving cell.

In one embodiment, a number of control resource pool(s) in a scheduling cell of the first serving cell refers to a number of control resource pool index(es) provided in a scheduling cell of the first serving cell.

In one embodiment, a number of control resource pool(s) in a scheduling cell of the first serving cell refers to a number of CORESET Pool index(es) provided in a scheduling cell of the first serving cell.

In one embodiment, a number of control resource pool(s) in a scheduling cell of the first serving cell refers to a number of SS set pool index(es) provided in a scheduling cell of the first serving cell.

In one embodiment, a number of control resource pool(s) in a scheduling cell of the first serving cell refers to a number of CORESET index(es) provided in a scheduling cell of the first serving cell.

In one embodiment, a number of control resource pool(s) in a scheduling cell of the first serving cell is a positive integer.

In one embodiment, a number of control resource pool(s) in a scheduling cell of the first serving cell is equal to one of H candidate numbers, H being a positive integer greater than 1, any of the H candidate numbers is a positive integer, any two of the H candidate numbers are not equal, the H candidate numbers are predefined, or the H candidate numbers are configurable.

In one embodiment, a number of control resource pool(s) in a scheduling cell of the first serving cell is equal to 1 or 2.

In one embodiment, when a number of control resource pool(s) in a scheduling cell of the first serving cell is equal to 2, an index of a control resource pool in a scheduling cell of the first serving cell is equal to one of "0" or "1".

In one embodiment, when a number of scheduling cells of the first serving cell is greater than 1, a number of control resource pool(s) in a scheduling cell of the first serving cell refers to a number of control resource pool(s) provided in a scheduling cell of the first serving cell.

In one embodiment, when a number of scheduling cells of the first serving cell is greater than 1, a number of control resource pool(s) in the a scheduling cell of the first serving cell refers to a number of control resource pool(s) in a scheduling cell provided with a maximum number of control resource pool(s) in the first serving cell.

In one embodiment, when a number of scheduling cells of the first serving cell is greater than 1, a number of control resource pool(s) in a scheduling cell of the first serving cell refers to a number of control resource pool(s) in a scheduling cell provided with a minimum number of control resource pool(s) in the first serving cell.

In one embodiment, when a number of scheduling cells of the first serving cell is greater than 1, a number of control resource pool(s) in a scheduling cell of the first serving cell refers to a sum value of a number of control resource pool(s) provided in all scheduling cells in the first serving cell.

In one embodiment, when a number of scheduling cells of the first serving cell is greater than 1, a number of control resource pool(s) in a scheduling cell of the first serving cell refers to a value of a number of control resource pool(s) provided in all scheduling cells in the first serving cell obtained after operation.

In one embodiment, the above phrase that a number of control resource pool(s) in a scheduling cell of the first serving cell is used for determining a cell group to which the first serving cell belongs out of the W cell groups includes the following meaning: a number of control resource pool(s) in a scheduling cell of the first serving cell is used by the first node in the present disclosure for determining a cell group to which the first serving cell belongs out of the W cell groups.

In one embodiment, the above phrase that a number of control resource pool(s) in a scheduling cell of the first serving cell is used for determining a cell group to which the first serving cell belongs out of the W cell groups includes the following meaning: a number of control resource pool(s) in a scheduling cell of the first serving cell is used for determining a cell group to which the first serving cell belongs out of the W cell groups according to a given judging condition.

In one embodiment, the above phrase that a number of control resource pool(s) in a scheduling cell of the first serving cell is used for determining a cell group to which the first serving cell belongs out of the W cell groups includes the following meaning: a number of control resource pool(s) in a scheduling cell of the first serving cell is used for determining a cell group to which the first serving cell belongs out of the W cell groups according to a given mapping relation.

In one embodiment, the above phrase that a number of control resource pool(s) in a scheduling cell of the first serving cell is used for determining a cell group to which the first serving cell belongs out of the W cell groups is implemented by claim 2 in the present disclosure.

In one embodiment, the above phrase that a number of control resource pool(s) in a scheduling cell of the first serving cell is used for determining a cell group to which the first serving cell belongs out of the W cell groups is implemented by claim 3 in the present disclosure.

In one embodiment, the above phrase that a number of control resource pool(s) in a scheduling cell of the first serving cell is used for determining a cell group to which the first serving cell belongs out of the W cell groups is implemented by claim 4 in the present disclosure.

In one embodiment, the above phrase that a number of control resource pool(s) in a scheduling cell of the first serving cell is used for determining a cell group to which the first serving cell belongs out of the W cell groups is implemented by claim 5 in the present disclosure.

In one embodiment, any of the W number values is a non-negative integer.

In one embodiment, any of the W number values is a positive integer.

In one embodiment, there exists one of the W number values greater than 0.

In one embodiment, there exists one of the W number values equal to 0.

In one embodiment, there exist two of the W number values being equal.

In one embodiment, any two of the W number values are not equal.

In one embodiment, any two of the W number values are independent.

In one embodiment, any two of the W number values are unrelated.

In one embodiment, the above phrase that W number values are equal to numbers of serving cells associated with at least one of the M1 control channel candidates comprised respectively in the W cell groups includes the following meaning: the target cell group is one of the W cell groups, a target number value is one of the W number values, and a number of serving cell(s) associated with at least one of the M1 control channel candidates in the target cell group is equal to the target number value.

In one embodiment, the above phrase that W number values are equal to numbers of serving cells associated with at least one of the M1 control channel candidates comprised respectively in the W cell groups includes the following meaning: the W number values respectively correspond to the W cell groups, a target number value is one of the W number values, and a number of serving cell(s) associated with at least one of the M1 control channel candidates in a cell group corresponding to the target number value is equal to the target number value.

In one embodiment, the above phrase that W number values are equal to numbers of serving cells associated with at least one of the M1 control channel candidates comprised respectively in the W cell groups includes the following meaning: the W cell groups respectively comprise W cell subgroups, the W number values are equal to numbers of serving cells comprised respectively in the W cell subgroups, and any of the W cell subgroups comprises a non-negative integer number of serving cell(s); any serving cell comprised in any of the W cell subgroups is associated with at least one of the M1 control channel candidates.

In one embodiment, the W number values respectively correspond to the W cell groups.

In one embodiment, the target factor is not less than 1.

In one embodiment, the target factor may be less than 1.

In one embodiment, the target factor is not greater than 2.

In one embodiment, the target factor is a positive integer.

In one embodiment, the target factor may not be an integer.

In one embodiment, the target factor may be greater than 2.

In one embodiment, the target factor is not greater than 4.

In one embodiment, the target factor is equal to one of 1 or 2.

In one embodiment, the above phrase that the W number values and a target factor are used together for determining the first threshold and the second threshold includes the following meaning: the W number values and a target factor are used together by the first node in the present disclosure for determining the first threshold and the second threshold.

In one embodiment, the above phrase that the W number values and a target factor are used together for determining the first threshold and the second threshold includes the following meaning: the W number values and a target factor are used for determining the first threshold and the second threshold according to operation functions given respectively.

In one embodiment, the above phrase that the W number values and a target factor are used together for determining the first threshold and the second threshold includes the following meaning: the W number values and a target factor are used for determining the first threshold and the second threshold according to mapping relations given respectively.

In one embodiment, the above phrase that the W number values and a target factor are used together for determining the first threshold and the second threshold includes the following meaning: a product of a sum of W1 number value(s) in the W number values and the target factor is equal to a first product, a sum of number value(s) other than the W1 number value(s) in the W number values and the first product is equal to a first sum value, the first threshold is directly proportional to the first sum value, and the second threshold is directly proportional to the first sum value; W1 is less than W, and W1 is a non-negative integer.

In one embodiment, the above phrase that the W number values and a target factor are used together for determining the first threshold and the second threshold is implemented by claim 8 in the present disclosure.

In one embodiment, the above phrase that the W number values and a target factor are used together for determining the first threshold and the second threshold is implemented by claim 9 in the present disclosure.

In one embodiment, the above phrase that the W number values and a target factor are used together for determining the first threshold and the second threshold is implemented by claim 10 in the present disclosure.

In one embodiment, the above phrase that the W number values and a target factor are used together for determining the first threshold and the second threshold includes the following meaning: the W number values and the target factor are used for determining the first parameter in the present disclosure, and the first parameter is used for determining the first threshold and the second threshold.

In one embodiment, a number of OFDM symbols comprised in the first time window is used for determining a cell group to which the first serving cell belongs out of the W cell groups.

Embodiment 1B

Embodiment 1B illustrates a flowchart of a first information block, a second information block and M1 control channel candidates according to one embodiment of the present disclosure, as shown in FIG. 1B. In FIG. 1B, each box represents a step. Particularly, the sequential order of steps in these boxes does not necessarily mean that the steps are chronologically arranged.

In Embodiment 1B, a first node in the present disclosure receives a first information block and a second information block in step 101B, the first information block is used for determining a first scheduled cell set, the first scheduled cell set comprises more than one serving cell, and the second information block is used for determining a target increment value, the target increment value being a non-negative number; the first node in the present disclosure monitors M1 control channel candidates in a first time window in step 102B, the M1 control channel candidates occupy M2 CCEs, M1 being a positive integer greater than 1, M2 being a positive integer greater than 1, and the first time window comprises at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the first information block is transmitted via an air interface.

In one embodiment, the first information block is transmitted via a radio interface.

In one embodiment, the first information block comprises all or part of a higher-layer signaling.

In one embodiment, the first information block comprises all or part of a physical-layer signaling.

In one embodiment, the first information block comprises all or part of an RRC signaling.

In one embodiment, the first information block comprises all or part of a MAC layer signaling.

In one embodiment, the first information block is transmitted through a PDSCH.

In one embodiment, the first information block is UE-specific.

In one embodiment, the first information block is configured by Per Serving Cell.

In one embodiment, the first information block comprises all or partial fields of a DCI signaling.

In one embodiment, the above phrase that the first information block is used for determining a first scheduled cell set includes the following meaning: the first information block comprises K1 sub-information block(s), K1 is 1 less than a number of serving cell(s) comprised in the first scheduled cell set, the K1 sub-information block(s) is(are respectively) used for determining K1 serving cell(s), and any of the K1 serving cell(s) belongs(belong) to the first scheduled cell set.

In one embodiment, the first information block comprises an IE "CellGroupConfig" in an RRC signaling.

In one embodiment, the first information block comprises a field "sCellToAddModList" in an IE "CellGroupConfig" in an RRC signaling.

In one embodiment, the first information block comprises a field "sCellToReleaseList" in an IE "CellGroupConfig" in an RRC signaling.

In one embodiment, the above phrase that the first information block is used for determining a first scheduled cell set includes the following meaning: the first information block comprises K1 sub-information block(s), K1 is 1 less than a number of serving cell(s) comprised in the first scheduled cell set, the K1 sub-information block(s) is(are respectively) used for determining K1 serving cell(s), and any of the K1 serving cell(s) belongs to the first scheduled cell set, the K1 sub-information block(s) comprises(comprise) an IE "SCellConfig" in an RRC signaling.

In one embodiment, the above phrase that the first information block is used for determining a first scheduled cell set includes the following meaning: the first information block is used by the first node in the present disclosure for determining the first scheduled cell set.

In one embodiment, the above phrase that the first information block is used for determining a first scheduled cell set includes the following meaning: the first information block is used for explicitly indicating the first scheduled cell set.

In one embodiment, the above phrase that the first information block is used for determining a first scheduled cell set includes the following meaning: the first information block is used for implicitly indicating the first scheduled cell set.

In one embodiment, the above phrase that the first information block is used for determining a first scheduled cell set includes the following meaning: the first information block is used for indirectly indicating the first scheduled cell set.

In one embodiment, the above phrase that the first infor-
mation block is used for determining a first scheduled cell
set includes the following meaning: the first-type monitoring
capability in the present disclosure is adopted by a sched-
uling cell of any serving cell comprised in the scheduled cell
set, and the first information block is used for indicating the
first-type monitoring capability.

In one embodiment, the above phrase that the first infor-
mation block is used for determining a first scheduled cell
set includes the following meaning: any serving cell com-
prised in the first scheduled cell set belongs to a configura-
tion cell set, the configuration cell set comprises at least one
serving cell, and a number of serving cell(s) comprised in
the configuration cell set is not less than a number of serving
cell(s) comprised in the first scheduled cell set; the first
information block indicates a monitoring capability adopted
by each serving cell comprised in the configuration cell set,
and a monitoring capability adopted by each serving cell
comprised in the configuration cell set is one of the first-type
monitoring capability or a second-type monitoring capabil-
ity in the present disclosure, and the second-type monitoring
capability is different from the first-type monitoring capa-
bility; serving cell(s) adopting the first-type monitoring
capability comprised in the configuration cell set consists
(consist) of the first scheduled cell set.

In one embodiment, the second information block is
transmitted via an air interface.

In one embodiment, the second information block is
transmitted via a radio interface.

In one embodiment, the second information block com-
prises all or part of a higher-layer signaling.

In one embodiment, the second information block com-
prises all or part of a physical-layer signaling.

In one embodiment, the second information block com-
prises all or part of an RRC signaling.

In one embodiment, the second information block com-
prises all or part of a MAC layer signaling.

In one embodiment, the second information block is
transmitted through a PDSCH.

In one embodiment, the second information block is
UE-specific.

In one embodiment, the second information block is
configured by Per Serving Cell.

In one embodiment, the second information block com-
prises all or partial fields of a DCI signaling.

In one embodiment, the above phrase that the second
information block is used for determining a target increment
value includes the following meaning: the second informa-
tion block is used by the first node in the present disclosure
for determining the target increment value.

In one embodiment, the above phrase that the second
information block is used for determining a target increment
value includes the following meaning: the second informa-
tion block is used for explicitly indicating the target incre-
ment value.

In one embodiment, the above phrase that the second
information block is used for determining a target increment
value includes the following meaning: the second informa-
tion block is used for implicitly indicating the target incre-
ment value.

In one embodiment, the above phrase that the second
information block is used for determining a target increment
value includes the following meaning: the second informa-
tion block is used for indirectly indicating the target incre-
ment value.

In one embodiment, the above phrase that the second
information block is used for determining a target increment value includes the following meaning: the second informa-
tion block indicates whether more than one serving cell is
supported to schedule the target cell; when more than one
serving cell schedules the target cell, the target increment
value is greater than 0; and when only one serving cell
schedules the target cell, the target increment value is equal
to 0.

In one embodiment, the above phrase that the second
information block is used for determining a target increment
value includes the following meaning: the second informa-
tion block indicates whether an Scell scheduling the target
cell is supported; when an Scell scheduling the target cell is
supported, the target increment value is greater than 0; when
an Scell scheduling the target cell is not supported, the target
increment value is equal to 0.

In one embodiment, the above phrase that the second
information block is used for determining a target increment
value includes the following meaning: the second informa-
tion block indicates whether a serving cell other than the
target cell scheduling the target cell is supported; when a
serving cell other than the target cell scheduling the target
cell is supported, the target increment value is greater than
0; when a serving cell other than the target cell scheduling
the target cell is not supported, the target increment value is
equal to 0.

In one embodiment, the above phrase that the second
information block is used for determining a target increment
value includes the following meaning: the second informa-
tion block indicates whether a serving cell other than the
target cell scheduling the target cell is supported; when a
serving cell other than the target cell scheduling the target
cell is supported, the target increment value is greater than
0; and when a serving cell other than the target cell sched-
uling the target cell is not supported, the target increment
value is equal to 0.

In one embodiment, the above phrase that the second
information block is used for determining a target increment
value includes the following meaning: the second informa-
tion block indicates whether the target cell supports being
cross-carrier scheduled; when the target cell supports being
cross-carrier scheduled, the target increment value is greater
than 0; and when the target cell only supports being self-
scheduled, the target increment value is equal to 0.

In one embodiment, the above phrase that the second
information block is used for determining a target increment
value includes the following meaning: the second informa-
tion block indicates configuration of a search space set (SS
set) used for scheduling the target cell; and configuration of
an SS set used for scheduling the target cell is used for
determining the target increment value.

In one embodiment, the above phrase that the second
information block is used for determining a target increment
value includes the following meaning: the second informa-
tion block indicates a type of an SS set used for scheduling
the target cell on the target cell; a type of an SS set used for
scheduling the target cell on the target cell is used for
determining the target increment value.

In one embodiment, the above phrase that the second
information block is used for determining a target increment
value includes the following meaning: the second informa-
tion block indicates a type of an SS set used for scheduling
the target cell on the target cell; when the SS set used for
scheduling the target cell on the target cell comprises a
UE-Specific Search Space set (USS), the target increment
value is greater than 0; when an SS set used for scheduling the target cell on the target cell only comprises a Common Search Space set (CSS), the target increment value is equal to 0.

In one embodiment, the above phrase that the second information block is used for determining a target increment value includes the following meaning: the second information block indicates a format of DCI used for scheduling the target cell monitored on the target cell; and a format of DCI used for scheduling the target cell monitored on the target cell is used for determining the target increment.

In one embodiment, the above phrase that the second information block is used for determining a target increment value includes the following meaning: the second information block indicates a type of a search space and a format of DCI that can be used for scheduling the target cell monitored on the target cell; and a type of a search space and a format of DCI that can be used for scheduling the target cell monitored on the target cell can be used for determining the target increment.

In one embodiment, the above phrase that the second information block is used for determining a target increment value includes the following meaning: the second information is used for determining whether the target increment value is equal to or greater than 0.

In one embodiment, the above phrase that the second information block is used for determining a target increment value includes the following meaning: the second information is used for determining whether the target increment value is equal to 0 or 1.

In one embodiment, the above phrase that the second information block is used for determining a target increment value includes the following meaning: the second information is used for determining whether the target increment value is equal to 0 or 0.5.

In one embodiment, the first scheduled cell set comprises all serving cells configured in the first node.

In one embodiment, the first scheduled cell set comprises part of serving cells configured in the first node.

In one embodiment, any serving cell comprised in the first scheduled cell set is an activated cell.

In one embodiment, a serving cell comprised in the first scheduled cell set is a deactivated cell.

In one embodiment, a number of serving cells comprised in the first scheduled cell set is equal to 2.

In one embodiment, a number of serving cells comprised in the first scheduled cell set is greater than 2.

In one embodiment, a number of serving cells comprised in the first scheduled cell set is not greater than 16.

In one embodiment, any two serving cells comprised in the first scheduled cell set are different.

In one embodiment, any serving cell comprised in the first scheduled cell set corresponds to a CC.

In one embodiment, the first scheduled cell set at least comprises a Pcell and an Scell.

In one embodiment, CCs corresponding to any two serving cells comprised in the first scheduled cell set are different.

In one embodiment, any serving cell comprised in the first scheduled cell set is only scheduled by a scheduling cell.

In one embodiment, a serving cell comprised in the first scheduled cell set is scheduled by more than one scheduling cell.

In one embodiment, a Pcell comprised in the first scheduled cell set is scheduled by an Scell.

In one embodiment, a Pcell comprised in the first scheduled cell set is only self-scheduled.

In one embodiment, a Pcell comprised in the first scheduled cell set is self-scheduled and cross-carrier scheduled at the same time.

In one embodiment, all serving cells comprised in the first scheduled cell set belong to a same Cell Group.

In one embodiment, two serving cells comprised in the first scheduled cell set belong to different cell groups.

In one embodiment, all serving cells comprised in the first scheduled cell set belong to an MCG.

In one embodiment, all serving cells comprised in the first scheduled cell set belong to an SCG.

In one embodiment, the target increment value is equal to one of 0 or 1.

In one embodiment, the target increment value is equal to 0 or a rational number between 0 and 1.

In one embodiment, the target increment value is not greater than 1.

In one embodiment, the target increment value may be greater than 1.

In one embodiment, the target increment value is equal to a non-negative integer not greater than L1, and L1 is equal to a number of scheduling cell(s) of the target cell.

In one embodiment, the target increment value is equal to 0 or a positive number not greater than 1.

In one embodiment, the first time window is time-domain resources occupied by a span.

In one embodiment, the first time window is time-domain resources occupied by an aligned span.

In one embodiment, any multi-carrier symbol comprised in the first time window is an OFDM symbol.

In one embodiment, any multi-carrier symbol comprised in the first time window is a Discrete Fourier Transform-Spread Orthogonal Frequency Division Multiplexing (DFT-s-OFDM) symbol.

In one embodiment, a number of multi-carrier symbol(s) comprised in the first time window is equal to 1.

In one embodiment, a number of multi-carrier symbols comprised in the first time window is greater than 1.

In one embodiment, a number of multi-carrier symbols comprised in the first time window is equal to one of 2 or 3.

In one embodiment, a number of multi-carrier symbol(s) comprised in the first time window is equal to one of 1, 2 or 3.

In one embodiment, a number of multi-carrier symbol(s) comprised in the first time window is less than 14.

In one embodiment, a number of multi-carrier symbol(s) comprised in the first time window is less than 12.

In one embodiment, a number of multi-carrier symbols comprised in the first time window is equal to one of 2, 4, or 7.

In one embodiment, the first time window is a slot.

In one embodiment, the first time window is a time interval with a shortest time interval length between earliest OFDM symbols in two PDCCH occasions.

In one embodiment, a number of symbol(s) comprised in the first time window is equal to one of positive integer(s) comprised in a combination.

In one embodiment, time-domain resources occupied by any of the M1 control channel candidates are part of the first time window.

In one embodiment, time-domain resources occupied by any of the M1 control channel candidates belong to the first time window.

In one embodiment, monitoring of the M1 control channel candidates is implemented by decoding of the M1 control channel candidates.

In one embodiment, monitoring of the M1 control channel candidates is implemented by blind decoding of the M1 control channel candidates.

In one embodiment, monitoring of the M1 control channel candidates is implemented by decoding and CRC check of the M1 control channel candidates.

In one embodiment, monitoring of the M1 control channel candidates is implemented by decoding and CRC check scrambled by a Radio Network Temporary Identity (RNTI) of the M1 control channel candidates.

In one embodiment, monitoring of the M1 control channel candidates is implemented by decoding of the M1 control channel candidates based on monitored one or more formats of DCI.

In one embodiment, any of the M1 control channel candidates occupies at least one CCE.

In one embodiment, any of the M1 control channel candidates occupies one of 1 CCE, 2 CCEs, 4 CCEs, 8 CCEs, or 16 CCEs.

In one embodiment, any of the M1 control channel candidates occupies at least one RE in time-frequency domain.

In one embodiment, any of the M1 control channel candidates occupies time-frequency resources in time-frequency domain.

In one embodiment, any of the M1 control channel candidates is a PDCCH candidate.

In one embodiment, any of the M1 control channel candidates is a monitored PDCCH candidate.

In one embodiment, any of the M1 control channel candidates is a PDCCH candidate adopting one or more DCI formats.

In one embodiment, any of the M1 control channel candidates is a PDCCH candidate adopting one or more DCI payload sizes.

In one embodiment, any of the M1 control channel candidates is a time-frequency resource set carrying specific DCI with one or more formats.

In one embodiment, the M1 control channel candidates comprise two control channel candidates occupying same time-frequency resources.

In one embodiment, CCEs occupied by any two of the M1 control channel candidates are different.

In one embodiment, there exist CCEs occupied by two of the M1 control channel candidates being the same.

In one embodiment, characteristic attributes of any two of the M1 control channel candidates are different, and the characteristic attributes include at least one of an occupied CCE, adopted scrambling, or a corresponding DCI payload size.

In one embodiment, any of the M2 CCEs is occupied by at least one PDCCH candidate.

In one embodiment, any of the M1 control channel candidates occupies one or more of the M2 CCEs.

In one embodiment, two independent channel estimations are required to be performed on any two of the M2 CCEs.

In one embodiment, channel estimations performed on any two of the M2 CCEs cannot be mutually reused.

In one embodiment, two independent channel equalizations are required to be performed on any two of the M2 CCEs.

In one embodiment, any of the M2 CCEs is a PDCCH CCE.

In one embodiment, any of the M2 CCEs is a Non-Overlapped CCE.

In one embodiment, any two of the M2 CCEs are non-overlapped.

In one embodiment, numbers of time-frequency resource units comprised in any two of the M2 CCEs are the same.

In one embodiment, numbers of REs comprised in any two of the M2 CCEs are the same.

In one embodiment, any of the M2 CCEs comprises 6 REGs.

In one embodiment, any of the M2 CCEs comprises 6 REGs, and each REG comprises 9 REs used for transmitting data modulation symbols and 3 REs used for transmitting Reference Signals (RSs).

In one embodiment, time-frequency resources occupied by any two of the M2 CCEs are orthogonal.

In one embodiment, there exist time-frequency resources occupied by two of the M2 CCEs being Non-Orthogonal.

In one embodiment, there exist time-frequency resources occupied by two of the M2 CCEs being the same.

In one embodiment, time-frequency resources occupied by any two of the M2 CCEs are different.

In one embodiment, any CCE occupied by the M1 control channel candidates is one of the M2 CCEs.

In one embodiment, there exists a CCE occupied by one of the M1 control channel candidates being a CCE other than the M2 CCEs.

In one embodiment, any of the M2 CCEs is occupied by at least one of the M1 control channel candidates.

In one embodiment, the M2 CCEs comprise all CCEs occupied by any of the M1 control channel candidates.

In one embodiment, an SCS of a subcarrier occupied by any of the M2 CCEs in frequency domain is equal to an SCS configured in active BWP to which any of the M2 CCEs belongs in frequency domain.

In one embodiment, the M2 CCEs respectively belong to M3 active BWPs in frequency domain, and an SCS of a subcarrier comprised in any of the M3 active BWPs is equal to the first SCS, M3 being a positive integer.

In one embodiment, any of the M2 CCEs belongs to a sub-band in the first sub-band set in the present disclosure in frequency domain.

In one embodiment, SCSs of any two subcarriers occupied by the M2 CCEs are equal.

In one embodiment, an SCS of a subcarrier occupied by any of the M2 CCEs in frequency domain is equal to the first SCS.

In one embodiment, any SCS of a subcarrier occupied by any of the M2 CCEs in frequency domain is equal to the first SCS.

In one embodiment, a first CCE is one of the M2 CCEs, and a second CCE is a CCE other than the first CCE among the M2 CCEs; the first CCE and the second CCE respectively belong to different CORESETs, or a control channel candidate occupying the first CCE and a control channel candidate occupying the second CCE respectively start from different symbols in time domain.

In one embodiment, any two of the M2 CCEs respectively belong to different CORESETs or respectively start from different symbols in time domain.

In one embodiment, a first control channel candidate is one of the M1 control channel candidates, and a second control channel candidate is a control channel candidate other than the first control channel candidate among the M1 control channel candidates; CCEs occupied by the first control channel candidate are different from CCEs occupied by the second control channel candidate, or scrambling used by the first control channel candidate is different from scrambling used by the second control channel candidate, or a payload size of a DCI format corresponding to the first control channel candidate is different from a payload size of a DCI format corresponding to the second control channel candidate.

In one embodiment, CCEs occupied by any two of the M1 control channel candidates are different, or used scrambling is different, or payload sizes of corresponding DCI formats are different.

In one embodiment, the first SCS is measured by Hz.

In one embodiment, the first SCS is measured by kHz.

In one embodiment, the first SCS is equal to one of 15 kHz, 30 kHz, 60 kHZ, 120 kHz or 240 kHz.

In one embodiment, when the first time window comprises more than one multi-carrier symbol, time lengths of any two multi-carrier symbols comprised in the first time window are equal.

In one embodiment, when the first time window comprises more than one multi-carrier symbol, time lengths of two multi-carrier symbols comprised in the first time window are unequal.

In one embodiment, the above phrase that the first SCS is used for determining a time length of a multi-carrier symbol comprised in the first time window includes the following meaning: the first SCS is used by the first node in the present disclosure for determining a time length of a multi-carrier symbol comprised in the first time window.

In one embodiment, the above phrase that the first SCS is used for determining a time length of a multi-carrier symbol comprised in the first time window includes the following meaning: the first SCS is used for determining a time length of any multi-carrier symbol comprised in the first time window.

In one embodiment, the above phrase that the first SCS is used for determining a time length of a multi-carrier symbol comprised in the first time window includes the following meaning: the first SCS is used for determining a time length of any multi-carrier symbol comprised in the first time window according to a mapping relation.

In one embodiment, the above phrase that the first SCS is used for determining a time length of a multi-carrier symbol comprised in the first time window includes the following meaning: the first SCS is used for determining a number of multi-carrier symbol(s) comprised in a subframe to which the first time window belongs, and a number of multi-carrier symbol(s) comprised in a subframe to which the first time window belongs is used for determining a time length of a multi-carrier symbol comprised in the first time window.

In one embodiment, the above phrase that the first SCS is used for determining a time length of a multi-carrier symbol comprised in the first time window includes the following meaning: the first SCS is used for determining a number of slot(s) comprised in a subframe to which the first time window belongs, and a number of slot(s) comprised in a subframe to which the first time window belongs is used for determining a time length of a multi-carrier symbol comprised in the first time window.

In one embodiment, the above phrase that the first SCS is used for determining a time length of a multi-carrier symbol comprised in the first time window includes the following meaning: a configuration index of the first SCS is used for determining a time length of any multi-carrier symbol comprised in the first time window.

In one embodiment, also comprising:

receiving a first synchronization signal;

herein, the first synchronization signal is used for determining a position of the first time window in time domain.

In one embodiment, also comprising:

receiving a first synchronization signal;

herein, the first synchronization signal is used for determining a timing of the first time window.

In one embodiment, the first threshold and the second threshold may or may not be equal.

In one embodiment, the first threshold and the second threshold are independent.

In one embodiment, the first threshold and the second threshold are unrelated.

In one embodiment, the first threshold and the second threshold are related.

In one embodiment, the first threshold and the second threshold are linearly correlated.

In one embodiment, the first threshold is proportional related to the second threshold.

In one embodiment, the first node in the present disclosure is not required to monitor control channel candidates whose number is greater than the first threshold in an active BWP adopting the first SCS in the first time window.

In one embodiment, the first node in the present disclosure is not required to monitor CCEs whose number is greater than the second threshold in an active BWP adopting the first SCS in the first time window.

In one embodiment, the first threshold is greater than 1.

In one embodiment, the second threshold is greater than 1.

In one embodiment, the first threshold is equal to 1.

In one embodiment, the second threshold is equal to 1.

In one embodiment, W is equal to 2.

In one embodiment, W is equal to 3.

In one embodiment, W is greater than 2.

In one embodiment, any serving cell comprised in any cell in the W cell groups belongs to the first scheduled cell set.

In one embodiment, the first scheduled cell set only comprises the W cell groups.

In one embodiment, the first scheduled cell set also comprises a serving cell other than serving cell(s) comprised in the W cell groups.

In one embodiment, any serving cell comprised in the first scheduled cell set belongs to at least one of the W cell groups.

In one embodiment, there exists a serving cell comprised in the first scheduled cell set that does not belong to any of the W cell groups.

In one embodiment, the first scheduled cell set comprises a cell group other than the W cell groups.

In one embodiment, any two of the W cell groups are different.

In one embodiment, any two of the W cell groups comprise different serving cells.

In one embodiment, there exists a serving cell belonging to two of the W cell groups at the same time.

In one embodiment, there does not exit a serving cell belonging to two of the W cell groups at the same time.

In one embodiment, there exist two of the W cell groups comprising a same serving cell.

In one embodiment, there does not exist serving cells comprised in two of the W cell groups being the same.

In one embodiment, the target cell can be any serving cell comprised in the first scheduled cell set.

In one embodiment, the target cell is a given serving cell comprised in the first scheduled cell set.

In one embodiment, the target cell is a Pcell comprised in the first scheduled cell set.

In one embodiment, the target cell is an Scell comprised in the first scheduled cell set.

In one embodiment, a number of scheduling cell(s) in the targe cell is equal to 1.

In one embodiment, a number of scheduling cell(s) in the targe cell is equal to 2.

In one embodiment, a number of scheduling cell(s) in the targe cell is greater than 2.

In one embodiment, a number of CORESET Pool(s) provided in any serving cell comprised in the first cell group is equal to 1.

In one embodiment, a number of CORESET Pool Index(es) provided in any serving cell comprised in the first cell group is equal to 1 or no CORESET Pool Index is provided.

In one embodiment, a number of CORESET Pool(s) provided in a scheduling cell of any serving cell comprised in the first cell group is equal to 1.

In one embodiment, a number of CORESET Pool Index(es) provided in a scheduling cell of any serving cell comprised in the first cell group is equal to 1 or no CORESET Pool Index is provided.

In one embodiment, the first cell group comprises all serving cells whose number of provided CORESET Pool Index(es) is equal to 1 or in which no CORESET Pool Index is provided in the first scheduled set.

In one embodiment, the first cell group comprises part of serving cells whose number of provided CORESET Pool Index(es) is equal to 1 or in which no CORESET Pool Index is provided in the first scheduled set.

In one embodiment, the first cell group comprises all serving cells whose number of CORESET Pool Index(es) provided in a scheduling cell is equal to 1 or in which no CORESET Pool Index is provided in the first scheduled set.

In one embodiment, the first cell group comprises part of serving cells whose number of CORESET Pool Index(es) provided in a scheduling cell is equal to 1 or in which no CORESET Pool Index is provided in the first scheduled set.

In one embodiment, the target number value is a positive integer.

In one embodiment, the target number value is not less than 1.

In one embodiment, the target number value may be a non-integer.

In one embodiment, the target number value may be a decimal.

In one embodiment, the above phrase that a target number value is used for determining the first threshold and the second threshold includes the following meaning: the target number value is used by the first node in the present disclosure for determining the first threshold and the second threshold.

In one embodiment, the above phrase that a target number value is used for determining the first threshold and the second threshold includes the following meaning: the target number value is used for determining the first threshold and the second threshold according to an operation rule.

In one embodiment, the above phrase that a target number value is used for determining the first threshold and the second threshold includes the following meaning: the target number value is used for determining the first threshold and the second threshold according to an operation function.

In one embodiment, the above phrase that a target number value is used for determining the first threshold and the second threshold is implemented by claim 7 in the present disclosure.

In one embodiment, the above phrase that a target number value is used for determining the first threshold and the second threshold includes the following meaning: the first threshold is directly proportional to the target number value, and the second threshold is directly proportional to the target number value.

In one embodiment, the above phrase that a target number value is used for determining the first threshold and the second threshold includes the following meaning: the first threshold value is linearly correlated to the target number value, and the second threshold value is linearly correlated to the target number value.

In one embodiment, the above phrase that a number of serving cell(s) comprised in the first cell group is used for determining the target number value includes the following meaning: a number of serving cell(s) comprised in the first cell group is used by the first node in the present disclosure for determining the target number value.

In one embodiment, the above phrase that a number of serving cell(s) comprised in the first cell group is used for determining the target number value includes the following meaning: the target number value is equal to a number of serving cell(s) comprised in the first cell group.

In one embodiment, the above phrase that a number of serving cell(s) comprised in the first cell group is used for determining the target number value includes the following meaning: the target number value is equal to a sum of a number of serving cell(s) comprised in the first cell group and the target increment value.

In one embodiment, the above phrase that a number of serving cell(s) comprised in the first cell group is used for determining the target number value includes the following meaning: the target number value is linearly correlated to a number of serving cell(s) comprised in the first cell group.

In one embodiment, the above phrase that a number of serving cell(s) comprised in the first cell group is used for determining the target number value includes the following meaning: the target number value is linearly correlated to a product of a number of serving cell(s) comprised in the first serving cell and the first factor.

In one embodiment, the above phrase that a number of serving cell(s) comprised in the first cell group is used for determining the target number value includes the following meaning: the target number value is equal to a number of serving cell(s) comprised in the first scheduled cell set.

In one embodiment, the above phrase that a number of serving cell(s) comprised in the first cell group is used for determining the target number value includes the following meaning: a number of serving cell(s) comprised in the first cell group is used for determining the target number value according to an operation rule.

In one embodiment, the above phrase that a number of serving cell(s) comprised in the first cell group is used for determining the target number value includes the following meaning: a number of serving cell(s) comprised in the first cell group is used for determining the target number value according to an operation function.

In one embodiment, a relation of the target cell and at least one of the W cell groups refers to an ownership of the target cell and at least one of the W cell groups.

In one embodiment, a relation of the target cell and at least one of the W cell groups refers to at least one of the W cell groups to which the target cell belongs.

In one embodiment, a relation of the target cell and at least one of the W cell groups refers to a number of cell groups in the W cell groups to which the target cell belongs.

In one embodiment, a relation of the target cell and at least one of the W cell groups refers to whether the target cell belongs to the first cell group and whether the target cell belongs to a cell group other than the first cell group in the W cell groups when the target cell belongs to the first cell group.

In one embodiment, a relation of the target cell and at least one of the W cell groups refers to whether the target cell belongs to the first cell group.

In one embodiment, a relation of the target cell and at least one of the W cell groups refers to whether the target cell belongs to the first cell group and a number of cell group(s) to which the target cell belongs in the W cell groups.

In one embodiment, the above phrase that a relation between the target cell and at least one of the W cell groups is used for determining whether the target number value is related to the target increment value is implemented by claim 2 in the present disclosure.

In one embodiment, the above phrase that a relation between the target cell and at least one of the W cell groups is used for determining whether the target number value is related to the target increment value is implemented by claim 3 in the present disclosure.

In one embodiment, the above phrase that a relation between the target cell and at least one of the W cell groups is used for determining whether the target number value is related to the target increment value includes the following meaning: a relation between the target cell and at least one of the W cell groups is used by the first node in the present disclosure for determining whether the target number value is related to the target increment value.

In one embodiment, the above phrase that a relation between the target cell and at least one of the W cell groups is used for determining whether the target number value is related to the target increment value includes the following meaning: a relation between the target cell and at least one of the W cell groups is used for determining whether the target number value is related to the target increment value according to a condition relation.

In one embodiment, the above phrase that a relation between the target cell and at least one of the W cell groups is used for determining whether the target number value is related to the target increment value includes the following meaning: whether the target cell belongs to the first cell group is used for determining whether the target number value is related to the target increment value.

In one embodiment, the above phrase that a relation between the target cell and at least one of the W cell groups is used for determining whether the target number value is related to the target increment value includes the following meaning: whether the target cell belongs to the first cell group and whether the target cell belongs to a cell group other than the first cell group in the W cell groups when the target cell belongs to the first cell group are used for determining whether the target number value is related to the target increment value.

In one embodiment, the above phrase that a relation between the target cell and at least one of the W cell groups is used for determining whether the target number value is related to the target increment value includes the following meaning: when the target cell only belongs to the first cell group in the W cell groups, the target number value is related to the target increment value; and when the target cell does not belong to the first cell group, the target number value is unrelated to the target increment value.

In one embodiment, the above phrase that a relation between the target cell and at least one of the W cell groups is used for determining whether the target number value is related to the target increment value includes the following meaning: when the target cell only belongs to the first cell group in the W cell groups, the target number value is related to the target increment value; when the target cell does not belong to the first cell group, the target number value is unrelated to the target increment value; when the target cell belongs to the first cell group of the W cell groups and at least one cell group other than the first cell group simultaneously, the target number value is equal to a number of serving cell(s) comprised in the first cell group.

In one embodiment, the target number value being related to the target increment value refers to: the target increment value is used for determining the target number value.

In one embodiment, the target number value being related to the target increment value refers to: the target number value is linearly correlated to the target increment value.

In one embodiment, the target number value being related to the target increment value refers to: the target increment value is used for calculating the target number value according to an operation function.

In one embodiment, the target number value being related to the target increment value refers to: the target increment value as a parameter is used for calculating the target number value according to an operation function.

In one embodiment, the target number value being related to the target increment value refers to: the target number value varies with the target increment value.

In one embodiment, the target number value being related to the target increment value refers to: different target increment values result in different the target number values.

In one embodiment, the target number value being unrelated to the target increment value refers to: a calculation of the target number value is unrelated to the target increment value.

In one embodiment, the target number value being unrelated to the target increment value refers to: the target number value does not vary with the target increment value.

In one embodiment, the target number value being unrelated to the target increment value refers to: a calculation function of the target number value does not comprise a parameter equal to the target increment value.

In one embodiment, the target number value being unrelated to the target increment value refers to: the target number value and the target increment value are independent.

In one embodiment, the target number value being unrelated to the target increment value refers to: different the target increment values may not result in different the target number values.

In one embodiment, a first scheduling cell set comprises a scheduling cell of a serving cell comprised in the first scheduled cell set; the M1 control channel candidates are monitored in sub-band(s) comprised in a first sub-band set, and the first sub-band set comprises at least one sub-band; a serving cell to which any sub-band comprised in the first sub-band set belongs in frequency domain belongs to the first scheduled cell set; an SCS of a subcarrier comprised in any sub-band comprised in the first sub-band set is equal to the first SCS.

In one embodiment, a first scheduling cell set comprises a scheduling cell of a serving cell comprised in the first scheduled cell set; the M1 control channel candidates are monitored in BWPs comprised in a first BWP set, and the first BWP set comprises at least one BWP; a serving cell to which any BWP comprised in the first BWP set belongs in frequency domain belongs to the first scheduled cell set; and an SCS of a subcarrier comprised in any BWP comprised in the first BWP set is equal to the first SCS.

Embodiment 2

Embodiment 2 illustrates a schematic diagram of a network architecture according to the present disclosure, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/ Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/ Unified Data Management (UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN comprises an NR/evolved node B (gNB/eNB) 203 and other gNBs(eNBs) 204. The gNB(eNB) 203 provides UE 201-oriented user plane and control plane protocol terminations. The gNB(eNB) 203 may be connected to other gNBs (eNBs) 204 via an Xn/X2 interface (e.g., backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected to the 5GC/ EPC 210 via an S1/NG interface. The 5GC/EPC 210 comprises a Mobility Management Entity (MME)/ Authentication Management Field (AMF)/Session Management Function (SMF) 211, other MMES/AMFs/ SMFs 214, a Service Gateway (S-GW)/User Plane Function (UPF) 212 and a Packet Date Network Gateway (P-GW)/ UPF 213. The MME/AMF/SMF 211 is a control node for processing a signaling between the UE 201 and the 5GC/ EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports multicarrier transmission.

In one embodiment, the UE 201 supports receiving multi-TRP transmission.

In one embodiment, the UE 201 supports transmission of a secondary carrier cross-carrier scheduling a primary carrier.

In one embodiment, the gNB(eNB) 201 corresponds to the second node in the present disclosure.

In one embodiment, the gNB(eNB) 201 supports multi-carrier transmission.

In one embodiment, the gNB(eNB) 201 supports multi-TRP transmission.

In one embodiment, the gNB(eNB) 201 supports transmission of a secondary carrier cross-carrier scheduling a primary carrier.

Embodiment 3

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a MAC sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC 306, or MAC 302, or MAC 352, or the PHY 301, or PHY 351.

In one embodiment, the second information block in the present disclosure is generated by the RRC 306, or MAC 302, or MAC 352, or the PHY 301, or PHY 351.

In one embodiment, the third information block in the present disclosure is generated by the RRC 306, or MAC 302, or MAC 352, or the PHY 301, or PHY 351.

In one embodiment, the fourth information block in the present disclosure is generated by the RRC 306, or MAC 302, or MAC 352, or the PHY 301, or PHY 351.

In one embodiment, the fifth information block in the present disclosure is generated by the RRC 306, or MAC 302, or MAC 352, or the PHY 301, or PHY 351.

In one embodiment, the sixth information block in the present disclosure is generated by the RRC 306, or MAC 302, or MAC 352, or the PHY 301, or PHY 351.

Embodiment 4

Embodiment 4 illustrates a schematic diagram of a first node and a second node according to the present disclosure, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In Downlink (DL), a higher-layer packet, such as higher-layer information comprised in a first information block, a third information block and a sixth information block in the present disclosure, or higher-layer information comprised in a first information block, a second information block, a third information block, a fifth information block and a sixth information block in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, higher-layer information comprised in the first information block, the third information block and the sixth information block in the present disclosure, or higher-layer information comprised in the first information block, the second information block, the third information block, the fifth information block and the sixth information block are all generated in the controller/processor 440. The transmitting processor 415 provides various signal-processing functions for the L1 layer (that is, PHY), including coding, interleaving, scrambling, modulating, power control/allocation, precoding and generation of physical-layer control signaling, for example, the generation of physical layer signals of the first information block, the third information block and the sixth information block in the present disclosure, or the generation of physical layer signals of the first information block, the second information block, the third information block, the fifth information block and the sixth information block in the present disclosure is completed in the transmitting processor 415. When there exists one the M1 control channel candidates in the present disclosure being used for transmitting a control signaling, the generation of the transmitted control signaling is completed in the transmitting processor 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The functions include receiving the physical-layer signals of the first information block, the third information block and the sixth information block in the present disclosure and monitoring the M1 control channel candidates in the present disclosure, or includes receiving the physical-layer signals of the first information block, the second information block, the third information block, the fifth information block and the sixth information block in the present disclosure and monitoring the M1 control channel candidates in the present disclosure. Multicarrier symbols in multicarrier symbol streams are demodulated based on varied modulation schemes (i.e., BPSCK, QPSK), and are then de-scrambled, decoded and de-interleaved to recover data or control signal transmitted by the second node 410 on a physical channel. And after that the data and control signal are provided to the controller/processor 490. The controller/processor 490 is in charge of the L2 layer and above layers. The controller/processor 490 interprets the first information block, the third information block and the sixth information block in the present disclosure or the first information block, the second information block, the third information block, the fifth information block and the sixth information block in the present disclosure. The controller/processor can be connected to a memory 480 that stores program code and data. The memory 480 may be called a computer readable medium.

In UL transmission, the data source/memory 480 provides higher-layer data to the controller/processor 490. The data source/buffer 480 represents L2 layer and all protocol layers above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, retransmission of a lost packet, and a signaling to the second node 410, for instance, the second information block, the fourth information block and the fifth information block in the present disclosure or the fourth information block in the present disclosure are all generated in the controller/processor 440. The transmitting processor 455 provides various signal transmitting processing functions for the L1 layer (that is, PHY). The generation of a physical layer signal carrying the second information block, the fourth information block and the fifth information bock or a physical layer signal carrying the fourth information block is completed in the transmitting processor 415. The signal transmission processing functions include sequence generation (for signals generated by a sequence), coding and interleaving so as to facilitate Forward Error Correction (FEC) at the UE 450 as well as modulation of baseband signals based on various modulation schemes (i.e., BPSK, QPSK). The signals generated by the sequence or modulation symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the second information block, the fourth information block and the fifth information block in the present disclosure or receiving and processing a physical layer signal carrying the fourth information block in the present disclosure, the signal receiving and processing function includes acquisition of multi-carrier symbol streams, sequential decorrelation of multicarrier symbols in the multicarrier symbol streams or demodulation based on each modulation scheme (i.e., BPSK, QPSK), then the decoding and de-interleaving to recover data and/or control signals originally transmitted by the first node 450 on the PHY. The data and the control signal are then provided to the controller/processor 440. The controller/processor 440 performs functions of L2 layer, including reading the second information block, the fourth information block and the fifth information block in the present disclosure or reading the fourth information block in the present disclosure. The controller/processor can be connected to a memory 430 that stores program code and data. The memory 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block, the first information block is used for determining a scheduled cell set, and the scheduled cell set comprises more than one serving cell; and monitors M1 control channel candidates in a first time window, the M1 control channel candidates occupy M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window;

M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the first node 450 comprises a memory that stores a computer readable instruction program. The computer readable instruction program generates an action when executed by at least one processor. The action includes: receiving a first information block, the first information block being used for determining a scheduled cell set, and the scheduled cell set comprising more than one serving cell; and monitoring M1 control channel candidates in a first time window, the M1 control channel candidates occupying M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block, the first information block is used for indicating a scheduled cell set, and the scheduled cell set comprises more than one serving cell; and determines M1 control channel candidates in a first time window, the M1 control channel candidates occupy M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the second node 410 comprises a memory that stores a computer readable instruction program. The computer readable instruction program generates an action when executed by at least one processor. The action includes: transmitting a first information block, the first information block being used for indicating a scheduled cell set, and the scheduled cell set comprising more than one serving cell; and determining M1 control channel candidates in a first time window, the M1 control channel candidates occupying M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block and a second information block, the first information block is used for determining a first scheduled cell set, the first scheduled cell set comprises more than one serving cell, and the second information block is used for determining a target increment value, the target increment value is a non-negative number; monitors M1 control channel candidates in a first time window, the M1 control channel candidates occupy M2 CCEs, M1 being a positive integer greater than 1, M2 being a positive integer greater than 1, and the first time window comprise at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the first node 450 comprises a memory that stores a computer readable instruction program. The computer readable instruction program generates an action when executed by at least one processor. The action includes: receiving a first information block and a second information block, the first information block being used for determining a first scheduled cell set, the first scheduled cell set comprising more than one serving cell, and the second information block being used for determining a target increment value, the target increment value being a non-negative number; and monitoring M1 control channel candidates in a first time window, the M1 control channel candidates occupying M2 CCEs, M1 being a positive integer greater than 1, M2 being a positive integer greater than 1, and the first time window comprising at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block and a second information block, the first information block is used for indicating a first scheduled cell set, the first scheduled cell set comprises more than one serving cell, and the second information block is used for indicating a target increment value, and the target increment value is a non-negative number; determines M1 control channel candidates in a first time window, the M1 control channel candidates occupy M2 CCEs, M1 being a positive integer greater than 1, M2 being a positive integer greater than 1, and the first time window comprises at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the second node 410 comprises a memory that stores a computer readable instruction program. The computer readable instruction program generates an action when executed by at least one processor. The action includes: transmitting a first information block and a second information block, the first information block being used for indicating a first scheduled cell set, the first scheduled cell set comprising more than one serving cell, and the second information block being used for indicating a target increment value, and the target increment value being a non-negative number; determining M1 control channel candidates in a first time window, the M1 control channel candidates occupying M2 CCEs, M1 being a positive integer greater than 1, M2 being a positive integer greater than 1, and the first time window comprising at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, the first node 450 is a UE.

In one embodiment, the first node 450 is a UE supporting multi-carrier transmission.

In one embodiment, the first node 450 is a UE supporting receiving multi-TRP transmission.

In one embodiment, the first node 450 is a UE supporting that a secondary carrier cross-carrier schedules a primary carrier.

In one embodiment, the second node 410 is a base station (gNB/eNB).

In one embodiment, the second node 410 is a base station supporting multi-carrier transmission.

In one embodiment, the second node 410 is a base station supporting multi-TRP transmission.

In one embodiment, the second node 410 is a base station supporting that a secondary carrier cross-carrier schedules a primary carrier.

In one embodiment, the receiver 456 (including the antenna 460), the receiving processor 452 and the controller/processor 490 are used to receive the first information block, the third information block and the sixth information block in the present disclosure.

In one embodiment, the receiver 456 (including the antenna 460), the receiving processor 452 and the controller/processor 490 are used to receive the second information block and the fifth information block in the present disclosure.

In one embodiment, the transmitter 456 (including the antenna 460), the transmitting processor 455 and the controller/processor 490 are used to transmit the second information block and the fifth information block in the present disclosure.

In one embodiment, the receiver 456 (including the antenna 460) and the receiving processor 452 are used to monitor the M1 control channel candidates in the present disclosure.

In one embodiment, the transmitter 456 (including the antenna 460), the transmitting processor 455 and the controller/processor 490 are used to transmit the fourth information block in the present disclosure.

In one embodiment, the transmitter 416 (including the antenna 420), the transmitting processor 415 and the controller/processor 440 are used to transmit the first information block, the third information block and the sixth information block in the present disclosure.

In one embodiment, the receiver 416 (including the antenna 420), the receiving processor 412 and the controller/processor 440 are used to receive the second information and the fifth information in the present disclosure.

In one embodiment, the transmitter 416 (including the antenna 420), the transmitting processor 415 and the controller/processor 440 are used to transmit the second information block and the fifth information block in the present disclosure.

In one embodiment, the transmitter 416 (including the antenna 420) and the transmitting processor 415 are used to determine the M1 control channel candidates in the present disclosure.

In one embodiment, the receiver 416 (including the antenna 420), the receiving processor 412 and the controller/processor 440 are used to receive the fourth information block in the present disclosure.

Embodiment 5A

Figure 5A:
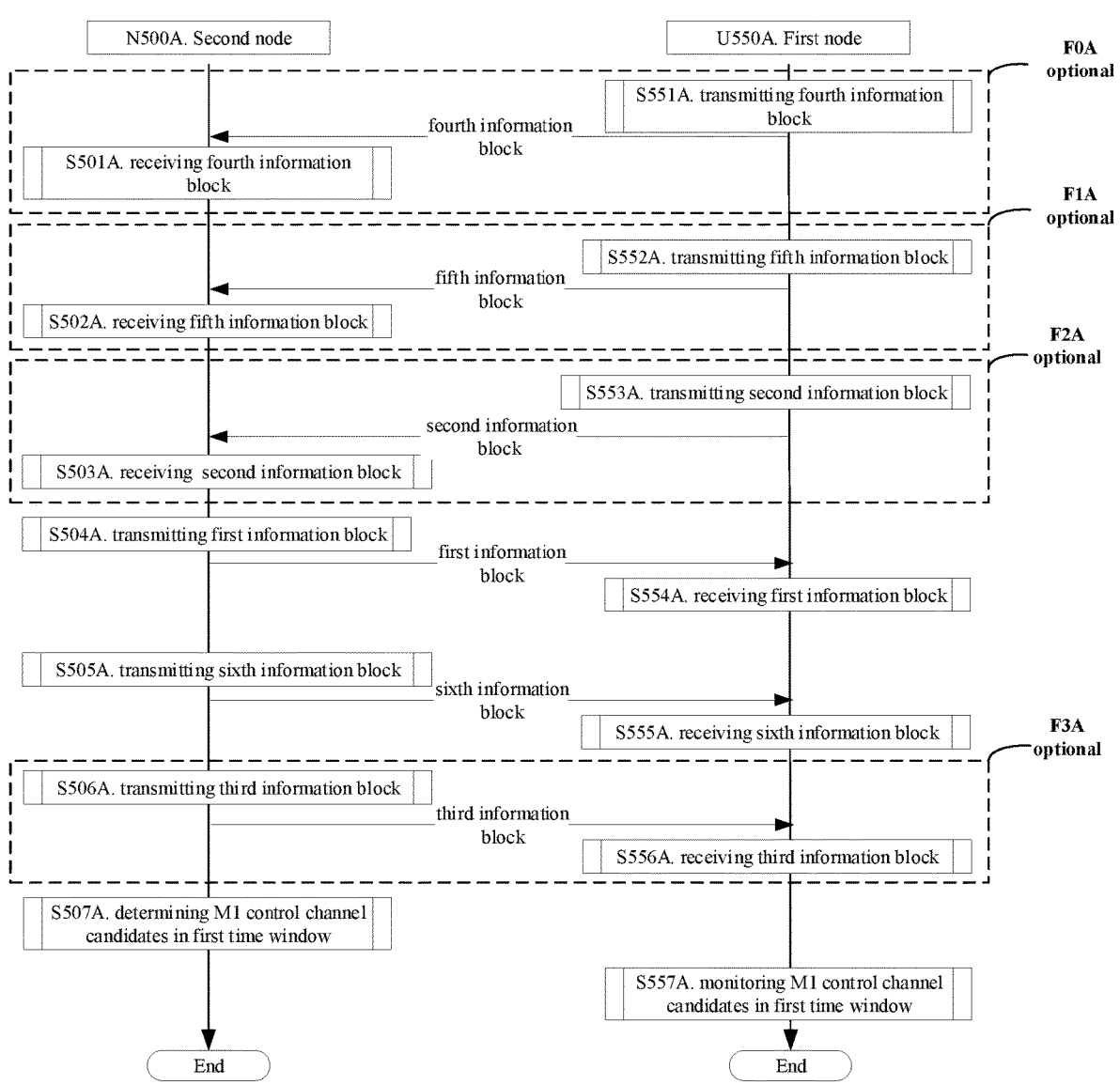
FIG. 5A illustrates a flowchart of radio signal transmission according to one embodiment of the present disclosure.

Embodiment 5A illustrates a flowchart of radio signal transmission according to one embodiment in the present disclosure, as shown in FIG. 5A. In FIG. 5A, a second node N500A is a maintenance base station of a serving cell of a first node U550A, and steps circled by dotted boxes are optional. It is particularly underlined that the order illustrated in the embodiment does not put constraints over sequences of signal transmissions and implementations.

The second node N500A receives a fourth information block in step S501A, receives a fifth information block in step S502A, receives a second information block in step S503A, transmits a first information block in step S504A, transmits a sixth information block in step S505A, transmits a third information block in step S506A, and determines M1 control channel candidates in a first time window in step S507A.

The first node U550A transmits a fourth information block in step S551A, transmits a fifth information block is step S552A, transmits a second information block in step S553A, receives a first information block in step S554A, receives a sixth information in step S555A, receives a third information block in step S556A, and monitors M1 control channel candidates in a first time window in step S557A.

In Embodiment 5A, the first information block in the present disclosure is used for determining a scheduled cell set, and the scheduled cell set comprises more than one serving cell; the M1 control channel candidates in the present disclosure occupy M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window in the present disclosure; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number; the second information block is used for indicating a first candidate factor out of a first candidate factor set; the third information block is used for determining whether the target factor is equal to the first candidate factor; the first candidate factor set is one of G candidate factor sets, G being a positive integer greater than 1; any of the G candidate factor sets comprises more than one candidate factor; the fourth information block is used for indicating the first candidate factor set out of the G candidate factor sets; the fifth information block is used for determining the second parameter in the present disclosure; the sixth information block is used for determining at least one of the M1 control channel candidates, the M2 CCEs or a number of control-resource resource pool(s) in a scheduling cell of the first serving cell.

In one embodiment, the second information block is transmitted via an air interface.

In one embodiment, the second information block is transmitted via a radio interface.

In one embodiment, the second information block is transmitted via a radio interface.

In one embodiment, the second information block comprises all or part of a physical-layer signaling.

In one embodiment, the second information block comprises all or part of an RRC signaling.

In one embodiment, the second information block comprises all or part of a MAC layer signaling.

In one embodiment, the second information block is transmitted through an Uplink Shared Channel (UL-SCH).

In one embodiment, the second information block is transmitted through a Physical Uplink Shared CHannel (PUSCH).

In one embodiment, the second information block is Cell-Specific.

In one embodiment, the second information block is used for indicating a capability of the first node in the present disclosure.

In one embodiment, the above phrase that the second information block is used for indicating a first candidate factor out of a first candidate factor set includes the following meaning: the second information block is used by the first node in the present disclosure for indicating the first candidate factor out of the first candidate factor set.

In one embodiment, the above phrase that the second information block is used for indicating a first candidate factor out of a first candidate factor set includes the following meaning: the second information block is used for explicitly indicating the first candidate factor out of the first candidate factor set.

In one embodiment, the above phrase that the second information block is used for indicating a first candidate factor out of a first candidate factor set includes the following meaning: the second information block is used for implicitly indicating the first candidate factor out of the first candidate factor set.

In one embodiment, the second information block is used for indicating a CA or DC capability of the first node in the present disclosure.

In one embodiment, the second information block comprises one or more fields in an IE "Phy-Parameters".

In one embodiment, the second information block comprises a field "BDFactorR" in an IE "Phy-Parameters".

In one embodiment, the third information block is transmitted via an air interface.

In one embodiment, the third information block is transmitted via an radio interface.

In one embodiment, the third information block comprises all or part of a higher-layer signaling.

In one embodiment, the third information block comprises all or part of a physical-layer signaling.

In one embodiment, the third information block comprises all or part of an RRC signaling.

In one embodiment, the third information block comprises all or part of a MAC layer signaling.

In one embodiment, the third information block comprises all or part of an SIB.

In one embodiment, the third information block is transmitted through a PDCCH.

In one embodiment, the third information block is UE-specific.

In one embodiment, the third information block is configured by Per Serving Cell.

In one embodiment, the third information block comprises all or partial fields of a DCI signaling.

In one embodiment, the above phrase that the third information block is used for determining whether the target factor is equal to the first candidate factor includes the following meaning: the third information block is used by the first node in the present disclosure for determining whether the target factor is equal to the first candidate factor.

In one embodiment, the above phrase that the third information block is used for determining whether the target factor is equal to the first candidate factor includes the following meaning: the third information block is used for explicitly indicating whether the target factor is equal to the first candidate factor.

In one embodiment, the above phrase that the third information block is used for determining whether the target factor is equal to the first candidate factor includes the following meaning: the third information block is used for implicitly indicating whether the target factor is equal to the first candidate factor.

In one embodiment, the third information block comprises a field "BDFactorR" in an RRC signaling.

In one embodiment, the third information block comprises a field "CORESETPoolIndex" in an IE "ControlResourceSet" in an IE "PDCCH-Config" in RRC signaling.

In one embodiment, the third information block comprises an IE "PDCCH-Config" in an RRC signaling.

In one embodiment, the third information block comprises an IE "ControlResourceSet" in an IE "PDCCH-Config" in an RRC signaling.

In one embodiment, the third information block comprises a field "BDFactorR" in an IE "ControlResourceSet" in an IE "PDCCH-Config" in an RRC signaling.

In one embodiment, the third information block comprises a field "BDFactorR" in an IE "PDCCH-Config" in an RRC signaling.

In one embodiment, the third information block and the first information block in the present disclosure are carried by two different RRC signalings.

In one embodiment, the third information block and the first information block are carried by two different IEs in a same RRC signaling.

In one embodiment, the third information block and the first information block are carried by two different fields in a same IE in a same RRC signaling.

In one embodiment, the fourth information block is transmitted via an air interface.

In one embodiment, the fourth information block is transmitted via a radio interface.

In one embodiment, the fourth information block comprises all or part of a higher-layer signaling.

In one embodiment, the fourth information block comprises all or part of a physical-layer signaling.

In one embodiment, the fourth information block comprises all or part of an RRC signaling.

In one embodiment, the fourth information block comprises all or part of a MAC layer signaling.

In one embodiment, the fourth information block is transmitted through a UL-SCH.

In one embodiment, the fourth information block is transmitted through a PUSCH.

In one embodiment, the fourth information block is used for indicating a capability of the first node in the present disclosure.

In one embodiment, the fourth information block and the second information block in the present disclosure are carried by two different RRC signalings.

In one embodiment, the fourth information block and the second information block are carried by two different IEs in a same RRC signaling.

In one embodiment, the fourth information block and the second information block are carried by two different fields in a same IE in a same RRC signaling.

In one embodiment, the above phrase that the fourth information block is used for indicating the first candidate factor set out of the G candidate factor sets includes the following meaning: the fourth information block is used by the first node in the present disclosure for indicating the first candidate factor set out of the G candidate factor sets.

In one embodiment, the above phrase that the fourth information block is used for indicating the first candidate factor set out of the G candidate factor sets includes the following meaning: the fourth information block is used for explicitly indicating the first candidate factor set out of the G candidate factor sets.

In one embodiment, the above phrase that the fourth information block is used for indicating the first candidate factor set out of the G candidate factor sets includes the following meaning: the fourth information block is used for implicitly indicating the first candidate factor set out of the G candidate factor sets.

In one embodiment, the fourth information block is used for indicating a CA or DC capability of the first node in the present disclosure.

In one embodiment, the fourth information block comprises one or more fields in an IE "Phy-Parameters".

In one embodiment, the fourth information block is used for indicating a capability of the first node in the present disclosure.

In one embodiment, the fourth information block is used for indicating whether the first node in the present disclosure supports a capability of an Scell cross-carrier scheduling a Pcell.

In one embodiment, the fourth information block is used for indicating whether the first node in the present disclosure supports a capability of more than one serving cell scheduling a same serving cell.

In one embodiment, the second information block and the fourth information block are carried by two different RRC signalings.

In one embodiment, the second information block and the fourth information block are carried by two different IEs in a same RRC signaling.

In one embodiment, the second information block and the fourth information block are carried by two different fields in a same IE in a same RRC signaling.

In one embodiment, the fifth information block is transmitted via an air interface.

In one embodiment, the fifth information block is transmitted via a radio interface.

In one embodiment, the fifth information block comprises all or part of a higher-layer signaling.

In one embodiment, the fifth information block comprises all or part of a physical-layer signaling.

In one embodiment, the fifth information block comprises all or part of an RRC signaling.

In one embodiment, the fifth information block comprises all or part of a MAC layer signaling.

In one embodiment, the fifth information block is transmitted through a UL-SCH.

In one embodiment, the fifth information block is transmitted through a PUSCH.

In one embodiment, the fifth information block is UE-specific.

In one embodiment, the fifth information block is used for indicating a capability of the first node in the present disclosure.

In one embodiment, the fifth information block is used for indicating a CA or DC capability of the first node in the present disclosure.

In one embodiment, the fifth information block is used for indicating a blind detection capability of the first node in the present disclosure.

In one embodiment, the fifth information block comprises an IE "Phy-Parameters".

In one embodiment, the fifth information block comprises a field "pdcch-BlindDetectionCA-r16" in an IE "Phy-Parameters".

In one embodiment, the fifth information block comprises a field "pdcch-BlindDetectionCA-r15" in an IE "Phy-Parameters".

In one embodiment, the fifth information block comprises a field "pdcch-BlindDetectionCA-r17" in an IE "Phy-Parameters".

In one embodiment, the fifth information block comprises a field "pdcch-BlindDetectionCA" in an IE "Phy-Parameters".

In one embodiment, the fifth information block comprises a field "pdcch-BlindDetectionNRDC" in an IE "Phy-Parameters".

In one embodiment, the fifth information block comprises a field "pdcch-BlindDetectionMCG-UE" in an IE "Phy-Parameters".

In one embodiment, the fifth information block comprises a field "pdcch-BlindDetectionSCG-UE" in an IE "Phy-Parameters".

In one embodiment, the fifth information block and the second information block in the present disclosure are carried by two different RRC signalings.

In one embodiment, the fifth information block and the second information block in the present disclosure are carried by two different IEs in a same RRC signaling.

In one embodiment, the fifth information block and the second information block in the present disclosure are carried by two different fields in a same IE in a same RRC signaling.

In one embodiment, the fifth information block and the fourth information block in the present disclosure are carried by two different RRC signalings.

In one embodiment, the fifth information block and the fourth information block in the present disclosure are carried by two different IEs in a same RRC signaling.

In one embodiment, the fifth information block and the fourth information block in the present disclosure are carried by two different fields in a same IE in a same RRC signaling.

In one embodiment, the above phrase that the fifth information block is used for indicating the second parameter includes the following meaning: the fifth information block is used by the first node in the present disclosure for indicating the second parameter.

In one embodiment, the above phrase that the fifth information block is used for indicating the second parameter includes the following meaning: the fifth information block is used for explicitly indicating the second parameter.

In one embodiment, the above phrase that the fifth information block is used for indicating the second parameter includes the following meaning: the fifth information block is used for implicitly indicating the second parameter.

In one embodiment, the sixth information block is transmitted via an air interface.

In one embodiment, the sixth information block is transmitted via a radio interface.

In one embodiment, the sixth information block comprises all or part of a higher-layer signaling.

In one embodiment, the sixth information block comprises all or part of a physical-layer signaling.

In one embodiment, the sixth information block comprises all or part of an RRC signaling.

In one embodiment, the sixth information block comprises all or part of a MAC layer signaling.

In one embodiment, the sixth information block comprises all or part of an SIB.

In one embodiment, the sixth information is transmitted through a DL-SCH.

In one embodiment, the sixth information block is transmitted through a PDCCH.

In one embodiment, the sixth information block is Cell-Specific.

In one embodiment, the sixth information block is UE-specific.

In one embodiment, the sixth information block is configured by Per Serving Cell.

In one embodiment, the sixth information block comprises all or partial fields of a DCI signaling.

In one embodiment, the sixth information block comprises more than one sub-information block, and each sub-information block comprised in the sixth information block is an IE or a field in an RRC signaling to which the sixth information block belongs; a sub-information block comprised in the sixth information block is used for indicating the M1 control channel candidates, a sub-information block comprised in the sixth information block is used for indicating the M2 CCEs, and a sub-information block comprised in the sixth information block is used for indicating a number of control resource pool(s) in a scheduling cell of the first serving cell.

In one embodiment, the sixth information block comprises a field "CORESETPoolIndex" in an IE "ControlResourceSet" in an RRC signaling.

In one embodiment, the sixth information block comprises all or part of fields in an IE "PDCCH-Config" in an RRC signaling.

In one embodiment, the sixth information block comprises all or part of fields in an IE "ControlResourceSet" in an IE "PDCCH-Config" in an RRC signaling.

In one embodiment, the sixth information block comprises a field "frequencyDomainResources" in an IE "ControlResourceSet" in an RRC signaling.

In one embodiment, the sixth information block comprises a field "duration" in an IE "ControlResourceSet" in an RRC signaling.

In one embodiment, the sixth information block comprises a field "cce-REG-MappingType" in an IE "ControlResourceSet" in an RRC signaling.

In one embodiment, the sixth information block comprises all or part of fields in an IE "SearchSpace" in an RRC signaling.

In one embodiment, the sixth information block comprises a field "nrofCandidates" in an IE "SearchSpace" in an RRC signaling.

In one embodiment, the sixth information block comprises a field "monitoringSlotPeriodicityAndOffset" in an IE "SearchSpace" in an RRC signaling.

In one embodiment, the sixth information block comprises a field "monitoringSymbolsWithinSlot" in an IE "SearchSpace" in an RRC signaling.

In one embodiment, the sixth information block comprises a field "CORESETPoolIndex" in an IE "ControlResourceSet" in an RRC signaling, the sixth information block comprises a field "duration" in an IE "ControlResourceSet" in an RRC signaling, and the sixth information block comprises all or partial fields in an IE "SearchSpace" in an RRC signaling.

In one embodiment, the sixth information block and the third information block in the present disclosure are carried by two different RRC signalings.

In one embodiment, the sixth information block and the third information block in the present disclosure are carried by two different IEs in a same RRC signaling.

In one embodiment, the sixth information block and the third information block in the present disclosure are carried by two different fields in a same IE in a same RRC signaling.

In one embodiment, the sixth information block comprises more than one sub-information block, and each sub-information block comprised in the sixth information block is an IE or a field in an RRC signaling to which the sixth information block belongs; a sub-information block comprised in the sixth information block and the third information block in the present disclosure are carried by two different fields in a same IE in a same RRC signaling.

In one embodiment, the sixth information block comprises more than one sub-information block, and each sub-information block comprised in the sixth information block is an IE or a field in an RRC signaling to which the sixth information block belongs; a sub-information block comprised in the sixth information block and the third information block in the present disclosure are carried by two different fields in an IE "control resource set" in an RRC signaling.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used by the first node in the present disclosure for determining at least one of the M1 control channel candidates, the M2 CCEs or a number of control-resource resource pool(s) in a scheduling cell of the first serving cell.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for explicitly indicating at least one of the M1 control channel candidates, the M2 CCEs or a number of control-resource resource pool(s) in a scheduling cell of the first serving cell.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for implicitly indicating at least one of the M1 control channel candidates, the M2 CCEs or a number of control-resource resource pool(s) in a scheduling cell of the first serving cell.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for determining the M1 control channel candidates, the M2 CCEs and a number of control-resource resource pool(s) in a scheduling cell of the first serving cell.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for determining one of the M1 control channel candidates, the M2 CCEs or a number of control-resource resource pool(s) in a scheduling cell of the first serving cell.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for determining the M1 control channel candidates and the M2 CCEs.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for determining the M1 control channel candidates and a number of control-resource resource pool(s) in a scheduling cell of the first serving cell.

In one embodiment, the above phrase that the sixth information block is used for determining at least one of the M1 control channel candidates, the M2 CCEs or a number of control-resource resource pool(s) in a scheduling cell of the first serving cell includes the following meaning: the sixth information block is used for determining the M2 CCEs and a number of control-resource resource pool(s) in a scheduling cell of the first serving cell.

In one embodiment, the sixth information block is used for determining the M1 control channel candidates includes the following meaning: the sixth information block is used for determining N1 control channel candidates, any of the M1 control channel candidates is one of the N1 control channel candidates, N1 being a positive integer greater than M1; M1 is equal to the first threshold, and the first threshold is used for determining the M1 control channel candidates out of the N1 control channel candidates.

In one embodiment, the sixth information block is used for determining the M2 CCEs includes the following meaning: the sixth information block is used for determining N2 CCEs, any of the M2 CCEs is one of the N2 CCEs, N2 being a positive integer greater than M2; the M2 is equal to the second threshold, and the second threshold is used for determining the M2 CCEs out of the N2 CCEs.

Embodiment 5B

Figures 5B, 6A:
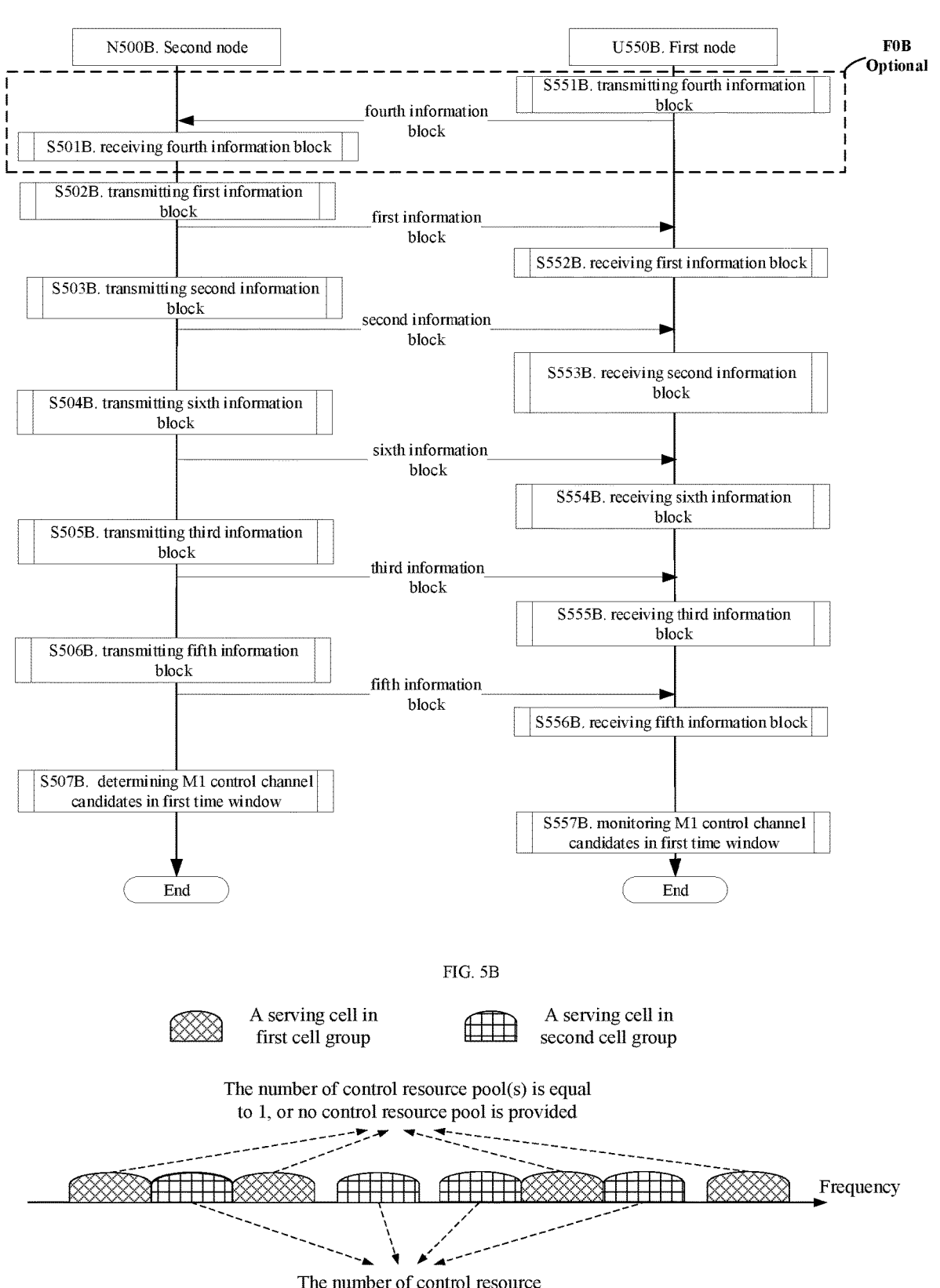
FIG. 5B illustrates a flowchart of radio signal transmission according to one embodiment of the present disclosure.
FIG. 6A illustrates a schematic diagram of a first cell group and a second cell group according to one embodiment of the present disclosure.

Embodiment 5B illustrates a flowchart of radio signal transmission according to one embodiment in the present disclosure, as shown in FIG. 5B. In FIG. 5B, a second node N500B is a maintenance base station of a serving cell of a first node U550B, and steps circled by dotted boxes are optional. it is particularly underlined that the order illustrated in the embodiment does not put constraints over sequences of signal transmissions and implementations.

The second node N500B receives a fourth information block in step S501B, transmits a first information block in step S502B, transmits a second information block in step S503B, transmits a sixth information block in step S504B, transmits a third information block in step S505B, transmits a fifth information block in step S506B, and determines M1 control channel candidates in a first time window in step S507B.

The first node U550B transmits a fourth information block in step S551B, receives a first information block in step S552B, receives a second information block in step S553B, receives a sixth information block in step S554B, receives a third information block in step S555B, receives a fifth information block in step S556B, and monitors M1 control channel candidates in a first time window in step S557B.

In Embodiment 5B, the first information block in the present disclosure is used for determining a first scheduled cell set, the first scheduled cell set comprises more than one serving cell, and the second information block in the present disclosure is used for determining a target increment value, and the target increment value is a non-negative number; the M1 control channel candidates in the present disclosure occupy M2 CCEs, M1 being a positive integer greater than 1, M2 being a positive integer greater than 1, and the first time window in the present disclosure comprises at least one consecutive multicarrier symbol in time domain; an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer; the third information block is used for determining a number of control resource set resource pool(s) in a scheduling cell of the target cell; the first threshold is equal to a largest integer not greater than a first median value, and the second threshold is equal to a largest integer not greater than a second median value; a first parameter is used for determining the first median value and the second median value, and the first parameter is greater than 0; the first parameter is linearly correlated to the target number value, or the first parameter is linearly correlated to a product of the target number value and a first factor, and the fourth information block is used for indicating the first factor; the fifth information block is used for determining whether a target factor is equal to the first factor; and the sixth information block is used for determining at least one of the M1 control channel candidates, the M2 CCEs or a number of control-resource resource pool(s) in a scheduling cell of the target cell.

In one embodiment, the third information block is transmitted via an air interface.

In one embodiment, the third information block is transmitted via an air interface.

In one embodiment, the third information block comprises all or part of a higher-layer signaling.

In one embodiment, the third information block comprises all or part of a physical-layer signaling.

In one embodiment, the third information block comprises all or part of an RRC signaling.

In one embodiment, the third information block comprises all or part of a MAC layer signaling.

In one embodiment, the third information block comprises all or part of an SIB.

In one embodiment, the third information block is transmitted through a PDSCH.

In one embodiment, the third information block is UE-specific.

In one embodiment, the third information block is configured by Per Serving Cell.

In one embodiment, the third information block comprises all or partial fields of a DCI signaling.

In one embodiment, the third information block comprises a field "CORESETPoolIndex" in an IE "ControlResourceSet" in an RRC signaling.

In one embodiment, the third information block comprises all or part of fields in an IE "PDCCH-Config" in an RRC signaling.

In one embodiment, the third information block comprises all or part of fields in an IE "ControlResourceSet" in an IE "PDCCH-Config" in an RRC signaling.

In one embodiment, the third information block comprises more than one sub-information block, any sub-information block comprised in the third information block is used for determining a number of control resource set resource pool(s) in a serving cell, and one sub-information block comprised in the third information block is used for determining a number of control resource set resource pool(s) in a scheduling cell of the target cell.

In one embodiment, the third information block comprises more than one sub-information block, any sub-information block comprised in the third information block is used for determining a number of index(es) of control resource set resource pool(s) in a serving cell, and one sub-information block comprised in the third information block is used for determining a number of index(es) of control resource set resource pool(s) in a scheduling cell of the target cell.

In one embodiment, the phrase that the third information block is used for determining a number of control resource set resource pool(s) in a scheduling cell of the target cell includes the following meaning: the third information block is used by the first node in the present disclosure for determining a number of control resource set resource pool(s) in a scheduling cell of the target cell.

In one embodiment, the phrase that the third information block is used for determining a number of control resource set resource pool(s) in a scheduling cell of the target cell includes the following meaning: the third information block is used for explicitly indicating a number of control resource set resource pool(s) in a scheduling cell of the target cell.

In one embodiment, the phrase that the third information block is used for determining a number of control resource set resource pool(s) in a scheduling cell of the target cell includes the following meaning: the third information block is used for implicitly indicating a number of control resource set resource pool(s) in a scheduling cell of the target cell.

In one embodiment, the phrase that the third information block is used for determining a number of control resource set resource pool(s) in a scheduling cell of the target cell includes the following meaning: the third information block is used for indirectly indicating a number of control resource set resource pool(s) in a scheduling cell of the target cell.

In one embodiment, the phrase that the third information block is used for determining a number of control resource set resource pool(s) in a scheduling cell of the target cell includes the following meaning: the third information block is used for indicating a number of index(es) of control resource set resource pool(s) in a scheduling cell of the target cell.

In one embodiment, the phrase that the third information block is used for determining a number of control resource set resource pool(s) in a scheduling cell of the target cell includes the following meaning: the third information block indicates an index of a control resource set resource pool to which each CORESET in a scheduling cell of the target cell belongs, and a number of the control resource set resource pool(s) in a scheduling cell of the target cell is equal to a number of index(es) of control resource set resource pool(s) to which a CORESET in a scheduling cell of the target cell belongs.

In one embodiment, the fourth information block is transmitted via an air interface.

In one embodiment, the fourth information block is transmitted via a radio interface.

In one embodiment, the fourth information block comprises all or part of a higher-layer signaling.

In one embodiment, the fourth information block comprises all or part of a physical-layer signaling.

In one embodiment, the fourth information block comprises all or part of an RRC signaling.

In one embodiment, the fourth information block comprises all or part of a MAC layer signaling.

In one embodiment, the fourth information block is transmitted through a UL-SCH.

In one embodiment, the fourth information block is transmitted through a PUSCH.

In one embodiment, the fourth information block is used for indicating a capability of the first node in the present disclosure.

In one embodiment, the above phrase that the fourth information block is used for indicating the first factor includes the following meaning: the fourth information block is used by the first node in the present disclosure for indicating the first factor.

In one embodiment, the above phrase that the fourth information block is used for indicating the first factor includes the following meaning: the fourth information block is used for explicitly indicating the first factor.

In one embodiment, the above phrase that the fourth information block is used for indicating the first factor includes the following meaning: the fourth information block is used for implicitly indicating the first factor.

In one embodiment, the fourth information block is used for indicating a CA or DC capability of the first node in the present disclosure.

In one embodiment, the fourth information block comprises one or more fields in an IE "Phy-Parameters".

In one embodiment, the fourth information block comprises a field "BDFactorR" in an IE "Phy-Parameters".

In one embodiment, the fifth information block is transmitted via an air interface.

In one embodiment, the fifth information block is transmitted via a radio interface.

In one embodiment, the fifth information block comprises all or part of a higher-layer signaling.

In one embodiment, the fifth information block comprises all or part of a physical-layer signaling.

In one embodiment, the fifth information block comprises all or part of an RRC signaling.

In one embodiment, the fifth information block comprises all or part of a MAC layer signaling.

In one embodiment, the fifth information block is transmitted through a PDSCH.

In one embodiment, the fifth information block is UE-specific.

In one embodiment, the fifth information block is configured by Per Serving Cell.

In one embodiment, the fifth information block comprises all or partial fields of a DCI signaling.

In one embodiment, the above phrase that the fifth information block is used for determining whether a target factor is equal to the first factor includes the following meaning: the fifth information block is used by the first node in the present disclosure for determining whether the target factor is equal to the first factor.

In one embodiment, the above phrase that the fifth information block is used for determining whether a target factor is equal to the first factor includes the following meaning: the fifth information block is used for explicitly indicating whether the target factor is equal to the first factor.

In one embodiment, the above phrase that the fifth information block is used for determining whether a target factor is equal to the first factor includes the following meaning: the fifth information block is used for implicitly indicating whether the target factor is equal to the first factor.

In one embodiment, the fifth information block comprises a field "BDFactorR" in an RRC signaling.

In one embodiment, the fifth information block comprises a field "BDFactorR" in an IE "ControlResourceSet" in an IE "PDCCH-Config" in an RRC signaling.

In one embodiment, the fifth information block comprises a field "BDFactorR" in an IE "PDCCH-Config" in an RRC signaling.

In one embodiment, the fifth information block and the third information block in the present disclosure are carried by two different RRC signalings.

In one embodiment, the fifth information block and the third information block are carried by two different IEs in a same RRC signaling.

In one embodiment, the fifth information block and the third information block are carried by two different fields in a same IE in a same RRC signaling.

In one embodiment, the sixth information block is transmitted via an air interface.

In one embodiment, the sixth information block is transmitted via a radio interface.

In one embodiment, the sixth information block comprises all or part of a higher-layer signaling.

In one embodiment, the sixth information block comprises all or part of a physical-layer signaling.

In one embodiment, the sixth information block comprises all or part of an RRC signaling.

In one embodiment, the sixth information block comprises all or part of a MAC layer signaling.

In one embodiment, the sixth information block comprises all or part of an SIB.

In one embodiment, the sixth information block is transmitted through a PDCCH.

In one embodiment, the sixth information block is UE-specific.

In one embodiment, the sixth information block is configured by Per Serving Cell.

In one embodiment, the sixth information block comprises PDCCH configuration information in a scheduling cell of each serving cell comprised in the first scheduled cell set.

In one embodiment, the sixth information block comprises multiple IEs "PDCCH-Config".

In one embodiment, the sixth information block only comprises an IE "PDCCH-Config".

In one embodiment, the sixth information block comprises multiple IEs "PDCCH-Config" respectively for a scheduling cell of each serving cell comprised in the first scheduled cell set.

In one embodiment, the sixth information block comprises all or partial fields of a DCI signaling.

In one embodiment, the sixth information block comprises more than one sub-information block, and each sub-information block comprised in the sixth information block is an IE or a field in an RRC signaling to which the sixth information block belongs; a sub-information block comprised in the sixth information block is used for indicating the M1 control channel candidates, a sub-information block comprised in the sixth information block is used for indicating the M2 CCEs, and a sub-information block comprised in the sixth information block is used for indicating a number of control resource pool(s) in a scheduling cell of the target cell.

In one embodiment, the sixth information block comprises a field "CORESETPoolIndex" in an IE "ControlResourceSet" in an RRC signaling.

In one embodiment, the sixth information block comprises all or part of fields in an IE "ControlResourceSet" in an IE "PDCCH-Config" in RRC signaling.

In one embodiment, the sixth information block comprises all or part of fields in an IE "SearchSpace" in an RRC signaling.

In one embodiment, the sixth information block comprises a field "CORESETPoolIndex" in an IE "ControlResourceSet" in an RRC signaling, the sixth information block comprises a field "duration" in an IE "ControlResourceSet" in an RRC signaling, and the sixth information block comprises all or part of fields in an IE "SearchSpace" in an RRC signaling.

In one embodiment, the sixth information block and the third information block in the present disclosure are carried by two different RRC signalings.

In one embodiment, the sixth information block and the third information block in the present disclosure are carried by two different IEs in a same RRC signaling.

In one embodiment, the sixth information block and the third information block in the present disclosure are carried by two different fields in a same IE in a same RRC signaling.

In one embodiment, the sixth information block comprises more than one sub-information block, and each sub-information block comprised in the sixth information block is an IE or a field in an RRC signaling to which the sixth information block belongs; a sub-information block comprised in the sixth information block and the third information block in the present disclosure are carried by two different fields in a same IE in a same RRC signaling.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used by the first node in the present disclosure for determining at least one of the M1 control channel candidates, the M2 CCEs or a number of control-resource resource pool(s) in a scheduling cell of the target cell.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for explicitly indicating at least one of the M1 control channel candidates, the M2 CCEs or a number of control-resource resource pool(s) in a scheduling cell of the target cell.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for implicitly indicating at least one of the M1 control channel candidates, the M2 CCEs or a number of control-resource resource pool(s) in a scheduling cell of the target cell.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for determining the M1 control channel candidates, the M2 CCEs and a number of control-resource resource pool(s) in a scheduling cell of the target cell.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for determining one of the M1 control channel candidates, the M2 CCEs or a number of control-resource resource pool(s) in a scheduling cell of the target cell.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for determining the M1 control channel candidates and the M2 CCEs.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for determining the M1 control channel candidates and a number of control-resource resource pool(s) in a scheduling cell of the target cell.

In one embodiment, the above phrase that the sixth information block is used for determining at least one of the M1 control channel candidates, the M2 CCEs or a number of control-resource resource pool(s) in a scheduling cell of the target cell includes the following meaning: the sixth information block is used for determining the M2 CCEs and a number of control-resource resource pool(s) in a scheduling cell of the target cell.

In one embodiment, the sixth information block is used for determining the M1 control channel candidates includes the following meaning: the sixth information block is used for determining N1 control channel candidates, any of the M1 control channel candidates is one of the N1 control channel candidates, N1 being a positive integer greater than M1; the M1 is equal to the first threshold, and the first threshold is used for determining the M1 control channel candidates out of the N1 control channel candidates.

In one embodiment, the sixth information block is used for determining the M2 CCEs includes the following meaning: the sixth information block is used for determining N2 CCEs, any of the M2 CCEs is one of the N2 CCEs, N2 being a positive integer greater than M2; the M2 is equal to the second threshold, and the second threshold is used for determining the M2 CCEs out of the N2 CCEs.

Embodiment 6A

Embodiment 6A illustrates a schematic diagram of a first cell group and a second cell group according to one embodiment of the present disclosure, as shown in FIG. 6A. In FIG. 6A, the horizontal axis represents frequency, each cross line-filled block with an arc top represents a serving cell comprised in a first cell group, and each reticle-filled block with an arc top represents a serving cell comprised in a second cell group.

In Embodiment 6A, the W cell groups in the present disclosure comprise a first cell group and a second cell group, and the first cell group is different from the second cell group; when a number of control resource pool(s) provided in a scheduling cell of the first serving cell the present disclosure is equal to 1 or no control resource pool is provided in a scheduling cell of the first serving cell, the first serving cell in the present disclosure belongs to the first cell group; when a number of control resource pool(s) provided in a scheduling cell of the first serving cell in the present disclosure is greater than 1, the first serving cell in the present disclosure belongs to the second cell group.

In one embodiment, W is equal to 2, and the W cell groups only comprise the first cell group and the second cell group.

In one embodiment, W is greater than 2, and the W cell groups also comprise a cell group other than the first cell group and the second cell group.

In one embodiment, the first cell group is one of the W cell groups.

In one embodiment, the second cell group is one of the W cell groups.

In one embodiment, there does not exist a serving cell that belongs to the first cell group and the second cell group simultaneously.

In one embodiment, only one of "a number of provided control resource pool(s) in a scheduling cell of the first serving cell is equal to 1" or "no control resource pool is provided in a scheduling cell of the first serving cell" is satisfied, the first serving cell belongs to the first cell group.

In one embodiment, no control resource pool is provided in a scheduling cell of the first serving cell includes the following meaning: no control resource pool index is provided in a scheduling cell of the first serving cell.

In one embodiment, no control resource pool is provided in a scheduling cell of the first serving cell includes the following meaning: no signaling of a control resource pool index is provided in a scheduling cell of the first serving cell.

In one embodiment, no control resource pool is provided in a scheduling cell of the first serving cell includes the following meaning: the first node does not support providing a control resource pool index in a scheduling cell of the first serving cell.

In one embodiment, no control resource pool is provided in a scheduling cell of the first serving cell includes the following meaning: the first node only supports R15 version, and does not support providing a control resource pool index in a scheduling cell of the first serving cell.

In one embodiment, no control resource pool is provided in a scheduling cell of the first serving cell includes the following meaning: a field providing a control resource pool index in a scheduling cell of the first serving cell is absent.

In one embodiment, the first serving cell belongs to one of the first cell group or the second cell group.

In one embodiment, when a control resource pool is provided in a scheduling cell of the first serving cell, a number of control resource pool index(es) provided in a scheduling cell of the first serving cell is equal to 1 or 2.

In one embodiment, when a control resource pool is provided in a scheduling cell of the first serving cell, a number of control resource pool index(es) provided in a scheduling cell of the first serving cell is equal to 1 or 2 or 3.

In one embodiment, when a control resource pool is provided in a scheduling cell of the first serving cell, a number of control resource pool indexes provided in a scheduling cell of the first serving cell is greater than 3.

In one embodiment, when a control resource pool is provided in a scheduling cell of the first serving cell, a number of control resource pool index(es) provided in a scheduling cell of the first serving cell is equal to 1 or 2; when a number of control resource pools provided in a scheduling cell of the first serving cell is greater than 1 refers to a time when a number of control resource pool indexes provided in a scheduling cell of the first serving cell is equal to 2.

Embodiment 6B

Figure 6B:
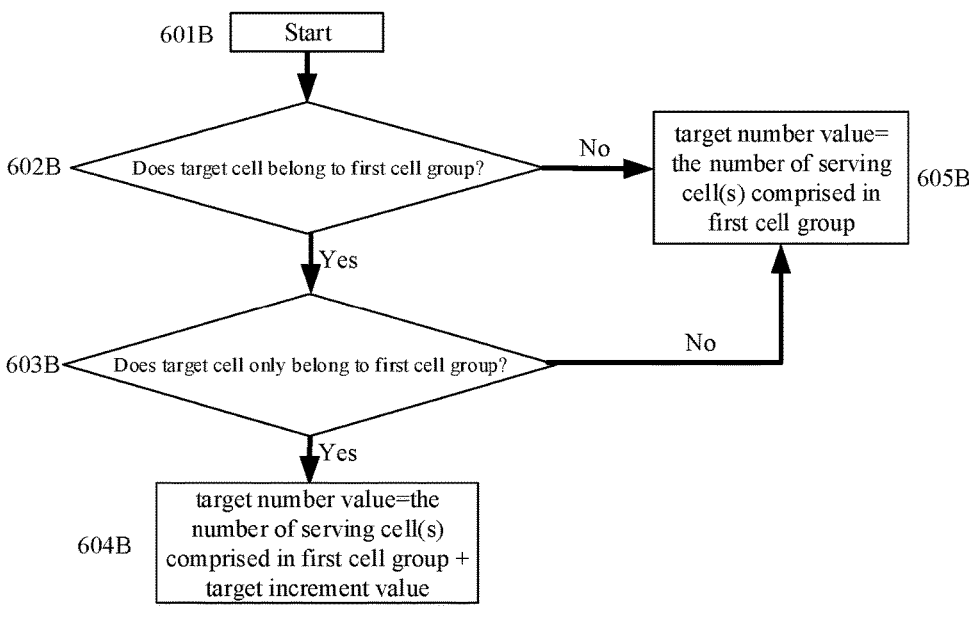
FIG. 6B illustrates a schematic diagram of a relation between a target cell and a first cell group according to one embodiment of the present disclosure.

Embodiment 6B illustrates a schematic diagram of a relation between a target cell and a first cell group according to one embodiment of the present disclosure, as shown in FIG. 6B. In FIG. 6B, start from 601B, judge whether a target cell belongs to a first cell group in 602B, judge whether a target cell only belongs to the first cell group in 603B, a target number value is equal to a sum of a number of serving cell(s) comprised in the first cell group plus a target increment value in 604B, and a target number value is equal to a number of serving cell(s) comprised in the first cell group in 605B.

In Embodiment 6B, when the target cell in the present disclosure only belongs to the first cell group in the W cell groups in the present disclosure, the target number value in the present disclosure is equal to a sum of a number of serving cell(s) comprised in the first cell group and the target increment value in the present disclosure; when the target cell does not belong to the first cell group, the target number value is equal to a number of serving cell(s) comprised in the first cell group.

In one embodiment, when the target cell only belongs to the first cell group in the W cell groups, the target cell does not belong to any cell group other than the first cell group in the W cells.

In one embodiment, when the target cell only belongs to the first cell group in the W cell groups, any cell group other than the first cell group in the W cells does not comprise the target cell.

In one embodiment, when the target cell belongs to the first cell group of the W cell groups and at least one cell group other than the first cell group simultaneously, the target number value is unrelated to the target increment value.

In one embodiment, when the target cell belongs to the first cell group of the W cell groups and at least one cell group other than the first cell group simultaneously, the target number value is equal to a number of serving cell(s) comprised in the first cell group.

In one embodiment, the target cell only belongs to one cell group in the W cells.

In one embodiment, the target cell belongs to more than one cell group in the W cells.

In one embodiment, the target number value being equal to a number of serving cell(s) comprised in the first cell group means that the target number value is unrelated to the target increment value.

In one embodiment, when the target cell does not belong to the first cell group, the first cell group does not include the target cell.

In one embodiment, when the target cell does not belong to the first cell group, any serving cell comprised in the first cell group is different from the target cell.

Embodiment 7A

Figure 7A:
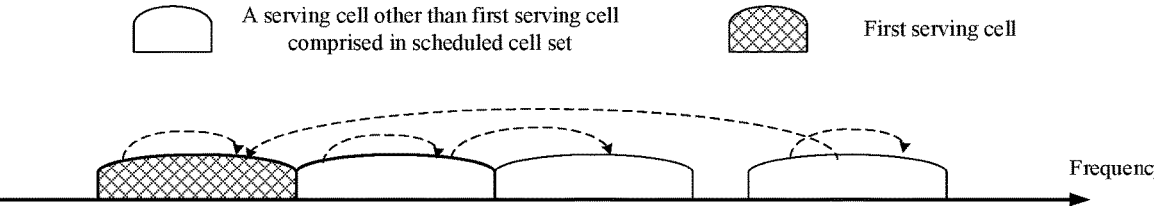
FIG. 7A illustrates a schematic diagram of a scheduling cell of a first serving cell according to one embodiment of the present disclosure.

Embodiment 7A illustrates a schematic diagram of scheduling cell(s) of a first serving cell according to one embodiment of the present disclosure, as shown in FIG. 7A. In FIG.

7A, the horizontal axis represents frequency, each block with an arc top represents a serving cell comprised in a scheduled cell set, each unfilled block with an arc top represents a serving cell other than the first serving cell comprised in the scheduled cell set, each cross line-filled block with an arc top represents a first serving cell, and a dotted arc with an arrow represents a scheduling and being scheduled relation between two serving cells.

In Embodiment 7A, a number of scheduling cell(s) of the first serving cell in the present disclosure is used for determining a cell group to which the first serving cell belongs out of the W cell groups in the present disclosure.

In one embodiment, the first transceiver receives an eighth information block, herein, the eighth information block is used for indicating a number of scheduling cell(s) of the first serving cell.

In one embodiment, a number of scheduling cell(s) of the first serving cell is equal to 1.

In one embodiment, a number of scheduling cells of the first serving cell is greater than 1.

In one embodiment, a number of scheduling cell(s) of the first serving cell is equal to one of 1 or 2.

In one embodiment, a number of scheduling cell(s) of the first serving cell is equal to one of 1 or 2 or 3.

In one embodiment, a number of scheduling cell(s) of the first serving cell can be greater than 3.

In one embodiment, only when the first serving cell is a Pcell and a scheduling cell of the first serving cell comprises an Scell, a number of scheduling cells of the first serving cell is greater than 1.

In one embodiment, only when the first serving cell is a Special Cell (Spcell) and a scheduling cell of the first serving cell comprises an Scell, a number of scheduling cells of the first serving cell is greater than 1.

In one embodiment, only when the first serving cell is a Pcell and a scheduling cell of the first serving cell comprises an Scell, a number of scheduling cells of the first serving cell is greater than 1; otherwise, a number of scheduling cells of the first serving cell is equal to 1.

In one embodiment, only when the first serving cell is a Pcell and a number of scheduling cells configured in the first serving cell is greater than 1, a number of scheduling cells of the first serving cell is greater than 1; otherwise, a number of scheduling cell(s) of the first serving cell is equal to 1.

In one embodiment, when the first serving cell is an Scell, a number of scheduling cell(s) of the first serving cell is equal to 1.

In one embodiment, when the first serving cell is an Scell, a number of scheduling cells of the first serving cell can be greater than 1.

In one embodiment, when the first serving cell is a Pcell and a scheduling cell of the first serving cell comprises an Scell, a number of scheduling cells of the first serving cell is greater than 1; when the first serving cell is an Scell, a number of scheduling cell(s) of the first serving cell is equal to 1; and when the first serving cell is a Pcell and the first serving cell only supports Self-Scheduling, a number of scheduling cell(s) of the first serving cell is equal to 1.

In one embodiment, the above phrase that a number of scheduling cell(s) of the first serving cell is used for determining a cell group to which the first serving cell belongs out of the W cell groups includes the following meaning: a number of scheduling cell(s) of the first serving cell is used by the first node in the present disclosure for determining a cell group to which the first serving cell belongs out of the W cell groups.

In one embodiment, the above phrase that a number of scheduling cell(s) of the first serving cell is used for determining a cell group to which the first serving cell belongs out of the W cell groups includes the following meaning: a number of scheduling cell(s) of the first serving cell is used for determining a cell group to which the first serving cell belongs out of the W cell groups according to a given condition relation.

In one embodiment, the above phrase that a number of scheduling cell(s) of the first serving cell is used for determining a cell group to which the first serving cell belongs out of the W cell groups includes the following meaning: a number of scheduling cell(s) of the first serving cell is used for determining a cell group to which the first serving cell belongs out of the W cell groups according to a given function relation.

In one embodiment, the above phrase that a number of scheduling cell(s) of the first serving cell is used for determining a cell group to which the first serving cell belongs out of the W cell groups includes the following meaning: the first serving cell is a Pcell, and whether a scheduling cell of the first serving cell comprises an Scell is used for determining a cell group to which the first serving cell belongs out of the W cell groups.

In one embodiment, the above phrase that a number of scheduling cell(s) of the first serving cell is used for determining a cell group to which the first serving cell belongs out of the W cell groups includes the following meaning: the first serving cell is an Spcell, and whether a scheduling cell of the first serving cell comprises an Scell is used for determining a cell group to which the first serving cell belongs out of the W cell groups.

In one embodiment, the above phrase that a number of scheduling cell(s) of the first serving cell is used for determining a cell group to which the first serving cell belongs out of the W cell groups is implemented by a claim 4 in the present disclosure.

In one embodiment, the above phrase that a number of scheduling cell(s) of the first serving cell is used for determining a cell group to which the first serving cell belongs out of the W cell groups is implemented by a claim 5 in the present disclosure.

Embodiment 7B

Figure 7B:
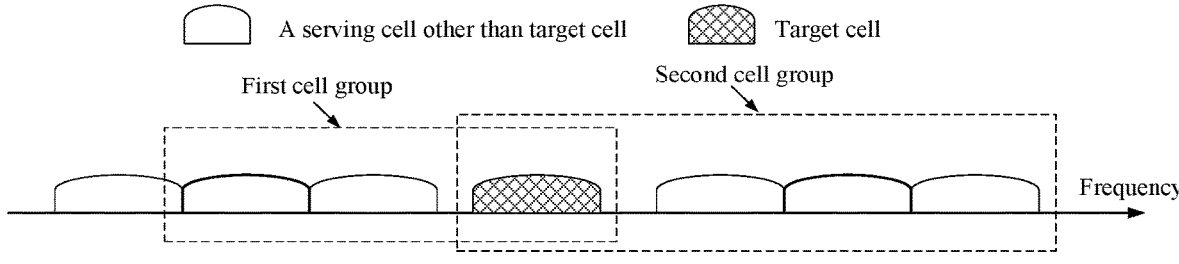
FIG. 7B illustrates a schematic diagram of a relation between a first cell group and a second cell group according to one embodiment of the present disclosure.

Embodiment 7B illustrates a schematic diagram of a relation between a first cell group and a second cell group according to one embodiment of the present disclosure, as shown in FIG. 7B. In FIG. 7B, the horizontal axis represents frequency, each block with an arc top represents a serving cell comprised in a first scheduled cell set, each unfilled block with an arc top represents a serving cell other than a target cell comprised in the first scheduled cell set, each cross line-filled block with an arc top represents the target cell, and serving cells surrounded by two dotted boxes respectively form a first cell group and a second cell group.

In Embodiment 7B, a second cell group is a cell group in the W cell groups in the present disclosure, and the first cell group and the second cell group in the present disclosure are different; when the target cell in the present disclosure belongs to the first cell group and the second cell group simultaneously, the target number value in the present disclosure is equal to a number of serving cell(s) comprised in the first cell group.

In one embodiment, the second cell group is a cell group other than the first cell group in the W cells.

In one embodiment, at least one serving cell comprised in the second cell group does not belong to the first cell group.

In one embodiment, at least one serving cell comprised in the first cell group does not belong to the second cell group.

In one embodiment, there exists at least one serving cell only belonging to one of the first cell group or the second cell group.

In one embodiment, the first cell group does not comprise the second cell group, and the second cell group does not comprise the first cell group.

In one embodiment, the first cell group comprises all serving cells comprised in the second cell group.

In one embodiment, the second cell group comprises all serving cells comprised in the first cell group.

In one embodiment, there at most exists a serving cell belonging to the first cell group and the second cell group simultaneously.

In one embodiment, there exists more than one serving cell belonging to the first cell group and the second cell group simultaneously.

In one embodiment, when the target cell belongs to the first cell group and the second cell group simultaneously, the target cell does not belong to any cell group other than the first cell group and the second cell group in the W cell groups.

In one embodiment, when the target cell belongs to the first cell group and the second cell group simultaneously, the target cell also belongs to at least one cell group other than the first cell group and the second cell group in the W cell groups.

In one embodiment, when the target cell belongs to the first cell group and the second cell group simultaneously, the first cell group comprises the target cell, and the second cell group comprises the target cell.

In one embodiment, W is equal to 2, and the W cell groups are the first cell group and the second cell group.

In one embodiment, W is greater than 2, and the W cell groups also comprise a cell group other than the first cell group and the second cell group.

Embodiment 8A

Figures 8A, 8B, 9A:
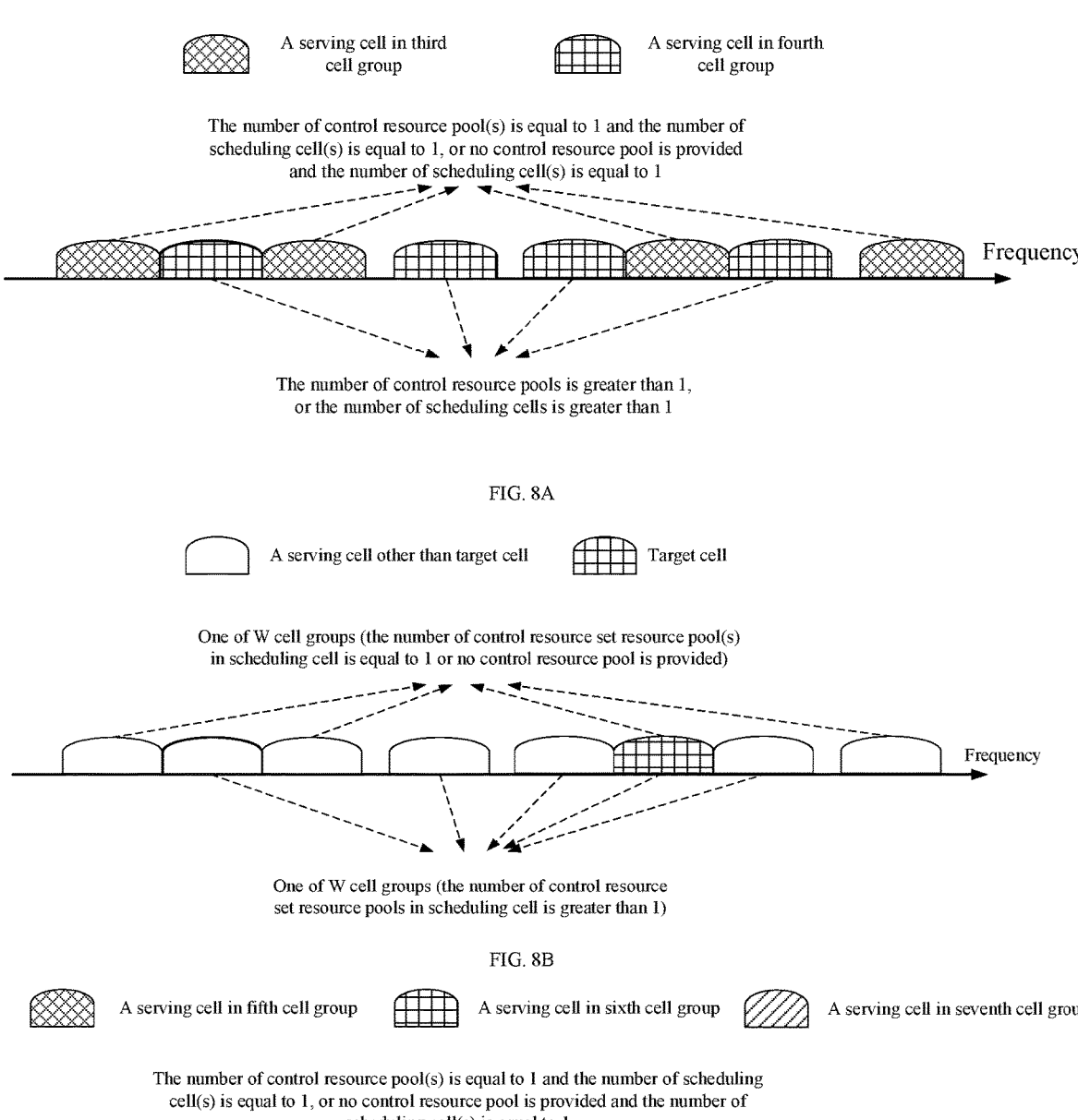
FIG. 8A illustrates a schematic diagram of a third cell group and a fourth cell group according to one embodiment of the present disclosure.
FIG. 8B illustrates a schematic diagram of relations of W cell groups and a number of control resource set resource pool(s) according to one embodiment of the present disclosure.
FIG. 9A illustrates a schematic diagram of a fifth cell group, a sixth cell group and a seventh cell group according to one embodiment of the present disclosure.

Embodiment 8A illustrates a schematic diagram of a relation between a third cell group and a fourth cell group according to one embodiment of the present disclosure, as shown in FIG. 8A. In FIG. 8A, the horizontal axis represents frequency, each cross line-filled block with an arc top represents a serving cell comprised in a third cell group, and each reticle-filled block with an arc top represents a serving cell comprised in a fourth cell group.

In Embodiment 8A, the W cell groups comprises a third cell group and a fourth cell group, and the third cell group is different from the fourth cell group; conditions under which the first serving cell in the present disclosure belongs to the third cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the fourth cell group include:

a number of control resource pools provided in a scheduling cell of the first serving cell is greater than 1; or, a number of scheduling cells of the first serving cell is greater than 1.

In one embodiment, W is equal to 2, and the W cell groups only comprise the third cell group and the fourth cell group.

In one embodiment, W is greater than 2, and the W cell groups also comprise a cell group other than the third cell group and the fourth cell group.

In one embodiment, there does not exist a serving cell belonging to the third cell group and the fourth cell group simultaneously.

In one embodiment, the third cell group is one of the W cell groups.

In one embodiment, the fourth cell group is one of the W cell groups.

In one embodiment, the first serving cell belongs to one of the third cell group or the fourth cell group.

In one embodiment, conditions under which the first serving cell belongs to the third cell group includes the following meaning: when the first serving cell meets one of no control resource pool is provided in a scheduling cell of the first serving cell and a number of scheduling cell(s) of the first serving cell is equal to 1 or a number of control resource pool(s) provided in a scheduling cell of the first serving cell is equal to 1 and a number of scheduling cell(s) of the first serving cell is equal to 1, the first serving cell belongs to the third cell group.

In one embodiment, conditions under which the first serving cell belongs to the fourth cell group includes the following meaning: when the first serving cell meets one of a number of control resource pools provided in a scheduling cell of the first serving cell is greater than 1 or a number of scheduling cells of the first serving cell is greater than 1, the first serving cell belongs to the fourth cell group.

Embodiment 8B

Embodiment 8B illustrates a schematic diagram of a relation of W cell groups and a number of control resource set resource pool(s) according to one embodiment of the present disclosure, as shown in FIG. 8B. In FIG. 8B, the horizontal axis represents frequency, each block with an arc top represents a serving cell comprised in a first scheduled cell set, each unfilled block with an arc top represents a serving cell other than a target cell comprised in the first scheduled cell set, and each reticle-filled block with an arc top represents a target cell.

In Embodiment 8B, the third information block in the present disclosure is used for determining a number of control resource set resource pool(s) in a scheduling cell of the target cell in the present disclosure, and a number of control resource set resource pool(s) in a scheduling cell of the target cell is used for determining a relation between the target cell and at least one of the W cell groups in the present disclosure.

In one embodiment, a scheduling cell of the target cell comprises the target cell.

In one embodiment, a scheduling cell of the target cell does not comprise the target cell.

In one embodiment, a number of scheduling cell(s) in the targe cell is equal to 1.

In one embodiment, a number of scheduling cells in the targe cell is equal to 2.

In one embodiment, a number of scheduling cells in the targe cell is greater than 2.

In one embodiment, a scheduling cell of the target cell is a serving cell carrying a PDCCH scheduling the target cell.

In one embodiment, a scheduling cell of the target cell is a serving cell carrying a PDCCH scheduling a signal on the target cell.

In one embodiment, a scheduling cell of the target cell is a serving cell in which a carried PDDCH can be used for scheduling the target cell.

In one embodiment, a scheduling cell of the target cell is a serving cell in which a carried PDDCH can be used for scheduling a signal on the target cell.

In one embodiment, a number of control resource set resource pool(s) in a scheduling cell of the target cell is used for determining a relation between the target cell and at least one of the W cell groups includes the following meaning: a number of control resource set resource pool(s) in a scheduling cell of the target cell is used by the first node in the present disclosure for determining a relation between the target cell and at least one of the W cell groups.

In one embodiment, a number of control resource set resource pool(s) in a scheduling cell of the target cell is used for determining a relation between the target cell and at least one of the W cell groups includes the following meaning: a number of control resource set resource pool(s) in a scheduling cell of the target cell is used for determining a relation between the target cell and at least one of the W cell groups according to a condition rule.

In one embodiment, a number of control resource set resource pool(s) in a scheduling cell of the target cell is used for determining a relation between the target cell and at least one of the W cell groups includes the following meaning: a number of control resource set resource pool(s) in a scheduling cell of the target cell is used for determining a cell group to which the target cell belongs in the W cell groups.

In one embodiment, a number of control resource set resource pool(s) in a scheduling cell of the target cell is used for determining a relation between the target cell and at least one of the W cell groups includes the following meaning: a number of control resource set resource pool(s) in a scheduling cell of the target cell is used for determining a relation between the target cell and at least one of the W cell groups.

In one embodiment, a number of control resource set resource pool(s) in a scheduling cell of the target cell is used for determining a relation between the target cell and at least one of the W cell groups includes the following meaning: a number of all control resource set resource pools in a scheduling cell of the target cell is used for determining a relation between the target cell and at least one of the W cell groups.

In one embodiment, a number of control resource set resource pool(s) in a scheduling cell of the target cell is used for determining a relation between the target cell and at least one of the W cell groups includes the following meaning: a number of index(es) of control resource set resource pool(s) in a scheduling cell of the target cell is used for determining a relation between the target cell and at least one of the W cell groups.

In one embodiment, a number of control resource set resource pool(s) in a scheduling cell of the target cell is used for determining a relation between the target cell and at least one of the W cell groups includes the following meaning: the target cell supports Self-Scheduling, and a number of control resource set resource pool(s) in the target cell is used for determining a relation between the target cell and at least one of the W cell groups.

In one embodiment, a number of control resource set resource pool(s) in a scheduling cell of the target cell is used for determining a relation between the target cell and at least one of the W cell groups includes the following meaning:

when a number of indexes of control resource set resource pools in a scheduling cell provided with most indexes of control resource set resource pools of the target cell is greater than 1, the target cell belongs to a cell group other than the first cell group in the W cell groups; when a number of index(es) of control resource set resource pool(s) in a scheduling cell provided with most index(es) of control resource set resource pool(s) of the target cell is equal to 1, the target cell belongs to the first cell group; when no scheduling cell of the target cell is provided with an index of a control resource set resource pool, the target cell belongs to the first cell group.

In one embodiment, a number of control resource set resource pool(s) in a scheduling cell of the target cell is used for determining a relation between the target cell and at least one of the W cell groups includes the following meaning: when there exists more than one scheduling cell in the target cell and there exist numbers of indexes of control resource set resource pools in two different scheduling cells of the target cell being different, the target cell belongs to the first cell group and a cell group other than the first cell group in the W cell groups simultaneously; when there exists more than one scheduling cell in the target cell and there exist numbers of indexes of control resource set resource pools in any two different scheduling cells of the target cell being the same, the target cell only belongs to one of the W cell groups; when there exists more than one scheduling cell in the target cell and no index of a control resource set resource pool in any scheduling cell in the target cell, the target cell only belongs to one of the W cell groups.

In one embodiment, a number of control resource set resource pool(s) in a scheduling cell of the target cell is used for determining a relation between the target cell and at least one of the W cell groups includes the following meaning: there only exists one scheduling cell in the target cell, when a number of indexes of control resource set resource pools in a scheduling cell of the target cell is greater than 1, the target cell belongs to a cell group other than the first cell group in the W cell groups; when a number of index(es) of control resource set resource pool(s) in a scheduling cell of the target cell is equal to 1, the target cell belongs to the first cell group; and when no index of a control resource set resource pool is provided in a scheduling cell of the target cell, the target cell belongs to the first cell group.

In one embodiment, a number of control resource set resource pool(s) in a scheduling cell of the target cell is used for determining a relation between the target cell and at least one of the W cell groups is implemented by claim 5 in the present disclosure.

In one embodiment, a number of control resource set resource pool(s) in a serving cell refers to a number of index(es) of control resource set resource pool(s) in the serving cell.

Embodiment 9A

Embodiment 9A illustrates a schematic diagram of a fifth cell group, a sixth cell group and a seventh cell group according to one embodiment of the present disclosure, as shown in FIG. 9A. In FIG. 9A, the horizontal axis represents frequency, each cross line-filled block with an arc top represents a serving cell comprised in a fifth cell group, each reticle-filled block with an arc top represents a serving cell comprised in a sixth cell group, and each slash-filled block with an arc top represents a serving cell comprised in a seventh cell group.

In Embodiment 9A, the W cell groups in the present disclosure comprise a fifth cell group, a sixth cell group and a seventh cell group, and any two among the fifth cell group, the sixth cell group and the seventh cell group are different; conditions under which the first serving cell in the present disclosure belongs to the fifth cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the sixth cell group include:

a number of control resource pools provided in a scheduling cell of the first serving cell is greater than 1, and a number of scheduling cell(s) of the first serving cell is equal to 1;

conditions under which the first serving cell belongs to the seventh cell group include:

a number of scheduling cells of the first serving cell is greater than 1.

In one embodiment, W is equal to 3, and the W cell groups only comprise the fifth cell group, the sixth cell group and the seventh cell group.

In one embodiment, W is greater than 3, and the W cell groups also comprise a cell group other than the fifth cell group, the sixth cell group, and the seventh cell group.

In one embodiment, the first serving cell belongs to one of the fifth cell group, the sixth cell group or the seventh cell group.

In one embodiment, there exist no serving cell belonging to two cell groups among the fifth cell group, the sixth cell group and the seventh cell group simultaneously.

In one embodiment, the fifth cell group is one of the W cell groups.

In one embodiment, the sixth cell group is one of the W cell groups.

In one embodiment, the seventh cell group is one of the W cell groups.

In one embodiment, the fifth cell group is the same as the third cell group in the present disclosure.

In one embodiment, conditions under which the first serving cell belongs to the fifth cell group includes the following meaning: when the first serving cell meets one of no control resource pool is provided in a scheduling cell of the first serving cell and a number of scheduling cell(s) of the first serving cell is equal to 1 or a number of control resource pool(s) provided in a scheduling cell of the first serving cell is equal to 1 and a number of scheduling cell(s) of the first serving cell is equal to 1, the first serving cell belongs to the fifth cell group.

In one embodiment, conditions under which the first serving cell belongs to the sixth cell group includes the following meaning: when the first serving cell meets a number of control resource pools provided in a scheduling cell of the first serving cell is greater than 1 and a number of scheduling cell(s) of the first serving cell is equal to 1, the first serving cell belongs to the sixth cell group.

In one embodiment, conditions under which the first serving cell belongs to the seventh cell group includes the following meaning: when a number of scheduling cells of the first serving cell is greater than 1, the first serving cell belongs to the seventh cell group.

Embodiment 9B

Figures 9B, 10A, 10B, 11A, 11B:
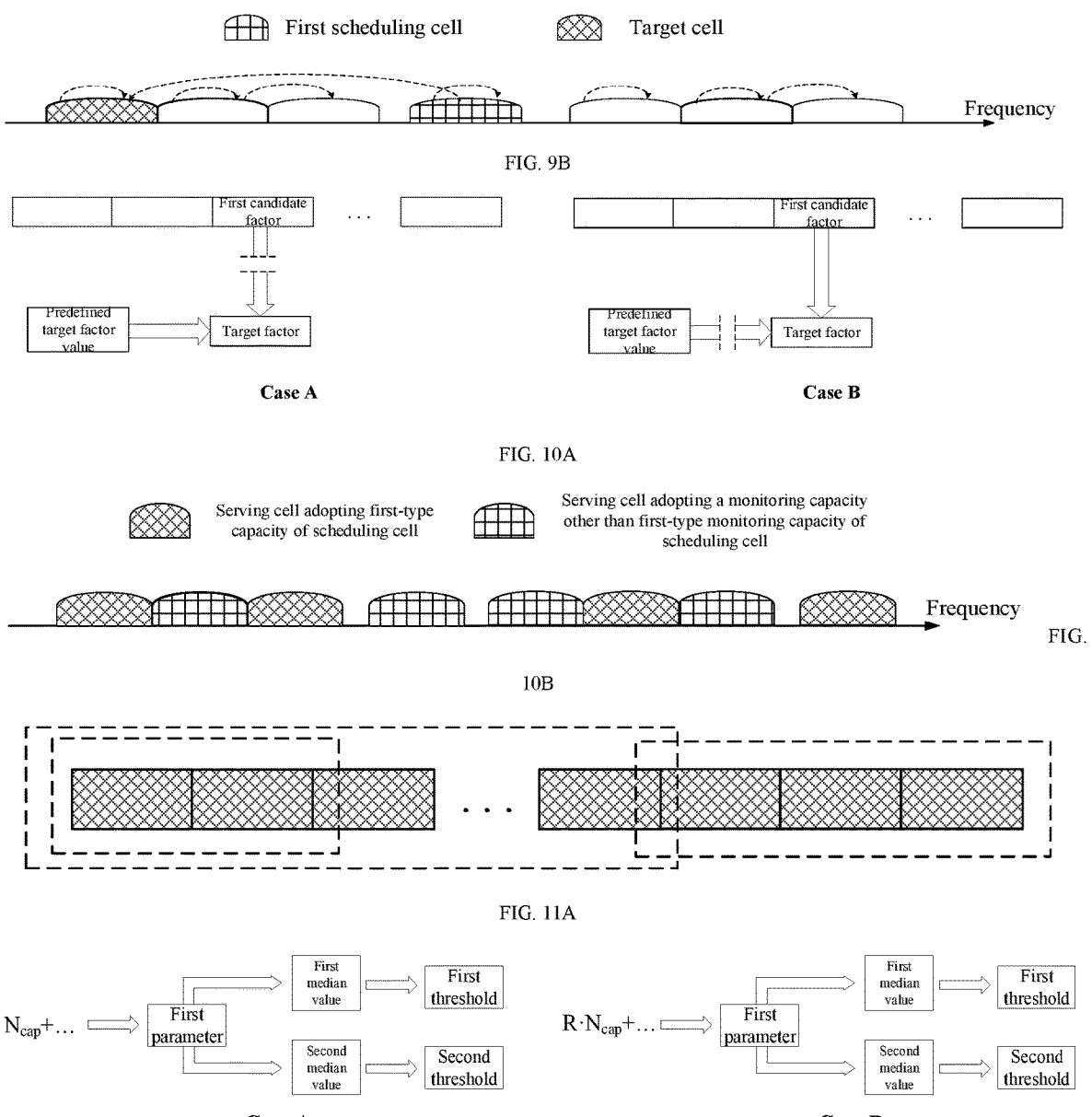
FIG. 9B illustrates a schematic diagram of a relation of a scheduling cell and a target cell according to one embodiment of the present disclosure.
FIG. 10A illustrates a schematic diagram of a relation of a first candidate factor and a target factor according to one embodiment of the present disclosure.
FIG. 10B illustrates a schematic diagram of a first-type monitoring capability according to one embodiment of the present disclosure.
FIG. 11A illustrates a schematic diagram of G candidate factor sets according to one embodiment of the present disclosure.
FIG. 11B illustrates a schematic diagram of a first parameter according to one embodiment of the present disclosure.

Embodiment 9B illustrates a schematic diagram of a relation of a scheduling cell and a target cell according to one embodiment of the present disclosure, as shown in FIG. 9B. In FIG. 9B, the horizontal axis represents frequency, each block with an arc top represents a serving cell, a reticle-filled block with an arc top represents a first scheduling cell, a cross line-filled block with an arc top represents a target cell, and a dotted line with an arrow between serving cells represents a scheduling relation between serving cells.

In Embodiment 9B, both a first scheduling cell and the target cell in the present disclosure are scheduling cells of the target cell, and the first scheduling cell is a serving cell other than the target cell; a relation between a number of control resource set resource pool(s) in the first scheduling cell and a number of control resource set resource pool(s) in the target cell is used for determining a cell group to which the target cell belongs in the W cell groups, or one of a number of control resource set resource pool(s) in the first scheduling cell or a number of control resource set resource pool(s) in the target cell is used for determining a cell group to which the target cell belongs in the W cell groups in the present disclosure.

In one embodiment, the first scheduling cell and the target cell are two different serving cells.

In one embodiment, the first scheduling cell belongs to the first scheduled cell set.

In one embodiment, the first scheduling cell belongs to a cell other than the first scheduled cell set.

In one embodiment, a number of control resource set resource pool(s) in the first scheduling cell is equal to a number of index(es) of control resource set resource pool(s) in the first scheduling cell.

In one embodiment, a number of control resource set resource pool(s) in the first scheduling cell is equal to a number of index(es) of the control resource set resource pool(s) in the first scheduling cell, and a number of index(es) of control resource set resource pool(s) in the first scheduling cell is equal to one of 0, 1 or 2, where "0" represents that no index of a control resource set resource pool is provided in the first scheduling cell.

In one embodiment, a number of control resource set resource pool(s) in the target cell is equal to a number of index(es) of control resource set resource pool(s) in the target cell.

In one embodiment, a number of control resource set resource pool(s) in the target cell is equal to a number of index(es) of the control resource set resource pool(s) in the target cell, and a number of index(es) of control resource set resource pool(s) in the target cell is equal to one of 0, 1 or 2, where "0" represents no index of a control resource set resource pool is provided in the target cell.

In one embodiment, a relation between a number of control resource set resource pool(s) in the first scheduling cell and a number of control resource set resource pool(s) in the target cell refers to: whether a number of control resource set resource pool(s) in the first scheduling cell is equal to a number of control resource set resource pool(s) in the target cell.

In one embodiment, a relation between a number of control resource set resource pool(s) in the first scheduling cell and a number of control resource set resource pool(s) in the target cell refers to a size relation between a number of control resource set resource pool(s) in the first scheduling cell and a number of control resource set resource pool(s) in the target cell.

In one embodiment, a relation between a number of control resource set resource pool(s) in the first scheduling cell and a number of control resource set resource pool(s) in the target cell refers to a difference value between a number of control resource set resource pool(s) in the first scheduling cell and a number of control resource set resource pool(s) in the target cell.

In one embodiment, the above phrase that a relation between a number of control resource set resource pool(s) in the first scheduling cell and a number of control resource set resource pool(s) in the target cell is used for determining a cell group to which the target cell belongs in the W cell groups includes the following meaning: when a number of control resource set resource pool(s) in the first scheduling cell is equal to a number of control resource set resource pool(s) in the target cell, the target cell only belongs to one of the w cell groups; and when a number of control resource set resource pool(s) in the first scheduling cell is not equal to a number of control resource set resource pool(s) in the target cell, the target cell belongs to two different cell groups in the W cell groups.

In one embodiment, the above phrase that a relation between a number of control resource set resource pool(s) in the first scheduling cell and a number of control resource set resource pool(s) in the target cell is used for determining a cell group to which the target cell belongs in the W cell groups includes the following meaning: when a number of control resource set resource pool(s) in the first scheduling cell is less than a number of control resource set resource pool(s) in the target cell, the target cell belongs to the first cell group; when a number of control resource set resource pool(s) in the first scheduling cell is greater than a number of control resource set resource pool(s) in the target cell, the target cell belongs to a cell group other than the first cell group in the W cell groups; and when a number of control resource set resource pool(s) in the first scheduling cell is equal to a number of control resource set resource pool(s) in the target cell, a number of control resource set resource pool(s) in the first scheduling cell is used for determining whether the target cell belongs to the first cell group.

In one embodiment, the above phrase that a relation between a number of control resource set resource pool(s) in the first scheduling cell and a number of control resource set resource pool(s) in the target cell is used for determining a cell group to which the target cell belongs in the W cell groups includes the following meaning: a relation between a number of control resource set resource pool(s) in the first scheduling cell and a number of control resource set resource pool(s) in the target cell is used by the first node in the present disclosure for determining a cell group to which the target cell belongs in the W cell groups.

In one embodiment, the above phrase that a relation between a number of control resource set resource pool(s) in the first scheduling cell and a number of control resource set resource pool(s) in the target cell is used for determining a cell group to which the target cell belongs in the W cell groups includes the following meaning: a relation between a number of control resource set resource pool(s) in the first scheduling cell and a number of control resource set resource pool(s) in the target cell is used for determining a cell group to which the target cell belongs according to a condition relation.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: one of a number of control resource set resource pool(s) in the first scheduling cell or a number of control resource set resource pool(s) in the target cell is used by the first node in the present disclosure for determining a cell group to which the target cell belongs in the W cell groups.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: one of a number of control resource set resource pool(s) in the first scheduling cell or a number of control resource set resource pool(s) in the target cell is used by the first node in the present disclosure for determining a cell group to which the target cell belongs in the W cell groups.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: one of a number of control resource set resource pool(s) in the first scheduling cell or a number of control resource set resource pool(s) in the target cell is used for determining whether the target cell belongs to the first cell group.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: a larger value compared between a number of control resource set resource pool(s) in the first scheduling cell and a number of control resource set resource pool(s) in the target cell is used for determining a cell group to which the target cell belongs in the W cell groups.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: a smaller value compared between a number of control resource set resource pool(s) in the first scheduling cell and a number of control resource set resource pool(s) in the target cell is used for determining a cell group to which the target cell belongs in the W cell groups.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: a number of control resource set resource pool(s) in a serving cell with a larger serving cell index value in the first scheduling cell and the target cell is used for determining a cell group to which the target cell belongs in the W cell groups.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: a number of control resource set resource pool(s) in a serving cell with a smaller serving cell index value in the first scheduling cell and the target cell is used for determining a cell group to which the target cell belongs in the W cell groups.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: when a number of control resource set resource pools in a serving cell with a smaller serving cell index value in the first scheduling cell and the target cell is greater than 1, the target cell belongs to a cell group other than the first cell group in the W cell groups; when a number of control resource set resource pool(s) in a serving cell with a smaller serving cell index value in the first scheduling cell and the target cell is less than or equal to 1, the target cell belongs to the first cell group.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: when a larger value compared between a number of control resource set resource pool(s) in the first scheduling cell and a number of control resource set resource pool(s) in the target cell is greater than 1, the target cell belongs to a cell group other than the first cell group in the W cell groups; when a larger value compared between a number of control resource set resource pool(s) in the first scheduling cell and a number of control resource set resource pool(s) in the target cell is less than or equal to 1, the target cell belongs to the first cell group.

In one embodiment, the above phrase that one of a number of control resource set resource pool(s) in the first scheduling cell or a number of control resource set resource pool(s) in the target cell is used for determining a cell group to which the target cell belongs in the W cell groups includes the following meaning: when a smaller value compared between a number of control resource set resource pool(s) in the first scheduling cell and a number of control resource set resource pool(s) in the target cell is greater than 1, the target cell belongs to a cell group other than the first cell group in the W cell groups; when a smaller value compared between a number of control resource set resource pool(s) in the first scheduling cell and a number of control resource set resource pool(s) in the target cell is less than or equal to 1, the target cell belongs to the first cell group.

Embodiment 10A

Embodiment 10A illustrates a schematic diagram of a relation of a first candidate factor and a target factor according to one embodiment of the present disclosure, as shown in FIG. 10A. In FIG. 10A, each identified rectangle represents a candidate factor other than the first candidate factor in a first candidate factor set; in case A, a target factor is equal to a predefined value; and in case B, a target factor is equal to a first candidate factor.

In Embodiment 10A, the second information block in the present disclosure is used for indicating a first candidate factor out of a first candidate factor set, the first candidate factor set comprises more than one candidate factor, the first candidate factor is a candidate factor comprised in the first candidate factor set, and any candidate factor comprised in the first candidate factor set is greater than 0; the third information block in the present disclosure is used for determining whether the target factor in the present disclosure is equal to the first candidate factor in the present disclosure; when the target factor is not equal to the first candidate factor, the target factor is equal to a predefined value.

In one embodiment, when the first node does not transmit indication information of the first candidate factor, the first candidate factor is equal to a default value.

In one embodiment, when the first node does not transmit indication information of the first candidate factor, the first candidate factor is equal to a predefined value.

In one embodiment, the first candidate factor set is pre-defined.

In one embodiment, the first candidate factor set is fixed.

In one embodiment, the first candidate factor set is configurable.

In one embodiment, any two candidate factors comprised in the first candidate factor set are not equal.

In one embodiment, the above phrase that the target factor is equal to a predefined value includes the following meaning: the target factor is equal to 1.

In one embodiment, the above phrase that the target factor is equal to a predefined value includes the following meaning: the target factor is equal to a fixed value other than 1.

In one embodiment, when the first node in the present disclosure is not provided with information on whether the target factor is equal to the first candidate factor, the target factor is equal to a predefined value.

In one embodiment, when the first node in the present disclosure is not provided with information on whether the target factor is equal to the first candidate factor, the target factor is equal to 1.

In one embodiment, when the first node in the present disclosure does not transmit indication information of the second parameter in the present disclosure, the target factor is equal to a predefined value.

In one embodiment, when the first node in the present disclosure does not transmit indication information of the second parameter in the present disclosure, the target factor is equal to 1.

Embodiment 10B

Embodiment 10B illustrates a schematic diagram of a first-type monitoring capability according to one embodiment of the present disclosure, as shown in FIG. 10B. In FIG. 10B, the horizontal axis represents frequency, each block with an arc top represents a serving cell, each cross line-filled block with an arc top represents a serving cell adopting a first-type monitoring capability in a scheduling cell, and each reticle-filled block with an arc top represents a serving cell adopting a monitoring capability other than the first-type monitoring capability in the scheduling cell.

In Embodiment 10B, a first-type monitoring capability is adopted in a scheduling cell of any serving cell comprised in the first scheduled cell set in the present disclosure, and the first information block in the present disclosure is used for indicating the first-type monitoring capability; and the first-type monitoring capability is used for determining a time length of the first time window in the present disclosure.

In one embodiment, when a time length of the first time window is less than a time length of a slot, a number of control resource set resource pool(s) provided in a scheduling cell of any serving cell comprised in the first scheduled cell set is not greater than 1.

In one embodiment, when a time length of the first time window is less than a time length of a slot, a number of control resource set resource pool(s) provided in any serving cell comprised in the first scheduled cell set is not greater than 1.

In one embodiment, when a number of multi-carrier symbol(s) comprised in the first time window is equal to a number of multi-carrier symbol(s) comprised in a span, a number of control resource set resource pool(s) provided in a scheduling cell of any serving cell comprised in the first scheduled cell set is not greater than 1.

In one embodiment, when a number of multi-carrier symbol(s) comprised in the first time window is equal to a number of multi-carrier symbol(s) comprised in a span, a number of control resource set resource pool(s) provided in any serving cell comprised in the first scheduled cell set is not greater than 1.

In one embodiment, when a number of multi-carrier symbol(s) comprised in the first time window is equal to a positive integer comprised in a combination, a number of control resource set resource pool(s) provided in a scheduling cell of any serving cell comprised in the first scheduled cell set is not greater than 1.

In one embodiment, when a number of multi-carrier symbol(s) comprised in the first time window is equal to a positive integer comprised in a combination, a number of control resource set resource pool(s) provided in any serving cell comprised in the first scheduled cell set is not greater than 1.

In one embodiment, the first-type monitoring capability is a Release 16 PDCCH monitoring capability.

In one embodiment, the first-type monitoring capability is a Release 15 PDCCH monitoring capability.

In one embodiment, the first-type monitoring capability is a capability monitoring a PDCCH candidate based on a span.

In one embodiment, the first-type monitoring capability is a capability monitoring a PDCCH candidate based on a slot.

In one embodiment, the first-type monitoring capability is a capability monitoring a PDCCH candidate in a time interval less than a slot.

In one embodiment, the first-type monitoring capability is a capability supporting monitoring a PDCCH candidate in Ultra-reliable and Low Latency Communications (URLLC).

In one embodiment, the first-type monitoring capability is one of two candidate monitoring capabilities, and the two candidate monitoring capabilities are respectively a Release 16 PDCCH monitoring capability and a Release 15 PDCCH monitoring capability.

In one embodiment, the first-type monitoring capability is one of two candidate monitoring capabilities, and the two candidate monitoring capabilities are respectively a capability monitoring a PDCCH candidate based on a span and a capability monitoring a PDCCH candidate based on a slot.

In one embodiment, the above phrase that the first information block is used for indicating the first monitoring capability includes the following meaning: the first information block is used for implicitly indicating the first-type monitoring capability.

In one embodiment, the above phrase that the first information block is used for indicating the first monitoring capability includes the following meaning: the first information block is used for indirectly indicating the first-type monitoring capability.

In one embodiment, the above phrase that the first information block is used for indicating the first monitoring capability includes the following meaning: the first information block is used for indicating a monitoring capability adopted in a scheduling cell of each serving cell comprised in the first scheduled cell set, and the monitoring capability adopted in a scheduling cell of each serving cell comprised in the first scheduled cell set is the first-type monitoring capability.

In one embodiment, the above phrase that adopting a first-type monitoring capability in a scheduling cell of any serving cell comprised in the first scheduled cell set includes the following meaning: the first node in the present disclosure adopts the first-type monitoring capability to monitor a PDCCH candidate in a scheduling cell of any serving cell comprised in the first scheduled cell set.

In one embodiment, the above phrase that adopting a first-type monitoring capability in a scheduling cell of any serving cell comprised in the first scheduled cell set includes the following meaning: a scheduling cell of any serving cell comprised in the first scheduled cell set is configured with the first-type monitoring capability.

In one embodiment, the above phrase that adopting a first-type monitoring capability in a scheduling cell of any serving cell comprised in the first scheduled cell set includes the following meaning: a scheduling cell of any serving cell comprised in the first scheduled cell set is configured by the first information block with the first-type monitoring capability.

In one embodiment, the above phrase that adopting a first-type monitoring capability in a scheduling cell of any serving cell comprised in the first scheduled cell set includes the following meaning: a scheduling cell of any serving cell comprised in the first scheduled cell set is associated with the first-type monitoring capability.

In one embodiment, the above phrase that the first-type monitoring capability is used for determining a time length of the first time window includes the following meaning: the first type of monitoring capability is used for determining the number of multi-carrier symbol(s) comprised in the first time window.

In one embodiment, the above phrase that the first-type monitoring capability is used for determining a time length of the first time window includes the following meaning: when the first-type monitoring capability is a Release 16 PDCCH monitoring capability, a time length of the first time window is less than a time length of a slot; when the first-type monitoring capability is a Release 15 PDCCH monitoring capability, a time length of the first time window is equal to a time length of a slot.

In one embodiment, the above phrase that the first-type monitoring capability is used for determining a time length of the first time window includes the following meaning: the first-type monitoring capability is used for determining a time length of the first time window.

In one embodiment, the above phrase that the first-type monitoring capability is used for determining a time length of the first time window includes the following meaning: the first-type monitoring capability is used for determining a size relation between a time length of the first time window and a time length of a slot.

In one embodiment, the above phrase that the first-type monitoring capability is used for determining a time length of the first time window includes the following meaning: the first-type monitoring capability is used for determining whether a time length of the first time window is less than or equal to a time length of a slot.

In one embodiment, the above phrase that the first-type monitoring capability is used for determining a time length of the first time window includes the following meaning: the first-type monitoring capability is used for determining whether a number of multicarrier symbol(s) comprised in the first time window is equal to 14.

In one embodiment, the above phrase that the first-type monitoring capability is used for determining a time length of the first time window includes the following meaning: the first-type monitoring capability is used for determining whether a number of multicarrier symbol(s) comprised in the first time window is equal to 12.

Embodiment 11A

Embodiment 11A illustrates a schematic diagram of G candidate factor sets according to one embodiment of the present disclosure, as shown in FIG. 11A. In FIG. 11A, each cross line-filled rectangle represents a candidate factor comprised in G candidate factor sets, and each dotted line-circled rectangle belongs to one of the G candidate factor sets.

In Embodiment 11A, the first candidate factor set in the present disclosure is one of G candidate factor sets, G being a positive integer greater than 1; any of the G candidate factor sets comprises more than one candidate factor; the fourth information block in the present disclosure is used for indicating the first candidate factor set out of the G candidate factor sets.

In one embodiment, when the first node does not transmit indication information of the first candidate factor set, the first candidate factor set comprises a default candidate factor.

In one embodiment, when the first node does not transmit indication information of the first candidate factor set, the first candidate factor set comprises a predefined candidate factor.

In one embodiment, when the first node in the present disclosure does not transmit indication information of the second parameter in the present disclosure, the first candidate factor set comprises a default candidate factor.

In one embodiment, when the first node in the present disclosure does not transmit indication information of the second parameter in the present disclosure, the first candidate factor set comprises a predefined candidate factor.

In one embodiment, any candidate factor comprised in any of the G candidate factor sets is greater than 0.

In one embodiment, G is equal to 2.

In one embodiment, G is greater than 2.

In one embodiment, any two of the G candidate factor sets are not the same.

In one embodiment, there does not exist a candidate factor belonging to two of the G candidate factor sets simultaneously.

In one embodiment, there exists a candidate factor belonging to two of the G candidate factor sets simultaneously.

In one embodiment, there exists any candidate factor comprised in one of the G candidate factor sets belonging to another one of the G candidate factor sets.

In one embodiment, there exists one of the G candidate factor sets comprising another one candidate factor set.

In one embodiment, the second candidate factor set is a candidate factor set other than the first candidate factor set in the G candidate factor sets; the first candidate factor set comprises the second candidate factor set, or the second candidate factor set comprises the first candidate factor set.

In one embodiment, the second candidate factor set is a candidate factor set other than the first candidate factor set in the G candidate factor sets; any candidate factor comprised in the first candidate factor set belongs to the second candidate factor set, or any candidate factor comprised in the second candidate factor set belongs to the first candidate factor set.

In one embodiment, the first transceiver receives a seventh information block, and the seventh information block is used for indicating the first candidate factor set.

Embodiment 11B

Embodiment 11B illustrates a schematic diagram of a first parameter according to one embodiment of the present disclosure, as shown in FIG. 11B. In FIG. 11B, in each case of case A and case B, a rectangle represents a first parameter, a rectangle represents a first median value, a rectangle represents a second median value, a rectangle represents a first threshold, a rectangle represents a second threshold, an arrow represents the determining process, and $N_{eap}$ represents a target number; in case A, a first parameter is linearly correlated to a target number value; in case B, a first parameter is linearly correlated to a product of a target number value and a first factor, and R represents a first factor.

In Embodiment 11B, the first threshold in the present disclosure is equal to a largest integer not greater than a first median value, and the second threshold in the present disclosure is equal to a largest integer not greater than a second median value; a first parameter is used for determining the first median value and the second median value, and the first parameter is greater than 0; the first parameter is linearly correlated to the target number value in the present disclosure, or the first parameter is linearly correlated to a product of the target number value and a first factor, and the fourth information block in the present disclosure is used for indicating the first factor.

In one embodiment, when the first node does not transmit indication information of the first factor, the first factor is equal to a default value.

In one embodiment, when the first node does not transmit indication information of the first factor, the first factor is equal to a predefined value.

In one embodiment, the first threshold value is the first median value rounded down to a nearest integer.

In one embodiment, the second threshold value is the second median value rounded down to a nearest integer.

In one embodiment, the first median value is a positive integer.

In one embodiment, the first median value is a non-integer.

In one embodiment, the second median value is a positive integer.

In one embodiment, the second median value is a non-integer.

In one embodiment, the above phrase that a first parameter is used for determining the first median value and the second median value includes the following meaning: the first parameter is used by the first node in the present disclosure for determining the first median value and the second median value.

In one embodiment, the above phrase that a first parameter is used for determining the first median value and the second median value includes the following meaning: the first parameter is used for determining the first median value and the second median value according to an operation function.

In one embodiment, the above phrase that a first parameter is used for determining the first median value and the second median value includes the following meaning: the first median value is directly proportional to the first parameter, and the second median value is directly proportional to the first parameter.

In one embodiment, the above phrase that a first parameter is used for determining the first median value and the second median value includes the following meaning: the first median value is linearly correlated to the first parameter, and the second median value is linearly correlated to the first parameter.

In one embodiment, the above phrase that a first parameter is used for determining the first median value and the second median value includes the following meaning: the first median value is directly proportional to the first parameter, and the second median value is directly proportional to the first parameter; a proportion coefficient between the first median value and the first parameter is a fixed value, or a proportion coefficient between the first median value and the first parameter is a configurable value; a proportion coefficient between the second median value and the first parameter is a fixed value, or a proportion coefficient between the second median value and the first parameter is a configurable value.

In one embodiment, the above phrase that a first parameter is used for determining the first median value and the second median value includes the following meaning: the first median value is directly proportional to the first parameter, and the second median value is directly proportional to the first parameter; a proportion coefficient between the first median value and the first parameter is related to the first SCS; and a proportion coefficient between the second median value and the first parameter is related to the first SCS.

In one embodiment, the above phrase that a first parameter is used for determining the first median value and the second median value includes the following meaning: the first median value is directly proportional to the first parameter, and the second median value is directly proportional to the first parameter; the second parameter in the present disclosure is used for determining a proportion coefficient between the first median value and the first parameter; and the second parameter in the present disclosure is used for determining a proportion coefficient between the second median value and the first parameter;

In one embodiment, the first parameter is a positive integer.

In one embodiment, the first parameter is not an integer.

In one embodiment, the first factor is not greater than 2.

In one embodiment, the first factor is a positive integer.

In one embodiment, the first factor may not be an integer.

In one embodiment, the first factor is not greater than 4.

In one embodiment, the first factor is equal to one of 1 or 2.

In one embodiment, when the first parameter is linearly correlated to the target number value, a linear correlation coefficient between the first parameter and the target number value is equal to 1.

In one embodiment, when the first parameter is linearly correlated to the target number value, a linear correlation coefficient between the first parameter and the target number value is greater than 1.

In one embodiment, when the first parameter is linearly correlated to a product of the target number value and the first factor, a correlation coefficient between the first parameter and a product of the target number value and the first factor is equal to 1.

In one embodiment, when the first parameter is linearly correlated to a product of the target number value and the first factor, a correlation coefficient between the first parameter and a product of the target number value and the first factor is greater than 1.

In one embodiment, when a number of index(es) of control resource set resource pool(s) provided in a scheduling cell of any serving cell comprised in the first cell group is less than or equal to 1, the first parameter is linearly correlated to the target number value; and when a number of indexes of control resource set resource pools provided in a scheduling cell of any serving cell comprised in the first cell group is greater than 1, the first parameter is linearly correlated to a product of the target number value and a first factor.

In one embodiment, a number of index(es) of control resource set resource pool(s) provided in a scheduling cell of a serving cell comprised in the first cell group is used for determining whether the first parameter is linearly correlated to the target number value or to a product of the target number value and a first factor.

In one embodiment, a number of index(es) of control resource set resource pool(s) provided in a serving cell comprised in the first cell group is used for determining whether the first parameter is linearly correlated to the target number value or to a product of the target number value and a first factor.

Embodiment 12A

Figures 12A, 12B, 13A, 13B, 14A:
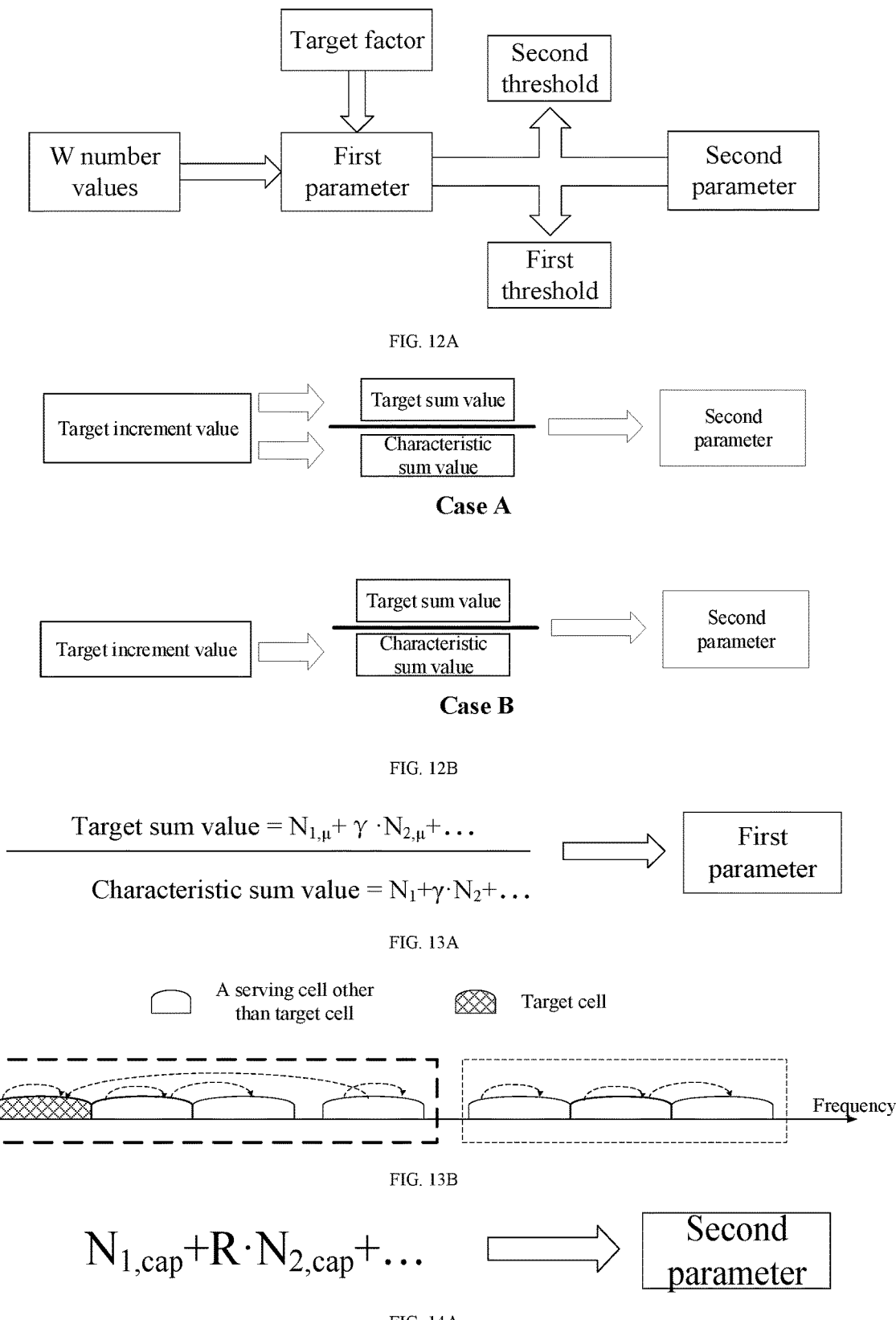
FIG. 12A illustrates a schematic diagram of relations among a first parameter, a second parameter, a first threshold and a second threshold according to one embodiment of the present disclosure.
FIG. 12B illustrates a schematic diagram of a target sum value and a characteristic sum value according to one embodiment of the present disclosure.
FIG. 13A illustrates a schematic diagram of a target sum value and a characteristic sum value according to one embodiment of the present disclosure.
FIG. 13B illustrates a schematic diagram of a first cell group according to one embodiment of the present disclosure.
FIG. 14A illustrates a schematic diagram of a second parameter according to one embodiment of the present disclosure.

Embodiment 12A illustrates a schematic diagram of relations among a first parameter, a second parameter, a first threshold and a second threshold according to one embodiment of the present disclosure, as shown in FIG. 12A. In FIG. 12A, a rectangle represents W number values, a rectangle represents a target factor, a rectangle represents a first parameter, a rectangle represents a second parameter, a rectangle represents a first threshold, a rectangle represents a second threshold, and an arrow represents the determining process.

In Embodiment 12A, the W number values in the present disclosure and the target factor in the present disclosure are used together for determining a first parameter, the first parameter and a second parameter are used together for determining the first threshold in the present disclosure and the second threshold in the present disclosure, the second parameter being a positive integer.

In one embodiment, the first parameter is greater than 0.

In one embodiment, the first parameter is less than or equal to 1 and greater than 0.

In one embodiment, the first parameter is equal to 1.

In one embodiment, the first parameter is less than 1 and greater than 0.

In one embodiment, the first parameter is greater than 1.

In one embodiment, the above phrase that the W number values and the target factor are used together for determining a first parameter includes the following meaning: the W number values and the target factor are used together by the first node in the present disclosure for determining the first parameter.

In one embodiment, the above phrase that the W number values and the target factor are used together for determining a first parameter includes the following meaning: the W number values and the target factor are used for determining the first parameter according to a given mapping relation.

In one embodiment, the above phrase that the W number values and the target factor are used together for determining a first parameter includes the following meaning: the W number values and the target factor are used for determining the first parameter according to a given operation function.

In one embodiment, the above phrase that the W number values and the target factor are used together for determining a first parameter is implemented by claim 9 in the present disclosure.

In one embodiment, the above phrase that the W number values and the target factor are used together for determining a first parameter includes the following meaning: a first number value is one of the W number values, a sum of a product of the first number value multiplied by the target factor plus a number value other than the first number value in the W number values is equal to a first median value, and the first parameter is directly proportional to the first median value.

In one embodiment, the above phrase that the W number values and the target factor are used together for determining a first parameter includes the following meaning: a first number value is one of the W number values, a sum of a product of the first number value multiplied by the target factor plus a number value other than the first number value in the W number values is equal to a first median value; given a number of serving cell(s) comprised in each of the W cell groups and the target factor, the first parameter is linearly correlated to the first median value.

In one embodiment, the above phrase that the first parameter and a second parameter are used together for determining the first threshold and the second threshold includes the following meaning: the first parameter and the second parameter are used together by the first node in the present disclosure for determining the first threshold and the second threshold.

In one embodiment, the above phrase that the first parameter and a second parameter are used together for determining the first threshold and the second threshold includes the following meaning: the first parameter and the second parameter are used for determining the first threshold and the second threshold according to a given mapping relation.

In one embodiment, the above phrase that the first parameter and a second parameter are used together for determining the first threshold and the second threshold includes the following meaning: the first parameter and the second parameter are used for determining the first threshold and the second threshold according to a given function relation.

In one embodiment, the above phrase that the first parameter and a second parameter are used together for determining the first threshold and the second threshold includes the following meaning: the first threshold is directly proportional to the first parameter, the first threshold is directly proportional to the second parameter, the second threshold is directly proportional to the first parameter, and the second threshold is directly proportional to the second parameter.

In one embodiment, the above phrase that the first parameter and a second parameter are used together for determining the first threshold and the second threshold includes the following meaning: the first threshold is directly proportional to a product of the first parameter and the second parameter, and the second threshold is directly proportional to a product of the first parameter and the second parameter.

In one embodiment, the above phrase that the first parameter and a second parameter are used together for determining the first threshold and the second threshold includes the following meaning: the first threshold is equal to a first median threshold rounded down to a nearest integer, and the first median threshold is directly proportional to a product of the first parameter and the second parameter; the second threshold is equal to a second median threshold rounded down to a nearest integer, and the second median threshold is directly proportional to a product of the first parameter and the second parameter.

In one embodiment, the above phrase that the first parameter and a second parameter are used together for determining the first threshold and the second threshold includes the following meaning: the first threshold is equal to a largest integer not greater than a first median threshold, and the first median threshold is directly proportional to a product of the first parameter and the second parameter; the second threshold is equal to a largest integer not greater than a second median threshold, and the second median threshold is directly proportional to a product of the first parameter and the second parameter.

In one embodiment, the above phrase that the first parameter and a second parameter are used together for determining the first threshold and the second threshold includes the following meaning: the first threshold is equal to a largest integer not greater than a first median threshold, and the first median threshold is directly proportional to the first parameter, and the first median threshold is directly proportional to the second parameter; the second threshold is equal to a largest integer not greater than a second median threshold, and the second median threshold is directly proportional to the first parameter, and the second median threshold is directly proportional to the second parameter.

In one embodiment, the above phrase that the first parameter and a second parameter are used together for determining the first threshold and the second threshold is implemented by the following formula:

$$M_{PDCCH}^{total,slot,\mu} = \left\lfloor N_{cells}^{cap} \cdot M_{PDCCH}^{max,slot,\mu} \cdot P_{cells}^{DL,\mu} \right\rfloor$$

$$C_{PDCCH}^{total,slot,\mu} = \left\lfloor N_{cells}^{cap} \cdot M_{PDCCH}^{max,slot,\mu} \cdot P_{cells}^{DL,\mu} \right\rfloor$$

herein $$M_{PDCCH}^{total,slot,\mu}$$

represents the first threshold, $$C_{PDCCH}^{max,slot,\mu}$$

represents the second threshold, $$P_{cells}^{DL,\mu}$$

represents the cells first parameter in the present disclosure, $$N_{cells}^{cap}$$

is represents the second parameter in the present disclosure, $$M_{PDCCH}^{max,slot,\mu}$$

represents a parameter related to the first SCS, $$C_{PDCCH}^{max,slot,\mu}$$

represents a parameter related to the first SCS other than $$M_{PDCCH}^{max,slot,\mu},$$

and $\mu$ represents an index of the first SCS.

In one embodiment, the first parameter and the second parameter are associated with each other.

In one embodiment, the first parameter is unrelated to the second parameter.

In one embodiment, the first parameter and the second parameter are independent.

Embodiment 12B

Embodiment 12B illustrates a schematic diagram of a characteristic sum value and a target sum value according to one embodiment of the present application, as shown in FIG. 12B. In FIG. 12B, in each case of case A and case B, a rectangle represents a target increment value, a rectangle represents a target sum value, a rectangle represents a characteristic sum value, a rectangle represents a second parameter, and an arrow represents the determining process; in case A, both a target sum value and a characteristic sum value are related to a target increment value; in case B, only the characteristic sum value in a target sum value and a characteristic sum value is related to a target increment value.

In Embodiment 12B, the fifth information block in the present disclosure is used for determining whether a target factor is equal to the first factor in the present disclosure; when the target factor is not equal to the first factor, the target factor is equal to a predefined value; a second param- eter is used for determining the first median value and the second median value in the present disclosure, the second parameter is equal to a ratio of a target sum value to a characteristic sum value, and the target sum value is not greater than the characteristic sum value; a relation between the target cell in the present disclosure and at least one of the W cell groups in the present disclosure is used for deter- mining whether the characteristic sum value is related to the target increment value; when the characteristic sum value is related to the target increment value, whether the target cell belongs to the first cell group in the present disclosure is used for determining whether the characteristic sum value is linearly correlated to the target increment value or linearly correlated to a product of the target increment value and the target factor; whether the target cell is associated with at least one of the M1 control channel candidates in the present disclosure and a relation between the target cell and at least one of the W cell groups is used for determining whether the target sum value is related to the target increment value; when the target sum value is related to the target increment value, whether the target cell belongs to the first cell group is used for determining whether the target sum value is linearly correlated to the target increment value or is linearly correlated to a product of the target increment value and the target factor.

In one embodiment, the target factor is not less than 1.

In one embodiment, the target factor may be less than 1.

In one embodiment, the target factor is not greater than 2.

In one embodiment, the target factor is a positive integer.

In one embodiment, the target factor may not be an integer.

In one embodiment, the target factor is equal to one of 1 or 2.

In one embodiment, a predefined value of the target factor is equal to 1.

In one embodiment, a predefined value of the target factor is equal to a fixed value other than 1.

In one embodiment, the above phrase that a second parameter is used for determining the first median value and the second median value includes the following meaning: the second parameter is used by the first node in the present disclosure for determining the first median value and the second median value.

In one embodiment, the above phrase that a second parameter is used for determining the first median value and the second median value includes the following meaning: the second parameter is used for determining the first median value and the second median value according to an operation function.

In one embodiment, the above phrase that a second parameter is used for determining the first median value and the second median value includes the following meaning: the first median value is directly proportional to the second parameter, and the second median value is directly propor- tional to the second parameter.

In one embodiment, the above phrase that a second parameter is used for determining the first median value and the second median value includes the following meaning: the first median value is linearly correlated to the second parameter, and the second median value is linearly corre- lated to the second parameter.

In one embodiment, the above phrase that a second parameter is used for determining the first median value and the second median value includes the following meaning: the first median value is directly proportional to the second parameter, and the second median value is directly propor- tional to the second parameter; a proportion coefficient between the first median value and the second parameter is a fixed value, or a proportion coefficient between the first median value and the second parameter is a configurable value; a proportion coefficient between the second median value and the second parameter is a fixed value, or a proportion coefficient between the second median value and the second parameter is a configurable value.

In one embodiment, the above phrase that a second parameter is used for determining the first median value and the second median value includes the following meaning: the first median value is directly proportional to the second parameter, and the second median value is directly propor- tional to the second parameter; a proportion coefficient between the first median value and the second parameter is related to the first SCS; and a proportion coefficient between the second median value and the second parameter is related to the first SCS.

In one embodiment, the above phrase that a second parameter is used for determining the first median value and the second median value includes the following meaning: the first median value is directly proportional to the second parameter, and the second median value is directly propor- tional to the second parameter; the first parameter in the present disclosure is used for determining a proportion coefficient between the first median value and the second parameter; the first parameter in the present disclosure is used for determining a proportion coefficient between the second median value and the second parameter;

In one embodiment, the above phrase that a second parameter is used for determining the first median value and the second median value is implemented by the following formula:

$$M_{PDCCH}^{max,slot,\mu} = \lfloor N_{cells}^{cap} \cdot M_{PDCCH}^{max,slot,\mu} \cdot P_{cells}^{DL,\mu} \rfloor$$

$$C_{PDCCH}^{max,slot,\mu} = \lfloor N_{cells}^{cap} \cdot C_{PDCCH}^{max,slot,\mu} \cdot P_{cells}^{DL,\mu} \rfloor$$

herein $$M_{PDCCH}^{max,slot,\mu}$$

represents the first threshold, $$C_{PDCCH}^{max,slot,\mu}$$

represents the second threshold, $$N_{cells}^{cap} \cdot M_{PDCCH}^{max,slot,\mu} \cdot P_{cells}^{DL,\mu}$$

represents a first median value, $$N_{cells}^{cap} \cdot C_{PDCCH}^{max,slot,\mu} \cdot P_{cells}^{DL,\mu}$$

represents a second median value, $$P_{cells}^{DL,\mu}$$

represents the second parameter in the present disclosure, $$N_{cells}^{cap}$$

is represents the first parameter in the present disclosure, $$M_{PDCCH}^{max,slot,\mu}$$

represents a parameter related to the first SCS, $$C_{PDCCH}^{max,slot,\mu}$$

represents a parameter related to the first SCS other than $$M_{PDCCH}^{max,slot,\mu},$$

represents an index of the first SCS.

In one embodiment, the target sum value is a positive integer.

In one embodiment, the target sum value is a non-negative integer.

In one embodiment, the target sum value is equal to 0.

In one embodiment, the characteristic sum value is a positive integer.

In one embodiment, the characteristic sum value is a positive integer greater than 1.

In one embodiment, the characteristic sum value is equal to 1.

In one embodiment, the target sum value is less than the characteristic sum value.

In one embodiment, the target sum value is equal to the characteristic sum value.

In one embodiment, the above phrase that a relation between the target cell and at least one of the W cell groups is used for determining whether the characteristic sum value is related to the target increment value includes the following meaning: a relation between the target cell and at least one of the W cell groups is used by the first node in the present disclosure for determining whether the characteristic sum value is related to the target increment value.

In one embodiment, the above phrase that a relation between the target cell and at least one of the W cell groups is used for determining whether the characteristic sum value is related to the target increment value includes the following meaning: a relation between the target cell and at least one of the W cell groups is used for determining whether the characteristic sum value is related to the target increment value according to a condition relation.

In one embodiment, the above phrase that a relation between the target cell and at least one of the W cell groups is used for determining whether the characteristic sum value is related to the target increment value includes the following meaning: whether the target cell belongs to the first cell group and whether the target cell also belongs to a cell group other than the first cell group in the W cell groups when the target cell belongs to the first cell group are used for determining whether the characteristic sum value is related to the target increment value.

In one embodiment, a number of serving cell(s) with at least one associated control channel candidate comprised respectively in the W cell groups is used for determining the characteristic sum value.

In one embodiment, the target factor is used for determining the characteristic sum value.

In one embodiment, the characteristic sum value being related to the target increment value refers to: the target increment value is used for determining the characteristic sum value.

In one embodiment, the characteristic sum value being related to the target increment value refers to: a number of serving cell(s) with at least one associated control channel candidate comprised respectively in the W cell groups and the target increment value are used together for determining the characteristic sum value.

In one embodiment, the characteristic sum value being related to the target increment value refers to: a number of serving cell(s) with at least one associated control channel candidate comprised respectively in the W cell groups, the target factor and the target increment value are used together for determining the characteristic sum value.

In one embodiment, the characteristic sum value being related to the target increment value refers to: the characteristic sum value is linearly correlated to the target increment value.

In one embodiment, the characteristic sum value being related to the target increment value refers to: the target increment value is used for calculating the characteristic sum value according to an operation function.

In one embodiment, the characteristic sum value being related to the target increment value refers to: the target increment value as a parameter is used for calculating the characteristic sum value according to an operation function.

In one embodiment, the characteristic sum value being related to the target increment value refers to: the characteristic sum value varies with the target increment value.

In one embodiment, the characteristic sum value being unrelated to the target increment value refers to: a calculation of the characteristic sum value is unrelated to the target increment value.

In one embodiment, the characteristic sum value being unrelated to the target increment value refers to: the characteristic sum value does not vary with the target increment value.

In one embodiment, the characteristic sum value being unrelated to the target increment value refers to: a calculation function of the characteristic sum value does not comprise a parameter equal to the target increment value.

In one embodiment, the characteristic sum value being unrelated to the target increment value refers to: a number of serving cell(s) with at least one associated control channel candidate comprised respectively in the W cell groups, a number of serving cell(s) with at least one associated control channel candidate comprised respectively in only the W cell groups in the target factor and the target increment value and the target factor are used for determining the characteristic sum value.

In one embodiment, a number of serving cell(s) with at least one associated control channel candidate in the M1 control channel candidates comprised respectively in the W cell groups is used for determining the target sum value.

In one embodiment, the target factor is used for determining the target sum value.

In one embodiment, the target sum value being related to the target increment value refers to: the target increment value is used for determining the target sum value.

In one embodiment, the target sum value being related to the target increment value refers to: a number of serving cell(s) with at least one associated control channel candidate of the M1 control channel candidates comprised respectively in the W cell groups and the target increment value are used together for determining the target sum value.

In one embodiment, the characteristic sum value being related to the target increment value refers to: a number of serving cell(s) with at least one associated control channel candidate of the M1 control channel candidates comprised respectively in the W cell groups, the target factor and the target increment value are used together for determining the target sum value.

In one embodiment, the target sum value being related to the target increment value refers to: the target sum value is linearly correlated to the target increment value.

In one embodiment, the target sum value being related to the target increment value refers to: the target increment value is used for calculating the target sum value according to an operation function.

In one embodiment, the target sum value being related to the target increment value refers to: the target increment value as a parameter is used for calculating the target sum value according to an operation function.

In one embodiment, the target sum value being related to the target increment value refers to: the target sum value varies with the target increment value.

In one embodiment, the target sum value being unrelated to the target increment value refers to: the target sum value does not vary with the target increment value.

In one embodiment, the target sum value being unrelated to the target increment value refers to: a calculation function of the target sum value does not comprise a parameter equal to the target increment value.

In one embodiment, the target sum value being unrelated to the target increment value refers to: a number of serving cell(s) with at least one associated control channel candidate in the M1 control channel candidates comprised respectively in the W cell groups, a number of serving cell(s) with at least one associated control channel candidate in the M1 control channel candidates comprised respectively in only the W cell groups in the target factor and the target increment value as well as the target factor are used for determining the target sum value.

In one embodiment, the phrase that whether the target cell belongs to the first cell group is used for determining whether the characteristic sum value is linearly correlated to the target increment value or linearly correlated to a product of the target increment value and the target factor includes the following meaning: whether the target cell belongs to the first cell group is used by the first node in the present disclosure for determining whether the characteristic sum value is linearly correlated to the target increment value or linearly correlated to a product of the target increment value and the target factor.

In one embodiment, the phrase that whether the target cell belongs to the first cell group is used for determining whether the characteristic sum value is linearly correlated to the target increment value or linearly correlated to a product of the target increment value and the target factor includes the following meaning: whether the target cell belongs to the first cell group is used for determining whether the characteristic sum value is linearly correlated to the target increment value or to a product of the target increment value and the target factor according to a condition mapping relation.

In one embodiment, the phrase that whether the target cell belongs to the first cell group is used for determining whether the characteristic sum value is linearly correlated to the target increment value or linearly correlated to a product of the target increment value and the target factor includes the following meaning: when the target cell belongs to the first cell group, the characteristic sum value is linearly correlated to the target increment value; and when the target cell does not belong to the first cell group, the characteristic sum value is linearly correlated to a product of the target increment value and the target factor.

In one embodiment, the phrase that whether the target cell belongs to the first cell group is used for determining whether the characteristic sum value is linearly correlated to the target increment value or linearly correlated to a product of the target increment value and the target factor includes the following meaning: when the target cell does not belong to the first cell group, the characteristic sum value is linearly correlated to the target increment value; and when the target cell belongs to the first cell group, the characteristic sum value is linearly correlated to a product of the target increment value and the target factor.

In one embodiment, the phrase that whether the target cell is associated with at least one of the M1 control channel candidates and a relation between the target cell and at least one of the W cell groups is used for determining whether the target sum value is related to the target increment value includes the following meaning: whether the target cell is associated with at least one of the M1 control channel candidates and a relation between the target cell and at least one of the W cell groups is used by the first node in the present disclosure for determining whether the target sum value is related to the target increment value.

In one embodiment, the phrase that whether the target cell is associated with at least one of the M1 control channel candidates and a relation between the target cell and at least one of the W cell groups is used for determining whether the target sum value is related to the target increment value includes the following meaning: when the target cell is associated with at least one of the M1 control channel candidates and the target cell only belongs to one of the W cell groups, the target sum value is related to the target increment value; when the target cell is associated with at least one of the M1 control channel candidates and the target cell belongs to more than one of the W cell groups, the target sum value is unrelated to the target increment value; when the target cell is not associated with any of the M1 control channel candidates, the target sum value is unrelated to the target increment value.

In one embodiment, the phrase that whether the target cell is associated with at least one of the M1 control channel candidates and a relation between the target cell and at least one of the W cell groups is used for determining whether the target sum value is related to the target increment value includes the following meaning: when the target cell is associated with at least one of the M1 control channel candidates, a relation between the target cell and at least one of the W cell groups is used for determining whether the target sum value is related to the target increment value; and when the target cell is not associated with any of the M1 control channel candidates, the target sum value is unrelated to the target increment value.

In one embodiment, the target cell is associated with one of the M1 control channel candidates means that one of the M1 control channel candidates can be used to carry a PDCCH scheduling the target cell.

In one embodiment, the target cell is associated with one of the M1 control channel candidates means that one of the M1 control channel candidates can be used to schedule the target cell.

In one embodiment, the target cell is associated with one of the M1 control channel candidates means that one of the M1 control channel candidates belongs to a scheduling cell of the target cell.

In one embodiment, the phrase that whether the target cell belongs to the first cell group is used for determining whether the target sum value is linearly correlated to the target increment value or to a product of the target increment value and the target factor includes the following meaning: whether the target cell belongs to the first cell group is used by the first node in the present disclosure for determining whether the target sum value is linearly correlated to the target increment value or to a product of the target increment value and the target factor;

In one embodiment, the phrase that whether the target cell belongs to the first cell group is used for determining whether the target sum value is linearly correlated to the target increment value or linearly correlated to a product of the target increment value and the target factor includes the following meaning: whether the target cell belongs to the first cell group is used for determining whether the target sum value is linearly correlated to the target increment value or to a product of the target increment value and the target factor according to a condition mapping relation.

In one embodiment, the phrase that whether the target cell belongs to the first cell group is used for determining whether the target sum value is linearly correlated to the target increment value or linearly correlated to a product of the target increment value and the target factor includes the following meaning: when the target cell belongs to the first cell group, the target sum value is linearly correlated to the target increment value; and when the target cell does not belong to the first cell group, the target sum value is linearly correlated to a product of the target increment value and the target factor.

In one embodiment, the phrase that whether the target cell belongs to the first cell group is used for determining whether the target sum value is linearly correlated to the target increment value or linearly correlated to a product of the target increment value and the target factor includes the following meaning: when the target cell does not belong to the first cell group, the target sum value is linearly correlated to the target increment value; and when the target cell belongs to the first cell group, the target sum value is linearly correlated to a product of the target increment value and the target factor.

Embodiment 13A

Embodiment 13A illustrates a schematic diagram of a target sum value and a characteristic sum value according to one embodiment of the present disclosure, as shown in FIG. 13A. In FIG. 13A, $N_{1,\mu}$ represents one of W number values, $N_{2,\mu}$ represents another one of W number values, $N_1$ represents a number of serving cell(s) with at least one associated control channel candidate comprised in one of W cell groups, $N_2$ represents a number of serving cell(s) with at least one associated control channel candidate comprised in one of W cell groups, $\gamma$ represents a target factor.

In Embodiment 13A, the first parameter in the present disclosure is equal to a ratio of a target sum value to a characteristic sum value, and the target sum value is not greater than the characteristic sum value; the characteristic sum value is linearly correlated to a number of serving cell(s) with at least one associated control channel candidate comprised in one of the W cell groups in the present disclosure, and the characteristic sum value is linearly correlated to a product of a number of serving cell(s) with at least one associated control channel candidate comprised in one of the W cell groups and the target factor in the present disclosure; the target sum value is linearly correlated to one of the W number values in the present disclosure, and the target sum value is linearly correlated to a product of one of the W number values and the target factor in the present disclosure.

In one embodiment, the target sum value is a positive integer.

In one embodiment, the target sum value is a non-negative integer.

In one embodiment, the target sum value is equal to 0.

In one embodiment, the characteristic sum value is a positive integer.

In one embodiment, the characteristic sum value is a positive integer greater than 1.

In one embodiment, the characteristic sum value is equal to 1.

In one embodiment, the target sum value is less than the characteristic sum value.

In one embodiment, the target sum value is equal to the characteristic sum value.

In one embodiment, the above phrase that the characteristic sum value is linearly correlated to a number of serving cell(s) with at least one associated control channel candidate comprised in one of the W cell groups includes the following meaning: a first characteristic cell group is one of the W cell groups, and the characteristic sum value is linearly correlated to a number of serving cell(s) with at least one associated control channel candidates comprised in the first characteristic cell group.

In one embodiment, the above phrase that the characteristic sum value is linearly correlated to a number of serving cell(s) with at least one associated control channel candidate comprised in one of the W cell groups includes the following meaning: the characteristic sum value is linearly correlated to a number of serving cell(s) with at least one associated control channel candidate in the first time window comprised in one of the W cell groups.

In one embodiment, the above phrase that the characteristic sum value is linearly correlated to a number of serving cell(s) with at least one associated control channel candidate comprised in one of the W cell groups includes the following meaning: the characteristic sum value is linearly correlated to a number of serving cell(s) with at least one associated control channel candidate comprised in one of the W cell groups, and a correlation coefficient is greater than 0.

In one embodiment, the above phrase that the characteristic sum value is linearly correlated to a number of serving cell(s) with at least one associated control channel candidate comprised in one of the W cell groups includes the following meaning: the characteristic sum value is linearly correlated to a number of serving cell(s) with at least one associated control channel candidate comprised in one of the W cell groups, and a correlation coefficient is equal to 1.

In one embodiment, the above phrase that the characteristic sum value is linearly correlated to a number of serving cell(s) with at least one associated control channel candidate comprised in one of the W cell groups includes the following meaning: the characteristic sum value is linearly correlated to a number of serving cell(s) with at least one associated control channel candidate comprised in the first cell group in the present disclosure.

In one embodiment, the above phrase that the characteristic sum value is linearly correlated to a number of serving cell(s) with at least one associated control channel candidate comprised in one of the W cell groups includes the following meaning: the characteristic sum value is linearly correlated to a number of serving cell(s) with at least one associated control channel candidate comprised in the third cell group in the present disclosure.

In one embodiment, the above phrase that the characteristic sum value is linearly correlated to a number of serving cell(s) with at least one associated control channel candidate comprised in one of the W cell groups includes the following meaning: the characteristic sum value is linearly correlated to a number of serving cell(s) with at least one associated control channel candidate comprised in the fifth cell group in the present disclosure.

In one embodiment, the above phrase that the characteristic sum value is linearly correlated to a product of a number of serving cell(s) with at least one associated control channel candidate comprised in one of the W cell groups and the target factor includes the following meaning: a second characteristic cell group is one of the W cell groups, the characteristic sum value is linearly correlated to a product of a number of serving cell(s) with at least one associated control channel candidate comprised in the second characteristic cell group and the target factor.

In one embodiment, the above phrase that the characteristic sum value is linearly correlated to a product of a number of serving cell(s) with at least one associated control channel candidate comprised in one of the W cell groups and the target factor includes the following meaning: the characteristic sum value is linearly correlated to a product of a number of serving cell(s) with at least one associated control channel candidate in the first time window comprised in one of the W cell groups and the target factor.

In one embodiment, the above phrase that the characteristic sum value is linearly correlated to a product of a number of serving cell(s) with at least one associated control channel candidate comprised in one of the W cell groups and the target factor includes the following meaning: the characteristic sum value is linearly correlated to a product of a number of serving cell(s) with at least one associated control channel candidate comprised in the second cell group in the present disclosure and the target factor.

In one embodiment, the above phrase that the characteristic sum value is linearly correlated to a product of a number of serving cell(s) with at least one associated control channel candidate comprised in one of the W cell groups and the target factor includes the following meaning: the characteristic sum value is linearly correlated to a product of a number of serving cell(s) with at least one associated control channel candidate comprised in the fourth cell group in the present disclosure and the target factor.

In one embodiment, the above phrase that the characteristic sum value is linearly correlated to a product of a number of serving cell(s) with at least one associated control channel candidate comprised in one of the W cell groups and the target factor includes the following meaning: the characteristic sum value is linearly correlated to a product of a number of serving cell(s) with at least one associated control channel candidate comprised in the sixth cell group in the present disclosure and the target factor.

In one embodiment, the above phrase that the characteristic sum value is linearly correlated to a product of a number of serving cell(s) with at least one associated control channel candidate comprised in one of the W cell groups and the target factor includes the following meaning: the characteristic sum value is linearly correlated to a product of a number of serving cell(s) with at least one associated control channel candidate comprised in one of the W cell groups and the target factor, and a correlation coefficient is greater than 0.

In one embodiment, the above phrase that the characteristic sum value is linearly correlated to a product of a number of serving cell(s) with at least one associated control channel candidate comprised in one of the W cell groups and the target factor includes the following meaning: the characteristic sum value is linearly correlated to a product of a number of serving cell(s) with at least one associated control channel candidate comprised in one of the W cell groups and the target factor, and a correlation coefficient is equal to 1.

In one embodiment, the phrase that the characteristic sum value is linearly correlated to a number of serving cell(s) with at least one associated control channel candidate comprised in one of the W cell groups, and the characteristic sum value is linearly correlated to a product of a number of serving cell(s) with at least one associated control channel candidate comprised in one of the W cell groups and the target factor includes the following meaning: a first characteristic cell group is one of the W cell groups, and the characteristic sum value is linearly correlated to a number of serving cell(s) with at least one associated control channel candidate comprised in the first characteristic cell group; a second characteristic cell group is one of the W cell groups, the characteristic sum value is linearly correlated to a product of a number of serving cell(s) with at least one associated control channel candidate comprised in the second characteristic cell group and the target factor; and the first characteristic cell group and the second characteristic cell group are two different cell groups.

In one embodiment, the above phrase the target sum value is linearly correlated to one of the W number values includes the following meaning: a first characteristic number value is one of the W number values, and the target sum value is linearly correlated to the first characteristic number value.

In one embodiment, the above phrase the target sum value is linearly correlated to one of the W number values includes the following meaning: the target sum value is linearly correlated to one of the W number values, and a correlation coefficient is greater than 0

In one embodiment, the above phrase the target sum value is linearly correlated to one of the W number values includes the following meaning: the target sum value is linearly correlated to one of the W number values, and a correlation coefficient is equal to 1.

In one embodiment, the above phrase the target sum value is linearly correlated to a product of one of the W number values and the target factor includes the following meaning: a second characteristic number value is one of the W number values, and the target sum value is linearly correlated to a product of the second characteristic number value and the target factor.

In one embodiment, the above phrase the target sum value is linearly correlated to a product of one of the W number values and the target factor includes the following meaning: the target sum value is linearly correlated to a product of one of the W number values and the target factor, and a correlation coefficient is greater than 0.

In one embodiment, the above phrase the target sum value is linearly correlated to a product of one of the W number values and the target factor includes the following meaning: the target sum value is linearly correlated to a product of one of the W number values and the target factor, and a correlation coefficient is equal to 1.

In one embodiment, the above phrase the target sum value is linearly correlated to one of the W number values, and the target sum value is linearly correlated to a product of one of the W number values and the target factor includes the following meaning: a first characteristic number value is one of the W number values, and the target sum value is linearly correlated to the first characteristic number value; a second characteristic number value is one of the W number values, and the target sum value is linearly correlated to a product of the second characteristic number value and the target factor, the first characteristic number value and the second characteristic number value are two unrelated number values in the W number values.

In one embodiment, the above phrase that the characteristic sum value is linearly correlated to a number of serving cell(s) with at least one associated control channel candidate comprised in one of the W cell groups means that a first characteristic cell group is one of the W cell groups, and the characteristic sum value is linearly correlated to a number of serving cell(s) with at least one associated control channel candidates comprised in the first characteristic cell group; the above phrase the target sum value is linearly correlated to one of the W number values means that a first characteristic number value is one of the W number values, the target sum value is linearly correlated to the first characteristic number value; the first characteristic number value is equal to a number of serving cell(s) associated with at least one of the M1 control channel candidates in the first characteristic cell group.

In one embodiment, the above phrase that the characteristic sum value is linearly correlated to a product of a number of serving cell(s) with at least one associated control channel candidate comprised in one of the W cell groups and the target factor means that a second characteristic cell group is one of the W cell groups, the characteristic sum value is linearly correlated to a product of a number of serving cell(s) with at least one associated control channel candidate comprised in the second characteristic cell group and the target factor; the above phrase the target sum value is linearly correlated to a product of one of the W number values and the target factor includes the following meaning: a second characteristic number value is one of the W number values, and the target sum value is linearly correlated to a product of the second characteristic number value and the target factor; the second characteristic number value is equal to a number of serving cell(s) associated with at least one of the M1 control channel candidates in the second characteristic cell group.

Embodiment 13B

Embodiment 13B illustrates a schematic diagram of a first cell group according to one embodiment of the present disclosure, as shown in FIG. 13B. In FIG. 13B, the horizontal axis represents the frequency, each block with an arc top represents a serving cell, the cross line-filled block with an arc top represents a target cell, each serving cell circled by a same dotted line belongs to a same cell group, serving cells circled by a thick dotted line belongs to a first cell group, and dashed arrows between serving cells represent scheduling relations.

In Embodiment 13B, all serving cells comprised in the first scheduled cell set in the present disclosure belong to a first cell group, the target cell in the present disclosure is a primary cell in the first cell group, the first cell group comprises more than one serving cell, and a serving cell other than the target cell comprised in the first cell group is a scheduling cell of the target cell.

In one embodiment, the first cell group is an MCG, or the first cell group is an SCG.

In one embodiment, the target cell is a serving cell corresponding to a PCC.

In one embodiment, the target cell is a Spcell.

In one embodiment, the first cell group is an SCG, and the target cell is a Primary Cell of Secondary Cell Group (PSCell).

In one embodiment, a serving cell other than the target cell comprised in the first cell group is a scheduling cell of the target cell includes the following meaning: there exists more than one serving cell capable of scheduling the target cell.

In one embodiment, a serving cell other than the target cell comprised in the first cell group is a scheduling cell of the target cell includes the following meaning: the target cell is Self-Scheduled and Cross-Carrier Scheduled at the same time.

In one embodiment, a serving cell other than the target cell comprised in the first cell group is a scheduling cell of the target cell includes the following meaning: there exists an Scell capable of scheduling the target cell.

In one embodiment, a serving cell other than the target cell comprised in the first cell group is a scheduling cell of the target cell includes the following meaning: a scheduling cell of the target cell comprises the target cell and an Scell.

In one embodiment, a serving cell other than the target cell comprised in the first cell group is a scheduling cell of the target cell includes the following meaning: a scheduling cell of the target cell comprises an Scell.

Embodiment 14A

Embodiment 14A illustrates a schematic diagram of a second parameter according to one embodiment of the present disclosure, as shown in FIG. 14A. In FIG. 14A, $N_{1,cap}$ represents a number of serving cell(s) comprised in one of W cell groups, $N_{2,cap}$ represents a number of serving cell(s) comprised in another one of W cell groups, $\gamma$ represents a target factor.

In Embodiment 14A, the second parameter in the present disclosure is linearly correlated to a number of serving cell(s) comprised in one of the W cell groups, and the second parameter is linearly correlated to a product of a number of serving cell(s) comprised in one of the W cell groups and the target factor in the present disclosure.

In one embodiment, the target factor is equal to the first candidate factor in the present disclosure.

In one embodiment, the above phrase that the second parameter is linearly correlated to a number of serving cell(s) comprised in one of the W cell groups includes the following meaning: the second parameter is linearly correlated to a number of serving cell(s) comprised in one of the W cell groups, and a correlation coefficient is greater than 0.

In one embodiment, the above phrase that the second parameter is linearly correlated to a number of serving cell(s) comprised in one of the W cell groups includes the following meaning: the second parameter is linearly correlated to a number of serving cell(s) comprised in one of the W cell groups, and a correlation coefficient is equal to 1.

In one embodiment, the above phrase that the second parameter is linearly correlated to a number of serving cell(s) comprised in one of the W cell groups includes the following meaning: a third characteristic cell group is one of the W cell groups, and the second parameter is linearly correlated to a number of serving cell(s) comprised in the third characteristic cell group.

In one embodiment, the above phrase that the second parameter is linearly correlated to a number of serving cell(s) comprised in one of the W cell groups includes the following meaning: the second parameter is linearly correlated to a number of serving cell(s) comprised in the first cell group in the present disclosure.

In one embodiment, the above phrase that the second parameter is linearly correlated to a number of serving cell(s) comprised in one of the W cell groups includes the following meaning: the second parameter is linearly correlated to a number of serving cell(s) comprised in the third cell group in the present disclosure.

In one embodiment, the above phrase that the second parameter is linearly correlated to a number of serving cell(s) comprised in one of the W cell groups includes the following meaning: the second parameter is linearly correlated to a number of serving cell(s) comprised in the fifth cell group in the present disclosure.

In one embodiment, a first characteristic cell group is one of the W cell groups, and the characteristic sum value in the present disclosure is linearly correlated to a number of serving cell(s) with at least one associated control channel candidates comprised in the first characteristic cell group; the above phrase that the second parameter is linearly correlated to a number of serving cell(s) comprised in one of the W cell groups includes the following meaning: the second parameter is linearly correlated to a number of serving cell(s) comprised in the first characteristic cell group.

In one embodiment, the above phrase that the second parameter is linearly correlated to a product of a number of serving cell(s) comprised in one of the W cell groups and the target factor includes the following meaning: the second parameter is linearly correlated to a product of a number of serving cell(s) comprised in one of the W cell groups and the target factor, and a correlation coefficient is greater than 0.

In one embodiment, the above phrase that the second parameter is linearly correlated to a product of a number of serving cell(s) comprised in one of the W cell groups and the target factor includes the following meaning: the second parameter is linearly correlated to a product of a number of serving cell(s) comprised in one of the W cell groups and the target factor, and a correlation coefficient is equal to 0.

In one embodiment, the above phrase that the second parameter is linearly correlated to a product of a number of serving cell(s) comprised in one of the W cell groups and the target factor includes the following meaning: a fourth characteristic cell group is one of the W cell groups, and the second parameter is linearly correlated to a product of serving cell(s) comprised in the fourth characteristic cell group and the target factor.

In one embodiment, the above phrase that the second parameter is linearly correlated to a product of a number of serving cell(s) comprised in one of the W cell groups and the target factor includes the following meaning: the second parameter is linearly correlated to a product of a number of serving cell(s) comprised in the second cell group in the present disclosure and the target factor.

In one embodiment, the above phrase that the second parameter is linearly correlated to a product of a number of serving cell(s) comprised in one of the W cell groups and the target factor includes the following meaning: the second parameter is linearly correlated to a product of a number of serving cell(s) comprised in the fourth cell group in the present disclosure and the target factor.

In one embodiment, the above phrase that the second parameter is linearly correlated to a product of a number of serving cell(s) comprised in one of the W cell groups and the target factor includes the following meaning: the second parameter is linearly correlated to a product of a number of serving cell(s) comprised in the sixth cell group in the present disclosure and the target factor.

In one embodiment, a second characteristic cell group is one of the W cell groups, the characteristic sum value in the present disclosure is linearly correlated to a product of a number of serving cell(s) with at least one associated control channel candidate comprised in the second characteristic cell group and the target factor, and the second parameter is linearly correlated to a number of serving cell(s) comprised in the second characteristic cell group and the target factor.

In one embodiment, the phrase that the second parameter is linearly correlated to a number of serving cell(s) comprised in one of the W cell groups, and the second parameter is linearly correlated to a product of a number of serving cell(s) comprised in one of the W cell groups and the target factor includes the following meaning: a third characteristic cell group is one of the W cell groups, and the second parameter is linearly correlated to a number of serving cell(s) comprised in the third characteristic cell group; a fourth characteristic cell group is one of the W cell groups, and the second parameter is linearly correlated to a product of serving cell(s) comprised in the fourth characteristic cell group and the target factor; and the third characteristic cell group and the fourth characteristic cell group are two different cell groups in the W cells.

In one embodiment, the phrase that the second parameter is linearly correlated to a number of serving cell(s) comprised in one of the W cell groups, and the second parameter is linearly correlated to a product of a number of serving cell(s) comprised in one of the W cell groups and the target factor is implemented by the following formula:

$$N_{cells}^{cap} = N_{1,cap} + R \cdot N_{2,cap}$$

herein, $$N_{cells}^{cap}$$

represents the second parameter, $N_{1,cap}$ represents a number of serving cell(s) comprised in one of the W cell groups, $N_{2,cap}$ represents a number of serving cell(s) comprised in another one of the W cell groups, and R represents the target factor.

Embodiment 14B

Embodiment 14B illustrates a structure block diagram of a processing device in a first node according to one embodiment of the present disclosure, as shown in FIG. 14B. In FIG. 14B, a first node's processing device 1400B comprises a first transceiver 1401B and a first receiver 1402B. The first transceiver 1401B comprises the transmitter/receiver 456 (including the antenna 460), the transmitting processor 455, the receiving processor 452 and the controller/processor 490 in FIG. 4 of the present disclosure; the first receiver 1402B comprises the transmitter/receiver 456 (including the antenna 460), the receiving processor 452 and the controller/processor 490 in FIG. 4 of the present disclosure.

In Embodiment 14B, the first transceiver 1410B receives a first information block and a second information block, the first information block is used for determining a first scheduled cell set, the first scheduled cell set comprises more than one serving cell, and the second information block is used for determining a target increment value, and the target increment value is a non-negative number; a first receiver 1402B monitors M1 control channel candidates in a first time window, the M1 control channel candidates occupy M2 CCEs, M1 being a positive integer greater than 1, M2 being a positive integer greater than 1, and the first time window comprises at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, when the target cell only belongs to the first cell group in the W cell groups, the target number value is equal to a sum of a number of serving cell(s) comprised in the first cell group and the target increment value; and when the target cell does not belong to the first cell group, the target number value is equal to a number of serving cell(s) comprised in the first cell group.

In one embodiment, a second cell group is one of the W cell groups, and the first cell group is different from the second cell group; when the target cell belongs to the first cell group and the second cell group simultaneously, the target number value is equal to a number of serving cell(s) comprised in the first cell group.

In one embodiment, the first transceiver 1401B receives a third information block; herein, the third information block is used for determining a number of control resource set resource pool(s) in a scheduling cell of the target cell, and a number of control resource set resource pool(s) in a scheduling cell of the target cell is used for determining a relation between the target cell and at least one of the W cell groups.

In one embodiment, both a first scheduling cell and the target cell are scheduling cells of the target cell, and the first scheduling cell is a serving cell other than the target cell; a relation between a number of control resource set resource pool(s) in the first scheduling cell and a number of control resource set resource pool(s) in the target cell is used for determining a cell group to which the target cell belongs in the W cell groups, or one of a number of control resource set resource pool(s) in the first scheduling cell or a number of control resource set resource pool(s) in the target cell is used for determining a cell group to which the target cell belongs in the W cell groups.

In one embodiment, a first-type monitoring capability is adopted in a scheduling cell of any serving cell comprised in the first scheduled cell set, and the first information block is used for indicating the first-type monitoring capability; the first-type monitoring capability is used for determining a time length of the first time window.

In one embodiment, the first transceiver 1401B transmits a fourth information block; herein, the first threshold is equal to a largest integer not greater than a first median value, and the second threshold is equal to a largest integer not greater than a second median value; a first parameter is used for determining the first median value and the second median value, and the first parameter is greater than 0; the first parameter is linearly correlated to the target number value, or the first parameter is linearly correlated to a product of the target number value and a first factor, and the fourth information block is used for indicating the first factor.

In one embodiment, the first transceiver 1401B receives a fifth information block; herein, the fifth information block is used for determining whether a target factor is equal to the first factor; when the target factor is not equal to the first factor, the target factor is equal to a predefined value; a second parameter is used for determining the first median value and the second median value, the second parameter is equal to a ratio of a target sum value to a characteristic sum value, and the target sum value is not greater than the characteristic sum value; a relation between the target cell and at least one of the W cell groups is used for determining whether the characteristic sum value is related to the target increment value; when the characteristic sum value is related to the target increment value, whether the target cell belongs to the first cell group is used for determining whether the characteristic sum value is linearly correlated to the target increment value or linearly correlated to a product of the target increment value and the target factor; whether the target cell is associated with at least one of the M1 control channel candidates and a relation between the target cell and at least one of the W cell groups is used for determining whether the target sum value is related to the target increment value; when the target sum value is related to the target increment value, whether the target cell belongs to the first cell group is used for determining whether the target sum value is linearly correlated to the target increment value or is linearly correlated to a product of the target increment value and the target factor.

In one embodiment, all serving cells comprised in the first scheduled cell set belong to a first cell group, the target cell is a primary cell in the first cell group, the first cell group comprises more than one serving cell, and a serving cell other than the target cell comprised in the first cell group is a scheduling cell of the target cell.

In one embodiment, the first transceiver 1401B receives a sixth information block, herein, the sixth information block is used for determining at least one of the M1 control channel candidates, the M2 CCEs or a number of control-resource resource pool(s) in a scheduling cell of the target cell.

Embodiment 15A

Embodiment 15A illustrates a schematic diagram of relations among a third parameter, a fourth parameter and a first SCS according to one embodiment of the present disclosure, as shown in FIG. 15A. In FIG. 15A, the first column on the left represents an index of a scheduling SCS, the second column on the left represents X first-type candidate parameters, the third column on the left represents X second-type candidate parameters, an SCS index in black font is an index of a first SCS, a first-type candidate parameter in black font is a third parameter, and a second-type candidate parameter in black font is a fourth parameter.

In Embodiment 15A, the first SCS in the present disclosure is one of the X candidate SCSs, X being a positive integer greater than 1; the X candidate SCSs respectively correspond to X first-type candidate parameters, any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used for determining the first threshold in the present disclosure; a fourth parameter is one of the X second-type candidate parameters, and the fourth parameter is used for determining the second threshold in the present disclosure; the first SCS is used for determining the third parameter out of the X first-type candidate parameters, and the first SCS is used for determining the fourth parameter out of the X second-type candidate parameters.

In one embodiment, any of the X candidate SCSs is equal to one of 15 kHz, 30 kHz, 60 kHz or 120 kHz.

In one embodiment, any of the X candidate SCSs is equal to one of 15 kHz, 30 kHz, 60 kHz, 120 kHz or 240 kHz.

In one embodiment, any of the X candidate SCSs is equal to 15 kHz multiplied by non-negative integer power of 2.

In one embodiment, X is equal to 4.

In one embodiment, X is greater than 4.

In one embodiment, X is not less than 4.

In one embodiment, the X candidate SCSs are pre-defined.

In one embodiment, the X candidate SCSs are fixed.

In one embodiment, the X candidate SCSs consist of all SCSs supported by R17.

In one embodiment, the X candidate SCSs consist of all SCSs supported by R16.

In one embodiment, any two of the X candidate SCSs are not equal.

In one embodiment, any of the X first-type candidate parameters is a largest number of PDCCH candidates monitored in a slot on a serving cell.

In one embodiment, any two of the X first-type candidate parameters are not equal.

In one embodiment, there exist two of the X first-type candidate parameters being equal.

In one embodiment, X is equal to 4, and the X first-type candidate parameters are 44, 36, 22 and 20 respectively.

In one embodiment, any of the X first-type candidate parameters is a possible value of $$M_{PDCCH}^{max,slot,\mu}.$$

In one embodiment, the X first-type candidate parameters are predefined.

In one embodiment, any of the X second-type parameters is a largest number of non-overlapped CCEs monitored in a slot on a serving cell.

In one embodiment, any two of the X second-type candidate parameters are not equal.

In one embodiment, there exist two of the X second-type candidate parameters being equal.

In one embodiment, X is equal to 4, and the X second-type candidate parameters are 56, 56, 48 and 32 respectively.

In one embodiment, any of the X second-type candidate parameters is a possible value of $$C_{PDCCH}^{max,slot,\mu}.$$

In one embodiment, the X second-type candidate parameters are predefined.

In one embodiment, the X first-type candidate parameters and the X second-type candidate parameters are independent.

In one embodiment, the above phrase that the X candidate SCSs respectively correspond to X first-type candidate parameters includes the following meaning: the X candidate SCSs respectively correspond to X first-type candidate parameters according to a table relation.

In one embodiment, the above phrase that the X candidate SCSs respectively correspond to X first-type candidate parameters includes the following meaning: the X candidate SCSs respectively correspond to X first-type candidate parameters according to a mapping relation.

In one embodiment, the above phrase that the X candidate SCSs respectively correspond to X second-type candidate parameters includes the following meaning: the X candidate SCSs respectively correspond to X second-type candidate parameters according to a table relation.

In one embodiment, the above phrase that the X candidate SCSs respectively correspond to X second-type candidate parameters includes the following meaning: the X candidate SCSs respectively correspond to X second-type candidate parameters according to a mapping relation.

In one embodiment, the above phrase that the third parameter is used for determining the first threshold includes the following meaning: the third parameter is used by the first node in the present disclosure for determining the first threshold.

In one embodiment, the above phrase that the third parameter is used for determining the first threshold includes the following meaning: the first threshold is directly proportional to the third parameter.

In one embodiment, the above phrase that the third parameter is used for determining the first threshold includes the following meaning: the first threshold is directly proportional to the third parameter, and a proportion coefficient between the first threshold and the third parameter is equal to a product of the first parameter and the second parameter in the present disclosure.

In one embodiment, the above phrase that the third parameter is used for determining the first threshold includes the following meaning: the first threshold is equal to a largest integer not greater than a first transform threshold, and the first transform threshold is directly proportional to the third parameter.

In one embodiment, the above phrase that the third parameter is used for determining the first threshold includes the following meaning: the first threshold is equal to a largest integer not greater than a first transform threshold, the first transform threshold is directly proportional to the third parameter, and a proportion coefficient between the first transform threshold and the third parameter is equal to a product of the first parameter and the second parameter in the present disclosure.

In one embodiment, the above phrase that the third parameter is used for determining the first threshold is implemented by the following formula:

$$M_{PDCCH}^{total,slot,\mu} = \left\lfloor N_{cells}^{cap} \cdot M_{PDCCH}^{max,slot,\mu} \cdot P_{cells}^{DL,\mu} \right\rfloor$$

$$M_{PDCCH}^{total,slot,\mu}$$

represents the first threshold, $$P_{cells}^{DL,\mu}$$

represents the first parameter in the present disclosure, $$N_{cells}^{cap}$$

represents the second parameter in the present disclosure, $$M_{PDCCH}^{max,slot,\mu}$$

represents the third parameter, and μ represents an index of the first SCS.

In one embodiment, the above phrase that the fourth parameter is used for determining the second threshold includes the following meaning: the fourth parameter is used by the first node in the present disclosure for determining the second threshold.

In one embodiment, the above phrase that the fourth parameter is used for determining the second threshold includes the following meaning: the second threshold is directly proportional to the fourth parameter.

In one embodiment, the above phrase that the fourth parameter is used for determining the second threshold includes the following meaning: the second threshold is directly proportional to the fourth parameter, and a proportion coefficient between the second threshold and the fourth parameter is equal to a product of the first parameter and the second parameter in the present disclosure.

In one embodiment, the above phrase that the fourth parameter is used for determining the second threshold includes the following meaning: the second threshold is equal to a largest integer not greater than a second transform threshold, and the second transform threshold is directly proportional to the fourth parameter.

In one embodiment, the above phrase that the fourth parameter is used for determining the second threshold includes the following meaning: the second threshold is equal to a largest integer not greater than a second transform threshold, the second transform threshold is directly proportional to the fourth parameter, and a proportion coefficient between the second transform threshold and the fourth parameter is equal to a product of the first parameter and the second parameter in the present disclosure.

In one embodiment, the above phrase that the fourth parameter is used for determining the second threshold is implemented by the following formula:

$$C_{PDCCH}^{total,slot,\mu} = \left\lfloor N_{cells}^{cap} \cdot C_{PDCCH}^{max,slot,\mu} \cdot P_{cells}^{DL,\mu} \right\rfloor$$

$$C_{PDCCH}^{total,slot,\mu}$$

represents the second threshold, $$P_{cells}^{DL,\mu}$$

represents the first parameter in the present disclosure, $$N_{cells}^{cap}$$

represents the second parameter in the present disclosure, $$C_{PDCCH}^{max,slot,\mu}$$

represents the fourth parameter, and μ represents an index of the first SCS.

In one embodiment, the above phrase that the first SCS is used for determining the third parameter out of the X first-type candidate parameters includes the following meaning: the first SCS is used by the first node in the present disclosure for determining the third parameter out of the X first-type candidate parameters.

In one embodiment, the above phrase that the first SCS is used for determining the third parameter out of the X first-type candidate parameters includes the following meaning: the third parameter is a first-type candidate parameter corresponding to the first SCS in the X first-type candidate parameters.

In one embodiment, the above phrase that the first SCS is used for determining the third parameter out of the X first-type candidate parameters includes the following meaning: the first SCS is used for determining the third parameter out of the X first-type candidate parameters according to a given mapping relation.

In one embodiment, the above phrase that the first SCS is used for determining the third parameter out of the X first-type candidate parameters includes the following meaning: the first SCS is used for determining the third parameter out of the X first-type candidate parameters according to a given function relation.

In one embodiment, the above phrase that the first SCS is used for determining the fourth parameter out of the X second-type candidate parameters includes the following meaning: the first SCS is used by the first node in the present disclosure for determining the fourth parameter out of the X second-type candidate parameters.

In one embodiment, the above phrase that the first SCS is used for determining the fourth parameter out of the X second-type candidate parameters includes the following meaning: the fourth parameter is a second-type candidate parameter corresponding to the first SCS in the X second type candidate parameters.

In one embodiment, the above phrase that the first SCS is used for determining the fourth parameter out of the X second-type candidate parameters includes the following meaning: the first SCS is used for determining the fourth parameter out of the X second-type candidate parameters according to a given mapping relation.

In one embodiment, the above phrase that the first SCS is used for determining the fourth parameter out of the X second-type candidate parameters includes the following meaning: the first SCS is used for determining the fourth parameter out of the X second-type candidate parameters according to a given function relation.

In one embodiment, for each serving cell to which a sub-band comprised in the first sub-band set in the present disclosure belongs in frequency domain, the first node in the present disclosure is not required that a number of control channel candidate(s) in the monitored M1 control channel candidates exceeds a smaller value compared between the first threshold and the third parameter.

In one embodiment, for each serving cell to which any sub-band comprised in the first sub-band set in the present disclosure belongs in frequency domain and belonging to the first cell in the present disclosure, the first node in the present disclosure is not required that a number of control channel candidate(s) in the monitored M1 control channel candidates exceeds a smaller value compared between the first threshold and the third parameter.

In one embodiment, for each serving cell to which any sub-band comprised in the first sub-band set in the present disclosure belongs in frequency domain and belonging to the third cell in the present disclosure, the first node in the present disclosure is not required that a number of control channel candidate(s) in the monitored M1 control channel candidates exceeds a smaller value compared between the first threshold and the third parameter.

In one embodiment, for each serving cell to which any sub-band comprised in the first sub-band set in the present disclosure belongs in frequency domain and belonging to the fifth cell in the present disclosure, the first node in the present disclosure is not required that a number of control channel candidate(s) in the monitored M1 control channel candidates exceeds a smaller value compared between the first threshold and the third parameter.

In one embodiment, for each serving cell to which any sub-band comprised in the first sub-band set in the present disclosure belongs in frequency domain and belonging to the second cell in the present disclosure, the first node in the present disclosure is not required that a number of control channel candidate(s) in the monitored M1 control channel candidates exceeds a smaller value compared between the first threshold and a first product, and the first product is equal to a product of the target factor and the third parameter.

In one embodiment, for each serving cell to which any sub-band comprised in the first sub-band set in the present disclosure belongs in frequency domain and belonging to the fourth cell in the present disclosure, the first node in the present disclosure is not required that a number of control channel candidate(s) in the monitored M1 control channel candidates exceeds a smaller value compared between the first threshold and a first product, and the first product is equal to a product of the target factor and the third parameter.

In one embodiment, for each serving cell to which a sub-band comprised in the first sub-band set in the present disclosure belongs in frequency domain, the first node in the present disclosure is not required that a number of CCE(s) in the comprised M2 CCEs exceeds a smaller value compared between the second threshold and the fourth parameter.

In one embodiment, for each serving cell to which any sub-band comprised in the first sub-band set in the present disclosure belongs in frequency domain and belonging to the first cell in the present disclosure, the first node in the present disclosure is not required that a number of CCE(s) in the comprised M2 CCEs exceeds a smaller value compared between the second threshold and the fourth parameter.

In one embodiment, for each serving cell to which any sub-band comprised in the first sub-band set in the present disclosure belongs in frequency domain and belonging to the third cell in the present disclosure, the first node in the present disclosure is not required that a number of CCE(s) in the comprised M2 CCEs exceeds a smaller value compared between the second threshold and the fourth parameter.

In one embodiment, for each serving cell to which any sub-band comprised in the first sub-band set in the present disclosure belongs in frequency domain and belonging to the fifth cell in the present disclosure, the first node in the present disclosure is not required that a number of CCE(s) in the comprised M2 CCEs exceeds a smaller value compared between the second threshold and the fourth parameter.

In one embodiment, for each serving cell to which any sub-band comprised in the first sub-band set in the present disclosure belongs in frequency domain and belonging to the second cell in the present disclosure, the first node in the present disclosure is not required that a number of CCE(s)

in the comprised M2 CCEs exceeds a smaller value compared between the second threshold and a second product, and the second product is equal to a product of the target factor and the fourth parameter.

In one embodiment, for each serving cell to which any sub-band comprised in the first sub-band set in the present disclosure belongs in frequency domain and belonging to the fourth cell in the present disclosure, the first node in the present disclosure is not required that a number of CCE(s) in the comprised M2 CCEs exceeds a smaller value compared between the second threshold and a second product, and the second product is equal to a product of the target factor and the fourth parameter.

Embodiment 15B

Embodiment 15B illustrates a structure block diagram of a processing device in a second node according to one embodiment of the present disclosure, as shown in FIG. 15B. In FIG. 15B, a second node's processing device 1500B comprises a second transceiver 1501B and a first transmitter 1502B. The second transceiver 1501B comprises the transmitter/receiver 416 (including the antenna 460), the receiving processor 412, the transmitting processor 415 and the controller/processor 440 in FIG. 4 of the present disclosure; the first transmitter 1502B comprises the transmitter/receiver 416 (including the antenna 460), the transmitting processor 415 and the controller/processor 440 in FIG. 4 of the present disclosure.

In Embodiment 15B, the second transceiver 1501B transmits a first information block and a second information block, the first information block is used for indicating a first scheduled cell set, the first scheduled cell set comprises more than one serving cell, and the second information block is used for indicating a target increment value, and the target increment value is a non-negative number; the first transmitter 1502B determines M1 control channel candidates in a first time window, the M1 control channel candidates occupy M2 CCEs, M1 being a positive integer greater than 1, M2 being a positive integer greater than 1, and the first time window comprises at least one consecutive multicarrier symbol in time domain; herein, an SCS of a subcarrier occupied by one of the M2 CCEs in frequency domain is equal to a first SCS, and the first SCS is used for determining a time length of a multicarrier symbol comprised in the first time window; M1 is not greater than a first threshold, M2 is not greater than a second threshold, the first threshold is a positive integer, and the second threshold is a positive integer; the first scheduled cell set comprises W cell groups, and any of the W cell groups comprises at least one serving cell comprised in the first scheduled cell set, W being a positive integer greater than 1; a target cell is a serving cell comprised in the first scheduled cell set, and the first cell group is one of the W cell groups; a target number value is used for determining the first threshold and the second threshold, and a number of serving cell(s) comprised in the first cell group is used for determining the target number value; a relation between the target cell and at least one of the W cell groups is used for determining whether the target number value is related to the target increment value, and the target number value is a positive integer.

In one embodiment, when the target cell only belongs to the first cell group in the W cell groups, the target number value is equal to a sum of a number of serving cell(s) comprised in the first cell group and the target increment value; and when the target cell does not belong to the first cell group, the target number value is equal to a number of serving cell(s) comprised in the first cell group.

In one embodiment, a second cell group is one of the W cell groups, and the first cell group is different from the second cell group; when the target cell belongs to the first cell group and the second cell group simultaneously, the target number value is equal to a number of serving cell(s) comprised in the first cell group.

In one embodiment, the second transceiver 1501B transmits a third information block; herein, the third information block is used for indicating a number of control resource set resource pool(s) in a scheduling cell in the target cell, and a number of control resource set resource pool(s) in a scheduling cell of the target cell is used for determining a relation between the target cell and at least one of the W cell groups.

In one embodiment, both a first scheduling cell and the target cell are scheduling cells of the target cell, and the first scheduling cell is a serving cell other than the target cell; a relation between a number of control resource set resource pool(s) in the first scheduling cell and a number of control resource set resource pool(s) in the target cell is used for determining a cell group to which the target cell belongs in the W cell groups, or one of a number of control resource set resource pool(s) in the first scheduling cell or a number of control resource set resource pool(s) in the target cell is used for determining a cell group to which the target cell belongs in the W cell groups.

In one embodiment, a first-type monitoring capability is adopted in a scheduling cell of any serving cell comprised in the first scheduled cell set, and the first information block is used for indicating the first-type monitoring capability; the first-type monitoring capability is used for determining a time length of the first time window.

In one embodiment, the second transceiver 1501B receives a fourth information block; herein, the first threshold is equal to a largest integer not greater than a first median value, and the second threshold is equal to a largest integer not greater than a second median value; a first parameter is used for determining the first median value and the second median value, and the first parameter is greater than 0; the first parameter is linearly correlated to the target number value, or the first parameter is linearly correlated to a product of the target number value and a first factor, and the fourth information block is used for indicating the first factor.

In one embodiment, the second transceiver 1501B transmits a fifth information block; herein, the fifth information block is used for indicating whether a target factor is equal to the first factor; when the target factor is not equal to the first factor, the target factor is equal to a predefined value; a second parameter is used for determining the first median value and the second median value, the second parameter is equal to a ratio of a target sum value to a characteristic sum value, and the target sum value is not greater than the characteristic sum value; a relation between the target cell and at least one of the W cell groups is used for determining whether the characteristic sum value is related to the target increment value; when the characteristic sum value is related to the target increment value, whether the target cell belongs to the first cell group is used for determining whether the characteristic sum value is linearly correlated to the target increment value or linearly correlated to a product of the target increment value and the target factor; whether the target cell is associated with at least one of the M1 control channel candidates and a relation between the target cell and at least one of the W cell groups is used for determining whether the target sum value is related to the target increment value; when the target sum value is related to the target increment value, whether the target cell belongs to the first cell group is used for determining whether the target sum value is linearly correlated to the target increment value or is linearly correlated to a product of the target increment value and the target factor.

In one embodiment, all serving cells comprised in the first scheduled cell set belong to a first cell group, the target cell is a primary cell in the first cell group, the first cell group comprises more than one serving cell, and a serving cell other than the target cell comprised in the first cell group is a scheduling cell of the target cell.

In one embodiment, the second transceiver 1501B transmits a sixth information block; herein, the sixth information block is used for indicating at least one of the M1 control channel candidates, the M2 CCEs or a number of control-resource resource pool(s) in a scheduling cell of the target cell.

Embodiment 16A

Embodiment 16A illustrates a schematic diagram of a characteristic cell according to one embodiment of the present disclosure, as shown in FIG. 16A. In FIG. 16A, the horizontal axis represents frequency, each block with an arc top represents a serving cell, the cross line-filled block with an arc top represents a characteristic cell, and each serving cell circled by a same dotted line belong to a same cell group.

In Embodiment 16A, all serving cells comprised in the scheduled cell set in the present disclosure belong to a same cell group, a characteristic cell is a serving cell comprised in the scheduled cell set, and there exists more than one serving cell scheduling the characteristic cell.

In one embodiment, a cell group to which serving cells comprised in the scheduled cell group is an MCG.

In one embodiment, a cell group to which serving cells comprised in the scheduled cell group is an SCG.

In one embodiment, the characteristic cell corresponds to an CC.

In one embodiment, the characteristic cell is a serving cell corresponding to a PCC.

In one embodiment, the characteristic cell is a Pcell.

In one embodiment, the characteristic cell is an Spcell.

In one embodiment, the characteristic cell is a Pcell in an MCG, or the characteristic cell is a Pcell in an SCG.

In one embodiment, the characteristic cell is an Scell.

In one embodiment, the characteristic cell is a serving cell corresponding to a Secondary Component Carrier (SCC).

In one embodiment, the above phrase that there exists more than one serving cell scheduling the characteristic cell includes the following meaning: there exist more than one serving cell is configured to schedule the characteristic cell.

In one embodiment, the above phrase that there exists more than one serving cell scheduling the characteristic cell includes the following meaning: there exist two serving cells scheduling the characteristic cell.

In one embodiment, the above phrase that there exists more than one serving cell scheduling the characteristic cell includes the following meaning: there exist more than two serving cells scheduling the characteristic cell.

In one embodiment, the above phrase that there exists more than one serving cell scheduling the characteristic cell includes the following meaning: the characteristic cell is Self-Scheduled and Cross-Carrier Scheduled at the same time.

In one embodiment, the above phrase that there exists more than one serving cell scheduling the characteristic cell includes the following meaning: the characteristic cell is a Pcell, and a scheduling cell of the characteristic cell comprises an Scell.

In one embodiment, the above phrase that there exists more than one serving cell scheduling the characteristic cell includes the following meaning: the characteristic cell is a Pcell, and a scheduling cell of the characteristic cell comprises the characteristic cell and an Scell.

Embodiment 17A

Embodiment 17A illustrates a schematic diagram of a first control channel candidate and a second control channel candidate according to one embodiment of the present disclosure, as shown in FIG. 17A. In FIG. 17A, in case A, case B and case C, each unfilled rectangle represents a CCE, and each unfilled rectangle circled by a dotted line represents a CCE occupied by a first control channel candidate or a second control channel candidate; in case A, CCEs occupied by a first control channel candidate are different from CCEs occupied by second control channel candidate; in case B, $X(i)$ represents a payload bit sequence assumed to be carried by a first control channel candidate and second control channel candidate, and $Y1(i)$ and $Y2(i)$ respectively represent scrambling assumed to be used by a first control channel candidate and a second control channel candidate; in case C, $x(0)$, $x(1)$, . . . , $x(m)$ represent payload bits of corresponding DCI formats assumed by a first control channel candidate, $x(0)$, $x(1)$, . . . , $x(n)$ represent payload bits of corresponding DCI formats assumed by a second control channel candidate.

In Embodiment 17A, a first control channel candidate is one of the M1 control channel candidates in the present disclosure, and a second control channel candidate is a control channel candidate other than the first control channel candidate among the M1 control channel candidates in the present disclosure; CCEs occupied by the first control channel candidate are different from CCEs occupied by the second control channel candidate, or scrambling used by the first control channel candidate is different from scrambling used by the second control channel candidate, or a payload size of a DCI format corresponding to the first control channel candidate is different from a payload size of a DCI format corresponding to the second control channel candidate.

In one embodiment, the first control channel candidate and the second control channel candidate are separately calculated when calculating times of monitoring the M1 control channel candidates.

In one embodiment, the first control channel candidate and the second control channel candidate are counted as two different control channel candidates among the M1 control channel candidates.

In one embodiment, when CCEs occupied by the first control channel candidate are the same as CCEs occupied by the second control channel candidate, scrambling used by the first control channel candidate is different from scrambling used by the second control channel candidate or a payload size of a DCI format corresponding to the first control channel candidate is different from a payload size of a DCI format corresponding to the second control channel candidate.

In one embodiment, when scrambling used by the first control channel candidate is the same as scrambling used by the second control channel candidate, a CCE occupied by the first control channel candidate is different from a CCE occupied by the second control channel candidate or a payload size of a DCI format corresponding to the first control channel candidate is different from a payload size of a DCI format corresponding to the second control channel candidate.

In one embodiment, when a payload size of a DCI format corresponding to the first control channel candidate is the same as a payload size of a DCI format corresponding to the second control channel candidate, CCEs occupied by the first control channel candidate are different from CCEs occupied by the second control channel candidate or scrambling used by the first control channel candidate is different from scrambling used by the second control channel candidate.

In one embodiment, CCEs occupied by the first control channel candidate are different from CCEs occupied by the second control channel candidate includes the following meaning: a number of CCEs occupied by the first control channel candidate is different from a number of CCEs occupied by the second control channel candidate.

In one embodiment, CCEs occupied by the first control channel candidate are different from CCEs occupied by the second control channel candidate includes the following meaning: a CCE occupied by the first control channel candidate is not occupied by the second control channel candidate.

In one embodiment, CCEs occupied by the first control channel candidate are different from CCEs occupied by the second control channel candidate includes the following meaning: an Aggregation Level (AL) to which the first control channel candidates belongs is different from an AL to which the second control channel candidate belongs.

In one embodiment, scrambling used by the first control channel candidate is different from scrambling used by the second control channel candidate includes the following meaning: a scrambling sequence used by the first control channel candidate is different from a scrambling sequence used by the second control channel candidate.

In one embodiment, scrambling used by the first control channel candidate is different from scrambling used by the second control channel candidate includes the following meaning: a sequence type of a scrambling sequence used by the first control channel candidate is different from a sequence type of a scrambling sequence used by the second control channel candidate.

In one embodiment, scrambling used by the first control channel candidate is different from scrambling used by the second control channel candidate includes the following meaning: a sequence length of scrambling sequence used by the first control channel candidate is different from a sequence length of scrambling sequence used by the second control channel candidate.

In one embodiment, scrambling used by the first control channel candidate is different from scrambling used by the second control channel candidate includes the following meaning: an initial value of a scrambling sequence used by the first control channel candidate is different from an initial value of a scrambling sequence used by the second control channel candidate.

In one embodiment, scrambling used by the first control channel candidate is different from scrambling used by the second control channel candidate includes the following meaning: an initial value generating a register of a scrambling sequence used by the first control channel candidate is different from an initial value generating a register of a scrambling sequence used by the second control channel candidate.

In one embodiment, a payload size of a DCI format corresponding to the first control channel candidate is different from a payload size of a DCI format corresponding to the second control channel candidate includes the following meaning: a payload size of a DCI format corresponding to the first control channel candidate is greater than a payload size of a DCI format corresponding to the second control channel candidate.

In one embodiment, a payload size of a DCI format corresponding to the first control channel candidate is different from a payload size of a DCI format corresponding to the second control channel candidate includes the following meaning: a payload size of a DCI format corresponding to the first control channel candidate is less than a payload size of a DCI format corresponding to the second control channel candidate.

In one embodiment, a payload size of a DCI format corresponding to the first control channel candidate is different from a payload size of a DCI format corresponding to the second control channel candidate includes the following meaning: a DCI format corresponding to the first control channel candidate is different from a DCI format corresponding to the second control channel candidate.

In one embodiment, the first control channel candidate and the second control channel candidate satisfy at least one of the following conditions:

CCEs occupied by the first control channel candidate are different from CCEs occupied by the second control channel candidate;

scrambling used by the first control channel candidate is different from scrambling used by the second control channel candidate;

a payload size of a DCI format corresponding to the first control channel candidate is different from a payload size of a DCI format corresponding to the second control channel candidate.

Embodiment 18A

Figure 18A:
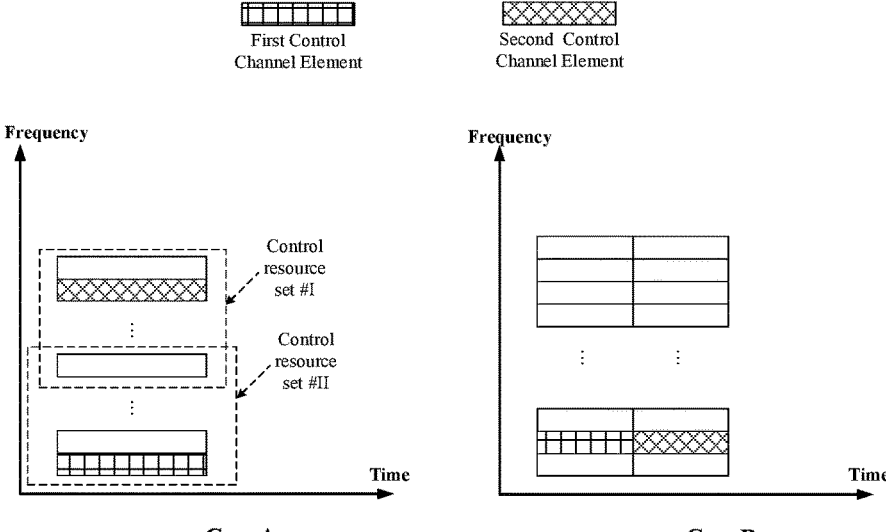
FIG. 18A illustrates a schematic diagram of a relation of a first CCE and a second CCE according to one embodiment of the present disclosure.

Embodiment 18A illustrates a schematic diagram of a relation between a first CCE and a second CCE according to one embodiment of the present disclosure, as shown in FIG. 18A. In FIG. 18A, in case A and case B, the horizontal axis represents frequency, the vertical axis represents frequency, each rectangle represents one of M2 CCEs, a reticle-filled rectangle represents a first CCE, and a cross line-filled rectangle represents a second CCE; in case A, a CCE circled by a dotted box belongs to a control resource set.

In Embodiment 18A, a first CCE is one of the M2 CCEs in the present disclosure, and a second CCE is a CCE other than the first CCE among the M2 CCEs in the present disclosure; the first CCE and the second CCE respectively belong to different control resource sets, or a control channel candidate occupying the first CCE and a control channel candidate occupying the second CCE respectively start from different symbols in time domain.

In one embodiment, time-frequency resources occupied by the first CCE are different from time-frequency resources occupied by the second CCE.

In one embodiment, time-frequency resources occupied by the first CCE are the same as time-frequency resources occupied by the second CCE.

In one embodiment, the first CCE and the second CCE are non-overlapped.

In one embodiment, the phrase that the first CCE and the second CCE respectively belong to different control resource sets includes the following meaning: the first CCE belongs to a first control resource set, and the second CCE belongs to a second control resource set; the first control resource set is a CORESET, the second control resource set is a CORESET, and the first control resource set is different from the second control resource set.

In one embodiment, the phrase that the first CCE and the second CCE respectively belong to different control resource sets includes the following meaning: the first CCE and the second CCE respectively belong to CORESETs configured with different indexes.

In one embodiment, the phrase that the first CCE and the second CCE respectively belong to different control resource sets includes the following meaning: the first CCE belongs to a first control resource set, and the second CCE belongs to a second control resource set; the first control resource set is a CORESET, the second control resource set is a CORESET, and time-frequency resources comprised in the first control resource set is different from time-frequency resources comprised in the second control resource set.

In one embodiment, the phrase that the first CCE and the second CCE respectively belong to different control resource sets includes the following meaning: the first CCE belongs to a first control resource set, and the second CCE belongs to a second control resource set; the first control resource set is a CORESET, the second control resource set is a CORESET, and an index of the first control resource set is different from an index of the second control resource set.

In one embodiment, the phrase that the first CCE and the second CCE respectively belong to different control resource sets includes the following meaning: the first CCE belongs to a first control resource set, and the second CCE belongs to a second control resource set; the first control resource set is a CORESET, the second control resource set is a CORESET, time-frequency resources comprised in the first control resource set are the same as time-frequency resources comprised in the second control resource set, and an index of the first control resource set is different from an index of the second control resource set.

In one embodiment, the phrase that a control channel candidate occupying the first CCE and a control channel candidate occupying the second CCE respectively start from different symbols in time domain includes the following meaning: a third control channel candidate occupies the first CCE, a fourth control channel candidate occupies the second CCE, a starting symbol occupied by the third control channel candidate in time domain is different from a starting symbol occupied by the fourth control channel candidate in time domain.

In one embodiment, the phrase that a control channel candidate occupying the first CCE and a control channel candidate occupying the second CCE respectively start from different symbols in time domain includes the following meaning: time-domain resources respectively occupy the first CCE and the second CCE are different.

In one embodiment, the phrase that a control channel candidate occupying the first CCE and a control channel candidate occupying the second CCE respectively start from different symbols in time domain includes the following meaning: indexes of starting symbols respectively occupied by two control channel candidates respectively occupying the first CCE and the second CCE are different in the first time window.

In one embodiment, the phrase that a control channel candidate occupying the first CCE and a control channel candidate occupying the second CCE respectively start from different symbols in time domain includes the following meaning: indexes of starting symbols in a slot to which they belong respectively occupied by two control channel candidates respectively occupying the first CCE and the second CCE are different in the first time window.

In one embodiment, a starting symbol occupying one control channel candidate of the first CCE is an OFDM symbol, and a starting symbol occupying one control channel candidate of the second CCE is an OFDM symbol.

In one embodiment, the first CCE and the second CCE satisfy at least one of the following conditions:

the first CCE and the second CCE respectively belong to different control resource sets;

a control channel candidate occupying the first CCE and a control channel candidate occupying the second CCE respectively start from different symbols in time domain.

Embodiment 19A

Figure 19A:
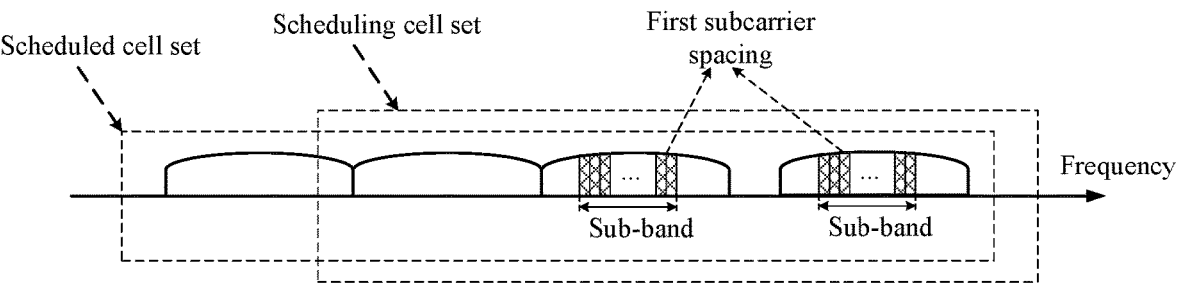
FIG. 19A illustrates a schematic diagram of sub-band(s) in a first sub-band set according to one embodiment of the present disclosure.

Embodiment 19A illustrates a schematic diagram of sub-band(s) in a first sub-band set according to one embodiment of the present disclosure, as shown in FIG. 19A. In FIG. 19A, the horizontal axis represents frequency, each block with an arc top represents a serving cell, two dotted boxes respectively represent a scheduled cell set and a scheduling cell set, each cross line-filled vertical bar represents a sub-carrier comprised in a sub-band comprised in a first sub-band set.

In Embodiment 19A, a scheduling cell set comprises scheduling cell(s) of serving cells comprised in the scheduled cell set in the present disclosure, and the scheduling cell set comprises at least one serving cell; the M1 control channel candidates in the present disclosure are monitored in sub-band(s) comprised in a first sub-band set, and the first sub-band set comprises at least one sub-band; a serving cell to which any sub-band comprised in the first sub-band set belongs in frequency domain belongs to the scheduling cell set; an SCS of a subcarrier comprised in any sub-band comprised in the first sub-band set is equal to the first SCS in the present disclosure.

In one embodiment, the scheduling cell set only comprises one serving cell.

In one embodiment, the scheduling cell set comprises more than one serving cell.

In one embodiment, any serving cell comprised in the scheduling cell set is an activated cell.

In one embodiment, one serving cell comprised in the scheduling cell set is a deactivated cell.

In one embodiment, any serving cell comprised in the scheduling cell set comprises an active BWP.

In one embodiment, a serving cell comprised in the scheduling cell set comprises a non-active BWP.

In one embodiment, a number of serving cell(s) comprised in the scheduling cell set is equal to a number of sub-band(s) comprised in the first sub-band set.

In one embodiment, a number of serving cell(s) comprised in the scheduling cell set is greater than a number of sub-band(s) comprised in the first sub-band set.

In one embodiment, a number of serving cell(s) comprised in the scheduling cell set is not less than a number of sub-band(s) comprised in the first sub-band set.

In one embodiment, the phrase that a scheduling cell set comprises a scheduling cell of a serving cell comprised in the scheduled cell set includes the following meaning: the scheduling cell set comprises all scheduling cell(s) of a serving cell comprised in the scheduled cell set.

In one embodiment, the phrase that a scheduling cell set comprises a scheduling cell of a serving cell comprised in the scheduled cell set includes the following meaning: the scheduling cell set only comprises scheduling cell(s) of a serving cell comprised in the scheduled cell set.

In one embodiment, the phrase that a scheduling cell set comprises a scheduling cell of a serving cell comprised in the scheduled cell set includes the following meaning: any serving cell scheduled by a serving cell comprised in the scheduled cell set belongs to the scheduled cell set.

In one embodiment, the phrase that a scheduling cell set comprises a scheduling cell of a serving cell comprised in the scheduled cell set includes the following meaning: the scheduling cell set comprises a scheduling cell of any serving cell comprised in the scheduled cell set.

In one embodiment, the phrase that a scheduling cell set comprises a scheduling cell of a serving cell comprised in the scheduled cell set includes the following meaning: the scheduling cell set also comprises a serving cell of a scheduling cell of a serving cell not comprised in the scheduled cell set.

In one embodiment, the above phrase that the M1 control channel candidates are monitored in sub-bands comprised in the first sub-band set includes the following meaning: a sub-band to which frequency-domain resources occupied by any of the M1 control channel candidates belong belongs to the first sub-band set.

In one embodiment, the above phrase that the M1 control channel candidates are monitored in sub-bands comprised in the first sub-band set includes the following meaning: sub-bands in the first sub-band set comprise frequency-domain resources occupied by any of the M1 control channel candidates.

In one embodiment, the above phrase that the M1 control channel candidates are monitored in sub-bands comprised in the first sub-band set includes the following meaning: any sub-band in the first sub-band set comprise frequency-domain resources occupied by at least one of the M1 control channel candidates.

In one embodiment, the first sub-band set only comprises one sub-band.

In one embodiment, the first sub-band set comprises more than one sub-band.

In one embodiment, any sub-band comprised in the first sub-band set is a BWP.

In one embodiment, any sub-band comprised in the first sub-band set is an Active DL BWP.

In one embodiment, any sub-band comprised in the first sub-band set is consecutive frequency-domain resources with same numerology in a carrier bandwidth.

In one embodiment, any sub-band comprised in the first sub-band set is consecutive subcarriers in frequency domain with same numerology in a carrier bandwidth.

In one embodiment, any sub-band comprised in the first sub-band set is a common resource block subset comprising consecutive common resource blocks (CRBs) for a given numerology on a given carrier.

In one embodiment, a serving cell to which any sub-band comprised in the first sub-band set belongs is a serving cell corresponding to a carrier to which any sub-band comprised in the first sub-band set belongs.

In one embodiment, when the first sub-band set comprises more than one sub-band, any two sub-bands comprised in the first sub-band set respectively belong to two different serving cells.

In one embodiment, when the first sub-band set comprises more than one sub-band, there exist two sub-bands in the first sub-band set respectively belonging to a same serving cell.

In one embodiment, a sub-band to which any of the M2 CCEs belongs is a sub-band in the first sub-band set.

In one embodiment, when the first sub-band set comprises more than one sub-band, there exist two of the M2 CCEs respectively belonging to two different sub-bands in the first sub-band set.

In one embodiment, each sub-band comprised in the first sub-band set comprises at least one of the M2 CCEs in frequency domain.

In one embodiment, any sub-band comprised in the first sub-band set is configurable.

In one embodiment, also comprising:

receiving a ninth information block;

herein, the ninth information block is used for determining each sub-band in the first sub-band set and an SCS of a subcarrier in each sub-band in the first sub-band set.

In one embodiment, the above phrase that a serving cell to which any sub-band comprised in the first sub-band set belongs in frequency domain belongs to the scheduling cell set includes the following meaning: the scheduling cell set comprises a serving cell to which any sub-band comprised in the first sub-band set belongs in frequency domain.

In one embodiment, the above phrase that a serving cell to which any sub-band comprised in the first sub-band set belongs in frequency domain belongs to the scheduling cell set includes the following meaning: the scheduling cell set only comprises a serving cell to which a sub-band comprised in the first sub-band set belongs in frequency domain.

In one embodiment, the scheduling cell set also comprises a serving cell other than a serving cell to which a sub-band comprised in the first sub-band set belongs in frequency domain.

In one embodiment, the above phrase that a serving cell to which any sub-band comprised in the first sub-band set belongs in frequency domain belongs to the scheduling cell set includes the following meaning: the first sub-band set comprises B sub-band(s), the scheduling cell set comprises B serving cell(s), the B serving cell(s) comprises(respectively comprise) the B sub-bands, B being a positive integer.

In one embodiment, the above phrase that a serving cell to which any sub-band comprised in the first sub-band set belongs in frequency domain belongs to the scheduling cell set includes the following meaning: a serving cell corresponding to a carrier to which any sub-band comprised in the first sub-band set belongs to the scheduling cell set.

In one embodiment, when the first sub-band set comprises more than one sub-band, any two sub-bands in the first sub-band set comprises subcarriers with equal SCSs.

In one embodiment, an SCS of any subcarrier comprised in any sub-band comprised in the first sub-band set is equal to the first SCS.

In one embodiment, the first sub-band set comprises more than one subcarrier, and SCSs of any two subcarriers comprised in the first sub-band set are equal.

In one embodiment, any sub-band comprised in the first sub-band set comprises a subcarrier of a positive integral multiple of 12.

Embodiment 20A

Figure 20A:
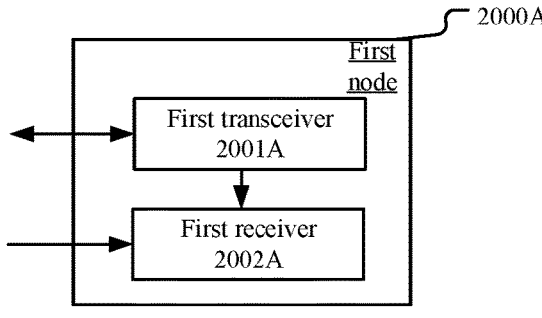
FIG. 20A illustrates a structure block diagram of a processing device in a first node according to one embodiment of the present disclosure.

Embodiment 20A illustrates a structure block diagram of a processing device in a first node according to one embodiment of the present disclosure, as shown in FIG. 20A. In FIG. 20A, a first node's processing device 2000A comprises a first transceiver 2001A and a first receiver 2002A. The first transceiver 2001A comprises the transmitter/receiver 456 (including the antenna 460), the transmitting processor 455, the receiving processor 452 and the controller/processor 490 in FIG. 4 of the present disclosure; the first receiver 2202A comprises the transmitter/receiver 456 (including the antenna 460), the receiving processor 452 and the controller/processor 490 in FIG. 4 of the present disclosure.

In Embodiment 20A, the first transceiver 2001A receives a first information block, the first information block is used for determining a scheduled cell set, and the scheduled cell set comprises more than one serving cell; and a first receiver 2002A monitors M1 control channel candidates in a first time window, the M1 control channel candidates occupy M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the W cell groups comprise a first cell group and a second cell group, and the first cell group is different from the second cell group; when a number of control resource pool(s) provided in a scheduling cell of the first serving cell is equal to 1 or no control resource pool is provided in a scheduling cell of the first serving cell, the first serving cell belongs to the first cell group; and when a number of control resource pools provided in a scheduling cell of the first serving cell is greater than 1, the first serving cell belongs to the second cell group.

In one embodiment, a number of scheduling cell(s) of the first serving cell is used for determining a cell group to which the first serving cell belongs out of the W cell groups.

In one embodiment, the W cell groups comprise a third cell group and a fourth cell group, and the third cell group is different from the fourth cell group; conditions under which the first serving cell belongs to the third cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the fourth cell group include:

a number of control resource pools provided in a scheduling cell of the first serving cell is greater than 1; or, a number of scheduling cells of the first serving cell is greater than 1.

In one embodiment, the W cell groups comprise a fifth cell group, a sixth cell group and a seventh cell group, and any two among the fifth cell group, the sixth cell group and the seventh cell group are different; conditions under which the first serving cell belongs to the fifth cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the sixth cell group include:

a number of control resource pools provided in a scheduling cell of the first serving cell is greater than 1, and a number of scheduling cell(s) of the first serving cell is equal to 1;

conditions under which the first serving cell belongs to the seventh cell group include:

a number of scheduling cells of the first serving cell is greater than 1.

In one embodiment, the first transceiver 2001A transmits a second information block, and the first transceiver 2001A receives a third information block; herein, the second information block is used for indicating a first candidate factor out of a first candidate factor set, the first candidate factor set comprises more than one candidate factor, the first candidate factor is a candidate factor comprised in the first candidate factor set, and any candidate factor comprised in the first candidate factor set is greater than 0; the third information block is used for determining whether the target factor is equal to the first candidate factor; when the target factor is not equal to the first candidate factor, the target factor is equal to a predefined value.

In one embodiment, the first transceiver 2001A transmits a fourth information block; herein, the first candidate factor set is one of G candidate factor sets, G being a positive integer greater than 1; any of the G candidate factor sets comprises more than one candidate factor; the fourth information block is used for indicating the first candidate factor set out of the G candidate factor sets.

In one embodiment, the W number values and the target factor are used together for determining a first parameter, the first parameter and a second parameter are used together for determining the first threshold and the second threshold, and the second parameter is a positive integer.

In one embodiment, the first parameter is equal to a ratio of a target sum value to a characteristic sum value, and the target sum value is not greater than the characteristic sum value; the characteristic sum value is linearly correlated to a number of serving cell(s) with at least one associated control channel candidate comprised in one of the W cell groups, and the characteristic sum value is linearly correlated to a product of a number of serving cell(s) with at least one associated control channel candidate comprised in one of the W cell groups and the target factor; the target sum value is linearly correlated to one of the W number values, and the target sum value is linearly correlated to a product of one of the W number values and the target factor.

In one embodiment, the first transceiver 2001A transmits a fifth information block, herein, the fifth information block is used for indicating the second parameter; or the second parameter is linearly correlated to a number of serving cell(s) comprised in one of the W cell groups, and the second parameter is linearly correlated to a product of a number of serving cell(s) comprised in one of the W cell groups and the target factor.

In one embodiment, the first SCS is one of the X candidate SCSs, X being a positive integer greater than 1; the X candidate SCSs respectively correspond to X first-type candidate parameters, any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used for determining the first threshold; a fourth parameter is one of the X second-type candidate parameters, and the fourth parameter is used for determining the second threshold; the first SCS is used for determining the third parameter out of the X first-type candidate parameters, and the first SCS is used for determining the fourth parameter out of the X second-type candidate parameters.

In one embodiment, all serving cells comprised in the scheduled cell set belong to a same cell group, a characteristic cell is a serving cell comprised in the scheduled cell set, and there exists more than one serving cell scheduling the characteristic cell.

In one embodiment, the first transceiver 2001A receives a sixth information block, herein, the sixth information block is used for determining at least one of the M1 control channel candidates, the M2 CCEs or a number of control-resource resource pool(s) in a scheduling cell of the first serving cell.

In one embodiment, a first control channel candidate is one of the M1 control channel candidates, and a second control channel candidate is a control channel candidate other than the first control channel candidate among the M1 control channel candidates; CCEs occupied by the first control channel candidate are different from CCEs occupied by the second control channel candidate, or scrambling used by the first control channel candidate is different from scrambling used by the second control channel candidate, or a payload size of a DCI format corresponding to the first control channel candidate is different from a payload size of a DCI format corresponding to the second control channel candidate.

In one embodiment, a first CCE is one of the M2 CCEs, and a second CCE is a CCE other than the first CCE among the M2 CCEs; the first CCE and the second CCE respectively belong to different control resource sets, or a control channel candidate occupying the first CCE and a control channel candidate occupying the second CCE respectively start from different symbols in time domain.

In one embodiment, a scheduling cell set comprises scheduling cell(s) of serving cell(s) comprised in the scheduled cell set, and the scheduling cell set comprises at least one serving cell; the M1 control channel candidates are monitored in sub-band(s) comprised in a first sub-band set, and the first sub-band set comprises at least one sub-band; a serving cell to which any sub-band comprised in the first sub-band set belongs in frequency domain belongs to the scheduling cell set; an SCS of a subcarrier comprised in any sub-band comprised in the first sub-band set is equal to the first SCS.

Embodiment 21A

Embodiment 21A illustrates a structure block diagram of a processing device in a second node according to one embodiment of the present disclosure, as shown in FIG.

Figure 21A:
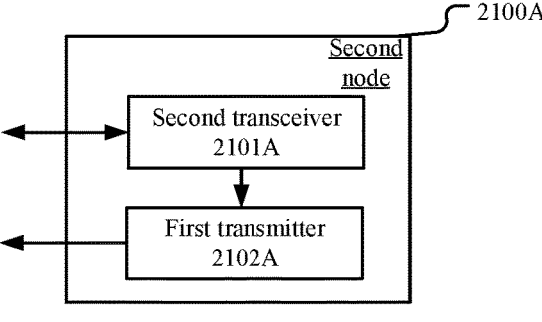
FIG. 21A illustrates a structure block diagram of a processing device in second node according to one embodiment of the present disclosure.

21A. In FIG. 21A, a second node's processing device 2100A comprises a second transceiver 2101A and a first transmitter 2102A. The second transceiver 2101A comprises the transmitter/receiver 416 (including the antenna 460), the receiving processor 412, the transmitting processor 415 and the controller/processor 440 in FIG. 4 of the present disclosure; the first transmitter 2102A comprises the transmitter/receiver 416 (including the antenna 460), the transmitting processor 415 and the controller/processor 440 in FIG. 4 of the present disclosure.

In Embodiment 21A, the second transceiver 2101A transmits a first information block, the first information block is used for indicating a scheduled cell set, and the scheduled cell set comprises more than one serving cell; and a first transmitter 2102A determines M1 control channel candidates in a first time window, the M1 control channel candidates occupy M2 CCEs, M1 being a positive integer greater than 1, M2 being a positive integer greater than 1; herein, an SCS of a subcarrier occupied by one of the M2 CCEs in frequency domain is equal to a first SCS, and the first SCS is used for determining a time length of the first time window; M1 is not greater than a first threshold, M2 is not greater than a second threshold, the first threshold is a positive integer, and the second threshold is a positive integer; serving cells comprised in the scheduled cell set are divided into W cell groups, W being an integer greater than 1, a first serving cell is a serving cell comprised in the scheduled cell set, a number of control resource pool(s) in a scheduling cell of the first serving cell is used for determining a cell group to which the first serving cell belongs out of the W cell groups, and any of the W cell groups comprises at least one serving cell; W number values are numbers of serving cells associated with at least one of the M1 control channel candidates comprised respectively in the W cell groups, the W number values and a target factor are used together for determining the first threshold and the second threshold, and the target factor is a positive number.

In one embodiment, the W cell groups comprise a first cell group and a second cell group, and the first cell group is different from the second cell group; when a number of control resource pool(s) provided in a scheduling cell of the first serving cell is equal to 1 or no control resource pool is provided in a scheduling cell of the first serving cell, the first serving cell belongs to the first cell group; and when a number of control resource pools provided in a scheduling cell of the first serving cell is greater than 1, the first serving cell belongs to the second cell group.

In one embodiment, a number of scheduling cell(s) of the first serving cell is used for determining a cell group to which the first serving cell belongs out of the W cell groups.

In one embodiment, the W cell groups comprise a third cell group and a fourth cell group, and the third cell group is different from the fourth cell group; conditions under which the first serving cell belongs to the third cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the fourth cell group include:

a number of control resource pools provided in a scheduling cell of the first serving cell is greater than 1; or, a number of scheduling cells of the first serving cell is greater than 1.

In one embodiment, the W cell groups comprise a fifth cell group, a sixth cell group and a seventh cell group, and any two among the fifth cell group, the sixth cell group and the seventh cell group are different; conditions under which the first serving cell belongs to the fifth cell group include:

no control resource pool is provided in a scheduling cell of the first serving cell, and a number of scheduling cell(s) of the first serving cell is equal to 1; or, a number of control resource pool(s) provided in a scheduling cell of the first serving cell is equal to 1, and a number of scheduling cell(s) of the first serving cell is equal to 1;

conditions under which the first serving cell belongs to the sixth cell group include:

a number of control resource pools provided in a scheduling cell of the first serving cell is greater than 1, and a number of scheduling cell(s) of the first serving cell is equal to 1;

conditions under which the first serving cell belongs to the seventh cell group include:

a number of scheduling cells of the first serving cell is greater than 1.

In one embodiment, the second transceiver 2102A receives a second information block; the second transceiver 2102A transmits a third information block; herein, the second information block is used for indicating a first candidate factor out of a first candidate factor set, the first candidate factor set comprises more than one candidate factor, the first candidate factor is a candidate factor comprised in the first candidate factor set, and any candidate factor comprised in the first candidate factor set is greater than 0; the third information block is used for indicating whether the target factor is equal to the first candidate factor; when the target factor is not equal to the first candidate factor, the target factor is equal to a predefined value.

In one embodiment, the second transceiver 1202A receives a fourth information block; herein, the first candidate factor set is one of G candidate factor sets, G being a positive integer greater than 1; any of the G candidate factor sets comprises more than one candidate factor; the fourth information block is used for indicating the first candidate factor set out of the G candidate factor sets.

In one embodiment, the W number values and the target factor are used together for determining a first parameter, the first parameter and a second parameter are used together for determining the first threshold and the second threshold, and the second parameter is a positive integer.

In one embodiment, the first parameter is equal to a ratio of a target sum value to a characteristic sum value, and the target sum value is not greater than the characteristic sum value; the characteristic sum value is linearly correlated to a number of serving cell(s) with at least one associated control channel candidate comprised in one of the W cell groups, and the characteristic sum value is linearly correlated to a product of a number of serving cell(s) with at least one associated control channel candidate comprised in one of the W cell groups and the target factor; the target sum value is linearly correlated to one of the W number values, and the target sum value is linearly correlated to a product of one of the W number values and the target factor.

In one embodiment, the second transceiver 2102A receives a fifth information block; herein, the fifth information block is used for indicating the second parameter; or the second parameter is linearly correlated to a number of serving cell(s) comprised in one of the W cell groups, and the second parameter is linearly correlated to a product of a number of serving cell(s) comprised in one of the W cell groups and the target factor.

In one embodiment, the first SCS is one of the X candidate SCSs, X being a positive integer greater than 1; the X candidate SCSs respectively correspond to X first-type candidate parameters, any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used for determining the first threshold; a fourth parameter is one of the X second-type candidate parameters, and the fourth parameter is used for determining the second threshold; the first SCS is used for determining the third parameter out of the X first-type candidate parameters, and the first SCS is used for determining the fourth parameter out of the X second-type candidate parameters.

In one embodiment, all serving cells comprised in the scheduled cell set belong to a same cell group, a characteristic cell is a serving cell comprised in the scheduled cell set, and there exists more than one serving cell scheduling the characteristic cell.

In one embodiment, the second transceiver 2102A transmits a sixth information block; herein, the sixth information block is used for indicating at least one of the M1 control channel candidates, the M2 CCEs or a number of control-resource resource pool(s) in a scheduling cell of the first serving cell.

In one embodiment, a first control channel candidate is one of the M1 control channel candidates, and a second control channel candidate is a control channel candidate other than the first control channel candidate among the M1 control channel candidates; CCEs occupied by the first control channel candidate are different from CCEs occupied by the second control channel candidate, or scrambling used by the first control channel candidate is different from scrambling used by the second control channel candidate, or a payload size of a DCI format corresponding to the first control channel candidate is different from a payload size of a DCI format corresponding to the second control channel candidate.

In one embodiment, a first CCE is one of the M2 CCEs, and a second CCE is a CCE other than the first CCE among the M2 CCEs; the first CCE and the second CCE respectively belong to different control resource sets, or a control channel candidate occupying the first CCE and a control channel candidate occupying the second CCE respectively start from different symbols in time domain.

In one embodiment, a scheduling cell set comprises scheduling cell(s) of serving cell(s) comprised in the scheduled cell set, and the scheduling cell set comprises at least one serving cell; the M1 control channel candidates are monitored in sub-band(s) comprised in a first sub-band set, and the first sub-band set comprises at least one sub-band; a serving cell to which any sub-band comprised in the first sub-band set belongs in frequency domain belongs to the scheduling cell set; an SCS of a subcarrier comprised in any sub-band comprised in the first sub-band set is equal to the first SCS.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:

a transceiver operatively coupled to a processor, the transceiver and processor configured to receive radio resource control (RRC) signaling including a first information block, wherein the first information block is used for determining a scheduled cell set, and wherein the scheduled cell set comprises a plurality of serving cells; and the transceiver and processor configured to monitor M1 control channel candidates in a first time window, wherein the M1 control channel candidates occupy M2 Control Channel Elements (CCEs), wherein M1 is a positive integer greater than 1, wherein M2 is a positive integer greater than 1, wherein a first Subcarrier Spacing (SCS) of a subcarrier occupied by one of the M2 CCEs in a frequency domain is used for determining a time length of the first time window, wherein the plurality of serving cells are divided into W cell groups, wherein W is an integer greater than 1, wherein the first SCS is one of X candidate SCSs, wherein X is a positive integer greater than 1, wherein the X candidate SCSs correspond to X first-type candidate parameters, wherein any of the X first-type candidate parameters is a positive integer, wherein the X candidate SCSs correspond to X second-type candidate parameters, wherein any of the X second-type candidate parameters is a positive integer, and wherein at least one of the M1 control channel candidates is associated with at least one cell group of the W cell groups.

2. The UE according to claim 1, wherein the W cell groups comprise a first cell group and a second cell group, and the first cell group is different from the second cell group; on a condition that a number of control resource pool(s) provided in a scheduling cell of the first serving cell is equal to 1 or no control resource pool is provided in a scheduling cell of the first serving cell, then the first serving cell belongs to the first cell group; and on a condition that a number of control resource pools provided in a scheduling cell of the first serving cell is greater than 1, then the first serving cell belongs to the second cell group.

3. The UE according to claim 1, wherein a number of scheduling cell(s) of a first serving cell of the plurality of serving cells is used for determining a cell group that the first serving cell belongs to out of the W cell groups.

4. The UE according to claim 1, wherein the transceiver transmits a second information block, and the transceiver receives a third information block, wherein the second information block is used for indicating a first candidate factor out of a first candidate factor set, wherein the first candidate factor set comprises more than one candidate factors, wherein the first candidate factor is a candidate factor comprised in the first candidate factor set, and wherein any candidate factor comprised in the first candidate factor set is greater than 0.

5. The UE according to claim 1, wherein a first control channel candidate is one of the M1 control channel candidates, and a second control channel candidate is a control channel candidate other than the first control channel candidate among the M1 control channel candidates; and, wherein CCEs occupied by the first control channel candidate are different from CCEs occupied by the second control channel candidate, or scrambling used by the first control channel candidate is different from scrambling used by the second control channel candidate, or a payload size of a Downlink Control Information (DCI) format corresponding to the first control channel candidate is different from a payload size of a DCI format corresponding to the second control channel candidate.

6. A base station for wireless communications, comprising:

a transceiver, operatively coupled to a processor, the transceiver and processor configured to transmit radio resource control (RRC) signaling including a first information block, wherein the first information block is used for indicating a scheduled cell set, and wherein the scheduled cell set comprises a plurality of serving cells; and the transceiver and processor configured to determine M1 control channel candidates in a first time window, wherein the M1 control channel candidates occupy M2 CCEs, wherein M1 is a positive integer greater than 1, wherein M2 is a positive integer greater than 1, wherein a first Subcarrier Spacing (SCS) of a subcarrier occupied by one of the M2 CCEs in a frequency domain is used for determining a time length of the first time window, wherein the plurality of serving cells are divided into W cell groups, wherein W is an integer greater than 1, wherein the first SCS is one of X candidate SCSs, wherein X is a positive integer greater than 1, wherein the X candidate SCSs correspond to X first-type candidate parameters, wherein any of the X first-type candidate parameters is a positive integer, wherein the X candidate SCSs correspond to X second-type candidate parameters, wherein any of the X second-type candidate parameters is a positive integer, and wherein at least one of the M1 control channel candidates is associated with at least one cell group of the W cell groups.

7. The base station according to claim 6, wherein the W cell groups comprise a first cell group and a second cell group, and the first cell group is different from the second cell group; on a condition that a number of control resource pool(s) provided in a scheduling cell of the first serving cell is equal to 1 or no control resource pool is provided in a scheduling cell of the first serving cell, then the first serving cell belongs to the first cell group; and on a condition that when a number of control resource pools provided in a scheduling cell of the first serving cell is greater than 1, then the first serving cell belongs to the second cell group.

8. The base station according to claim 6, wherein a number of scheduling cell(s) of a first serving cell of the plurality of serving cells is used for determining a cell group that the first serving cell belongs out of the W cell groups.

9. The base station according to claim 6, wherein the transceiver transmits a second information block, and the transceiver receives a third information block, wherein the second information block is used for indicating a first candidate factor out of a first candidate factor set, wherein the first candidate factor set comprises more than one candidate factors, wherein the first candidate factor is a candidate factor comprised in the first candidate factor set, and wherein any candidate factor comprised in the first candidate factor set is greater than 0.

10. A method for use by a User Equipment (UE) for wireless communications, comprising:
   receiving a radio resource control (RRC) signaling including a first information block,
   wherein the first information block is used for determining a scheduled cell set, and
   wherein the scheduled cell set comprises a plurality of serving cells; and
   monitoring M1 control channel candidates in a first time window,
   wherein the M1 control channel candidates occupy M2 CCEs,
   wherein M1 is a positive integer greater than 1,
   wherein M2 is a positive integer greater than 1,
   wherein a first Subcarrier Spacing (SCS) of a subcarrier occupied by one of the M2 CCEs in a frequency domain is used for determining a time length of the first time window,
   wherein the plurality of serving cells are divided into W cell groups,
   wherein W is an integer greater than 1,
      wherein the first SCS is one of X candidate SCSs,
      wherein X is a positive integer greater than 1, wherein the X candidate SCSs correspond to X first-type candidate parameters,
      wherein any of the X first-type candidate parameters is a positive integer,
      wherein the X candidate SCSs correspond to X second-type candidate parameters,
   wherein any of the X second-type candidate parameters is a positive integer, and
   wherein at least one of the M1 control channel candidates is associated with at least one cell group of the W cell groups.

11. The method according to claim 10, wherein the W cell groups comprise a first cell group and a second cell group, and the first cell group is different from the second cell group; on a condition that a number of control resource pool(s) provided in a scheduling cell of the first serving cell is equal to 1 or no control resource pool is provided in a scheduling cell of the first serving cell, then the first serving cell belongs to the first cell group; and on a condition that a number of control resource pools provided in a scheduling cell of the first serving cell is greater than 1, then the first serving cell belongs to the second cell group.

12. The method according to claim 10, wherein a number of scheduling cell(s) of a first serving cell of the plurality of serving cells is used for determining a cell group that the first serving cell belongs to out of the W cell groups.

13. The method according to claim 10, comprising:
   transmitting a second information block;
   receiving a third information block;
   wherein the second information block is used for indicating a first candidate factor out of a first candidate factor set, wherein the first candidate factor set comprises more than one candidate factors, wherein the first candidate factor is a candidate factor comprised in the first candidate factor set, and wherein any candidate factor comprised in the first candidate factor set is greater than 0.

14. The method according to claim 10, wherein a first control channel candidate is one of the M1 control channel candidates, and a second control channel candidate is a control channel candidate other than the first control channel candidate among the M1 control channel candidates; and wherein CCEs occupied by the first control channel candidate are different from CCEs occupied by the second control channel candidate, or scrambling used by the first control channel candidate is different from scrambling used by the second control channel candidate, or a payload size of a Downlink Control Information (DCI) format corresponding to the first control channel candidate is different from a payload size of a DCI format corresponding to the second control channel candidate.

* * * * *